(12) United States Patent
Goto et al.

(10) Patent No.: US 9,175,099 B2
(45) Date of Patent: Nov. 3, 2015

(54) LIVING RADICAL POLYMERIZATION METHOD USING A PHOSPHORUS COMPOUND OR NITROGEN COMPOUND AS A CATALYST

(75) Inventors: Atsushi Goto, Gokasho Uji (JP); Takeshi Fukuda, Gokasho Uji (JP); Yoshinobu Tsujii, Gokasho Uji (JP)

(73) Assignee: Kyoto University, Kyoto-shi, Kyoto (JP)

( * ) Notice: Subject to any disclaimer, the term of this patent is extended or adjusted under 35 U.S.C. 154(b) by 978 days.

(21) Appl. No.: 12/599,270

(22) PCT Filed: May 2, 2008

(86) PCT No.: PCT/JP2008/058438
§ 371 (c)(1),
(2), (4) Date: Aug. 10, 2010

(87) PCT Pub. No.: WO2008/139980
PCT Pub. Date: Nov. 20, 2008

(65) Prior Publication Data
US 2010/0298499 A1    Nov. 25, 2010

(30) Foreign Application Priority Data
May 9, 2007    (JP) .................................. 2007-125099

(51) Int. Cl.
*C08F 4/00*    (2006.01)
*C08F 2/38*    (2006.01)

(52) U.S. Cl.
CPC .... *C08F 4/00* (2013.01); *C08F 2/38* (2013.01)

(58) Field of Classification Search
CPC ................. C08F 2/38; C08F 4/00; C08F 4/04
USPC ............ 525/242, 244, 255, 259; 526/89, 193, 526/217, 233, 236
See application file for complete search history.

(56) References Cited

U.S. PATENT DOCUMENTS 2,857,365 A    1/1958  Johnson
5,530,079 A *  6/1996  Veregin et al. ............. 526/219.3
5,637,663 A    6/1997  Anolick et al.
6,133,389 A    10/2000 Anolick et al.
2005/0131186 A1* 6/2005 Percec et al. ................. 526/344

FOREIGN PATENT DOCUMENTS

JP    47-13366      4/1972
JP    47-13366 B1   4/1972

OTHER PUBLICATIONS

Goto, A. et al. Journal of the American Chemical Society vol. 129 pp. 13347-13354 published online Oct. 4, 2007.*
Prasad et al., "Effects of Phosphorous Oxychloride, Phosphorous Trichloride and Dichlorophenylphosphine on the Radical Polymerisation of Acrylonitrile Under Heterogeneous Conditions," Polymer Bulletin 2(2): 117-123, 1980.
Liu et al., "The Improved Process for Preparing N-Iodosuccinimide (NIS)," *Chemistry* 7:32-33, 2000 (Original Japanese document and English language translation).
Heasley et al., "Boron Trifluoride Promoted Reactions of N-Haloelectrophiles With Alkenes," Tetrahedron Letters 26 (15): 1811-1814, 1985.

* cited by examiner

*Primary Examiner* — Irina S Zemel
*Assistant Examiner* — Jeffrey Lenihan
(74) *Attorney, Agent, or Firm* — Seed IP Law Group PLLC

(57) ABSTRACT

A highly active and environment-friendly catalyst for use in a living radical polymerization is provided. A catalyst for use in a living radical polymerization method is provided. The catalyst comprises a central element, which is selected from nitrogen and phosphorus, and at least one halogen atom, which is bound to the central element. A monomer having a radical reactive unsaturated bond is subjected to a radical polymerization reaction in the presence of the catalyst, thereby it is possible to obtain a polymer having narrow molecular weight distribution. The present invention has the merits such as low toxicity of the catalyst, a small amount of the catalyst being required, high solubility of the catalyst in the polymerization media, mild reaction conditions, no coloration, no odor (unnecessary post-treatment of molded products). The method of the present invention is more environment-friendly and economical than other living radical polymerization methods.

17 Claims, 23 Drawing Sheets

LIVING RADICAL POLYMERIZATION METHOD USING A PHOSPHORUS COMPOUND OR NITROGEN COMPOUND AS A CATALYST

TECHNICAL FIELD

The present invention is directed to a highly active catalyst, which is used in a living radical polymerization method, and a polymerization method using the catalyst. More specifically, the present invention uses a catalyst having nitrogen or phosphorus as a central element in a living radical polymerization method.

BACKGROUND ART

A radical polymerization method has been a well known method for polymerizing a vinyl monomer to obtain a vinyl polymer. Generally, a radical polymerization method has the disadvantage of the difficulty in controlling the molecular weight of the obtained vinyl polymer. Further, there is the disadvantage that the obtained vinyl polymer is a mixture of compounds having various molecular weights, and thus it is difficult to obtain a vinyl polymer having a narrow molecular weight distribution. Specifically, even if the reaction is controlled, the ratio of weight-average molecular weight (Mw) and number-average molecular weight (Mn), (Mw/Mn), can be reduced to about only 2 to 3.

As a method for eliminating the aforementioned disadvantages, since around 1990, a living radical polymerization method has been developed. Specifically, according to the living radical polymerization method, it is possible to control the molecular weight. It is also possible to obtain a polymer having a narrow molecular weight distribution. Specifically, a polymer having Mw/Mn of 2 or less can easily be obtained. Therefore, this method has come into the limelight as a method for producing a polymer used in a high technology such as nanotechnology.

Catalysts which are currently used in living radical polymerization methods include transition metal complex-type catalysts.

For transition metal complex-type catalysts, complexes in which a ligand is coordinated to a compound having a central metal of Cu, Ni, Re, Rh, Ru, or the like have been used. Such catalysts are described in the following documents for example.

Patent document 1 (Japanese Laid-open Publication No. 2002-249505) discloses that a complex with a central metal which is Cu, Ru, Fe, Ni or the like, and it is used as a catalyst.

It should be noted that Patent Document 1 describes in its claim 1 that an organic halide is used as a polymerization initiator. This description is not intended to mean that a halogenated hydrocarbon acts as a catalyst for living radical polymerization. According to the invention of Patent Document 1, a metal complex having a transition metal as the central metal is used as the catalyst for living radical polymerization. According to the invention of Patent Document 1, an organic halide is used as a dormant species that will be described later in the present specification.

Patent document 2 (Japanese Laid-open Publication No. 11-322822) discloses that hydrido rhenium complex is used as a catalyst.

It should be noted that Patent Document 2 describes a "catalyst for radical living polymerization comprising a combination of a hydrido rhenium complex and a halogenated hydrocarbon" in claim 1. This description is not intended to mean that a halogenated hydrocarbon acts as a catalyst for living radical polymerization. According to the invention of Patent Document 2, the hydrido rhenium complex is used as the catalyst for living radical polymerization. According to the invention of Patent Document 2, the halogenated hydrocarbon is used as a dormant species that will be described later in the present specification. The combination of the catalyst and the dormant species is described as a catalyst in Patent Document 2, and this does not describe that the halogenated hydrocarbon serves as the catalyst for living radical polymerization.

Non-patent document 1 (Journal of The American Chemical Society 119, 674-680 (1997)) discloses that a compound in which 4,4'-di-(5-nonyl)-2,2'-bipyridine is coordinated with copper bromide, is used as a catalyst.

It should be noted that Non-Patent Document 1 describes that 1-phenylethyl bromide was used at the time of polymerization of styrene. That is, according to the invention of Patent Document 2, a copper bromide complex is used as a catalyst for living radical polymerization, and 1-phenylethyl bromide is used as the dormant species that will be described later in the present specification.

However, when such transition metal complex catalysts are used, it is necessary to use a large amount of the catalyst. This is disadvantageous as it is not easy to completely remove the large amount of the catalyst used, from the products after the reaction. Another disadvantage is environmental problems which may occur by the disposal of the catalyst. The transition metal for the living radical polymerization method includes many toxic metals. The disposal of a large amount of such toxic metals causes environmental problems. Furthermore, there are cases where toxicities of catalysts remaining in products cause environmental problems. Due to the toxicity, it is difficult to use the transition metal catalysts for the production of food packages, material for living body, and medical material. Additionally, there is a problem associated with a high conductivity of the transition metal remaining in polymer, rendering the polymer conductive and hence unsuitable for use in electronic material such as resist material. Furthermore, the transition metal-type catalysts do not dissolve in a reaction solution unless they form a complex. Therefore, it is necessary to use a ligand as an additive to form a complex. This causes problems, i.e., an increase of the cost of production and also an increase of the total weight of the catalyst used. Further, a ligand is usually expensive and requires a complicated synthesis method. Furthermore, the polymerization reaction requires a high temperature (for example, 110° C. or higher). (For example, in aforementioned Non-patent document 1, the polymerization reaction is performed at 110° C.).

It is noted that living radical polymerization methods, which do not require a catalyst, have also been known. For example, a nitroxyl-type method and dithioester-type method have been known. However, these methods have the following disadvantages. A special protecting group (i.e., a certain nitroxide or dithioester group) must be introduced to the polymer growing chain. The protecting group is very expensive. Further, the polymerization reaction requires a high temperature (for example, 100° C. or higher). Further, the produced polymer is likely to have undesirable properties. For example, the produced polymer is likely to be colored differently from the natural color of the polymer. Further, the produced polymer is likely to have an odor.

On the other hand, Non-Patent Document 2 (Polymer Preprints 2005, 46 (2), 245-246) and Patent Document 3 (Japanese Laid-open Patent Publication No. 2007-92014) disclose that compounds having Ge, Sn and the like as central metals are used as catalysts.

In regard to the copper complex catalyst described in Non-Patent Document 1, the cost for the catalyst required to polymerize 1 kg of a polymer sums up to approximately several thousand yen. In contrast, in regard to a germanium catalyst, the cost is cut down to about one thousand yen. Thus, the invention of Non-Patent Document 2 markedly decreases the cost for the catalyst. However, in order to apply living radical polymerization to general-purpose resin products and the like, a further less expensive catalyst is demanded.

In general, it is known that transition metals or compounds of transition metal elements are preferable as catalysts for various chemical reactions. For example, the following is described on page 311 of "Inorganic Chemistry" by J. D. LEE (Tokyo Kagaku Dojin, $1^{st}$ edition published on Apr. 15, 1982): "Many transition metals and the compounds of the transition metals have catalytic action . . . . In some cases, a transition metal may adopt various valences and form unstable intermediate compounds, while in other cases, a transition metal provides good reaction surfaces, and these serve as catalytic actions." That is, it has been widely understood by those skilled in the art that the properties characteristic to transition metals, such as the ability to form various unstable intermediate compounds, are indispensable in connection with the function of a catalyst.

Furthermore, Ge, Sn and Sb described in Non-Patent Document 2 are not transition metals, but are elements that belong to the $4^{th}$ period and the $5^{th}$ period of the Periodic Table and have large atomic numbers and have a large number of electrons and a large number of electron orbitals. Therefore, it is surmised in regard to Ge, Sn and Sb that the fact that these atoms have a large number of electrons and a large number of electron orbitals, works advantageously in terms of their action as catalysts.

According to such a common technological knowledge in connection with various catalysts of the prior art, it has been believed that the typical elements which belong to the $2^{nd}$ period and the $3^{rd}$ period of the Periodic Table, merely have a small number of electrons and a smaller number of electron orbitals, and thus it is disadvantageous to use them in a catalyst compound, and catalytic action cannot be expected from compounds utilizing these typical elements.

[Patent Document 1] Japanese Laid-open Patent Publication No. 2002-249505
[Patent document 2] Japanese Laid-open Patent Publication No. 11-322822
[Patent document 3] Japanese Laid-open Patent Publication No. 2007-92014
[Non-patent document 1] Journal of the American Chemical Society 119, 674-680 (1997)
[Non-patent document 2] Polymer Preprints 2005, 46(2), 245-246, "Germanium- and Tin-Catalyzed Living Radical Polymerizations of Styrene", American Chemical Society, Division of Polymer Chemistry

DISCLOSURE OF THE INVENTION

Problems to be Solved by the Invention

The present invention aims to solve the aforementioned problems. The objective of the present invention is to provide a catalyst having high activity for use in a living radical polymerization, and a method of polymerization using the catalyst.

Means for Solving the Problems

The present inventors earnestly conducted research to solve the above-mentioned problems and, have accomplished the present invention as a result. Specifically, according to the present invention, the following catalyst and polymerization methods are provided, and thereby the aforementioned problems are solved.

(1) A catalyst for use in a living radical polymerization method, consisting of a compound comprising at least one central element selected from nitrogen or phosphorus, and at least one halogen atom which is bound to the central element.
(2) A catalyst according to the aforementioned item 1, wherein the central element is trivalent phosphorus, pentavalent phosphorus or trivalent nitrogen.
(3) A catalyst according to the aforementioned item 1 or 2, consisting of the compound of the following general formula (Ia):
[Chemical formula 5]

$$R^1{}_n M_h X^1{}_m (\underbrace{\hspace{1cm}}_{} Z)_k \qquad (Ia)$$

wherein, $R^1$ is alkyl, alkylcarboxyl, haloalkyl, hydroxyl group, amino group, cyano group, alkoxy, alkylcarbonyl, aryl, or substituted aryl,
wherein, two $R^1$ may be bound to each other such that the two $R^1$ and one M may together form a ring structure,
n is an integer of 0 to 4×h,
M is a central element, which is nitrogen or phosphorus,
h is an integer of 1 or more,
when h is an integer of 2 or more, $R^1$, $X^1$, and Z may be independently bound to any of plurality of atoms of M,
$X^1$ is halogen,
Z is oxygen, nitrogen or sulfur, and is bound to M, the bond between Z and M:
[Chemical formula 6]

is a double bond or triple bond,
m is an integer of 1 to 5×h, and
k is an integer of 0 to 2×h.
(4) A catalyst according to the aforementioned item 3, wherein
$X^1$ is iodine or bromine.
(5) A catalyst according to the aforementioned item 3 or 4, wherein $X^1$ is iodine.
(6) A catalyst according to any one of the aforementioned items 3 to 5, wherein n is 0, m is an integer of 2 to 5×h.
(7) A catalyst according to any one of the aforementioned items 3 to 6, wherein M is phosphorus and the catalyst is represented by the following general formula (Ib):

[Chemical formula 7]

$$R^1{}_n P_h X^1{}_m (\underbrace{\hspace{1cm}}_{} Z)_k \qquad (Ib)$$

wherein, $R^1$ is alkyl, alkoxy, aryl, or substituted aryl,
n is an integer of 0 to 4×h,
h is an integer of 1 to 4,
when h is an integer of 2 or more, $R^1$, $X^1$ and Z may be independently bound to any of plurality of atoms of M,
$X^1$ is halogen,
Z is oxygen or nitrogen, and is bound to P,
the bond between Z and M:
[Chemical formula 8]

is a double bond or triple bond,
m is an integer of 1 to 5×h, and
k is an integer of 0 to 2×h.
(8) A catalyst according to any one of the aforementioned items 1 to 7, represented by the following general formula (Ic):

$$R^1{}_n P X^1{}_m (=O)_k \qquad (Ic)$$

wherein, $R^1$ is alkoxy, aryl, or substituted aryl,
n is an integer of 0 to 2,
$X^1$ is a halogen,
m is an integer of 1 to 3, and
k is an integer of 0 to 1.
(9) A catalyst according to any one of the aforementioned items 3 to 6, wherein n is 0-3, M is nitrogen, h is 1, m is 1-3, k is 0, and two $R^1$ may be bound to each other such that the two $R^1$ and M may together form a ring.
(10) A catalyst according to any one of the aforementioned items 3 to 6 and 9, wherein $R^1$ is alkylcarbonyl, n is 2, M is nitrogen, h is 1, m is 1, k is 0, and the two $R^1$ and M together form a ring.
(11) A method of polymerization comprising a step of conducting a living radical polymerization, wherein the living radical polymerization step is conducted in the presence of a catalyst according to any of the aforementioned items 1 to 10.
(12) A method according to the aforementioned item 11, wherein the concentration of the catalyst is 0.75 weight % or less in the reaction solution.
(13) A method according to the aforementioned item 11 or 12, wherein the reaction temperature is 20° C. to 100° C.
(14) A method of conducting a living radical polymerization, comprising the steps of
reacting a radical generated from a radical initiator and a catalyst precursor compound to form an activated radical, and
polymerizing a monomer having a radical reactive unsaturated bond using the activated radical to obtain a polymer,
wherein the precursor compound comprises at least one central element selected from nitrogen or phosphorus, and at least one hydrogen atom which is bound to the central element, with the proviso that a halogen atom is not bound to the central element,
a radical generated from the radical initiator abstracts a hydrogen atom from the precursor compound to form the activated radical, and
the activated radical acts as a living radical catalyst of the polymerization reaction of the monomer.
(15) A method according to the aforementioned item 14, wherein the central element is pentavalent phosphorus.
(16) A method according to the aforementioned item 14 or 15, wherein the catalyst precursor compound is a phosphite.
(17) A method of synthesizing a block copolymer, wherein at least one block of the block copolymer is polymerized by a method according to anyone of the aforementioned items 11 to 16.
(18) Use of a catalyst in a living radical polymerization method, wherein the catalyst is a catalyst according to any one of the aforementioned items 1 to 6, and wherein the polymerization method comprises a step of conducting a living radical reaction in the presence of the catalyst.
(19) A method according to any one of the aforementioned items 11 to 17, wherein an organic halide having a carbon-halogen bond is used in the living radical polymerization reaction, and the halogen provided by the organic halide is used as a protecting group of the growing chain.
(20) A method according to the aforementioned item 19, wherein two or three carbon atoms are bound to the carbon atom to which the halogen in the organic halide is bound.

According to the present invention, further, the following methods are provided.

(21) A method of conducting a living radical polymerization, comprising a step of conducting a radical polymerization reaction of a monomer having a radically reactive unsaturated bond, in the presence of an organic halide having a carbon-halogen bond and a catalyst according to the aforementioned item 1.

(22) A method according to the aforementioned item 21, wherein the organic halide having carbon-halogen bond is a compound having the following general formula (II):

$$CR^2R^3R^4X^2 \quad\quad\quad (II)$$

wherein, $R^2$ and $R^3$ are independently halogen, hydrogen or alkyl, $R^4$ is halogen, hydrogen, alkyl, aryl, or cyano, $X^2$ is halogen, and the aforementioned monomer having radical reactive unsaturated bond is selected from the following monomers:

(meth)acrylic acid ester monomers, aromatic unsaturated monomers (styrene-type monomers), carbonyl group-containing unsaturated monomers, (meth)acrylonitrile, (meth)acrylamide-type monomers, diene-type monomers, vinyl ester monomers, N-vinyl monomers, (meth)acrylic acid monomer, vinyl halide monomers, and 1-olefin monomers.

Effects of the Invention

According to the present invention, a catalyst having high activity for use in a living radical polymerization and a polymerization method using the catalyst are provided. This catalyst has the advantage of having low toxicity. This catalyst has the advantage of having high solubility in a reaction solution. Therefore, it is not necessary to add a ligand to form a complex. As this catalyst has high activity, the polymerization reaction does not require a high temperature (for example, 110° C. or more). Further, the amount of the catalyst used can be reduced. Furthermore, the polymerization reaction does not require an expensive unique protecting group for protecting a polymer growing chain during a reaction. Additionally, molded products, which are obtained from the polymer obtained by the method of the present invention, have the advantage in which color or odor does not substantially occur during the molding process.

As described above, according to the present invention, a living radical polymerization method, which is significantly more environment-friendly and economically advantageous than conventional methods, has been realized.

THE BEST MODE FOR CARRYING OUT THE INVENTION

Figure 1A:
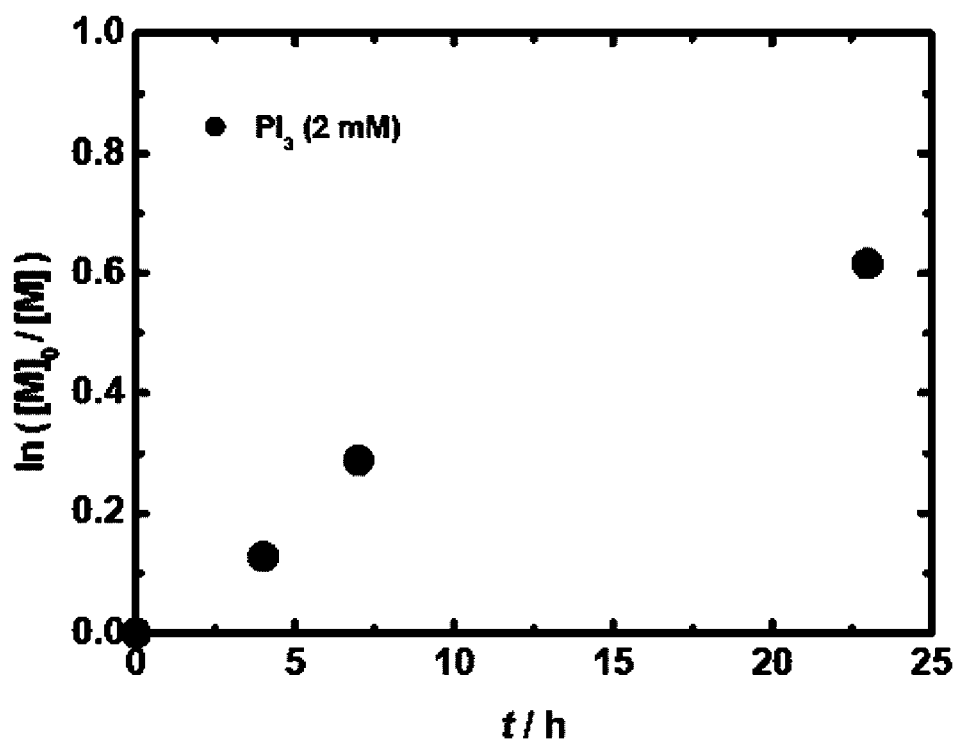
FIG. 1A is a graph showing the changes over time in the monomer concentration during styrene polymerization (styrene/PE-I/DCP/PI$_3$ (100° C.)). The graph shows the values of entry 2 (PI$_3$, 2 mM) as given in Table 1.

Hereinbelow, the present invention will be explained in detail.

(General Terms)

Hereinafter, the terms, which are particularly used in the present specification, will be explained.

In the present specification, an "alkyl" refers to a monovalent group which is generated after a chain or cyclic aliphatic hydrocarbon (alkane) loses a hydrogen atom. In the cases of a chain alkyl group, the alkyl group is generally represented by $C_kH_{2k+1}$— (wherein, k is a positive integer). A chain alkyl group may be a straight chain or branched chain. A cyclic alkyl group may be consisted of a cyclic structure. A cyclic alkyl group may have a structure in which a chain alkyl group is linked to the cyclic structure. An alkyl group may have an arbitrary natural number of carbon atoms. Preferably, an alkyl group has 1 to 30 carbon atoms. More preferably, an alkyl group has 1 to 20 carbon atoms.

In the present specification, a "lower alkyl" refers to an alkyl group having a relatively small number of carbon atoms. Preferably, a lower alkyl is a $C_{1-10}$ alkyl group. More preferably, a lower alkyl is a $C_{1-5}$ alkyl group. Further preferably, a lower alkyl is a $C_{1-3}$ alkyl group. For instance, specific examples include methyl, ethyl, propyl and isopropyl.

In the present specification, an "alkoxy" refers to a group in which an oxygen atom is bound to the aforementioned alkyl group. That is, when the alkyl group is represented by R—, the alkoxy refers to a group represented by RO—. A chain alkoxy group may be a straight chain or branched chain. Cyclic alkoxy may be composed only of a cyclic structure, or may have a structure formed from a cyclic structure further linked with chain alkyl. The number of carbon atoms in the alkoxy may be any natural number. The number of carbon atoms is preferably from 1 to 30, and more preferably from 1 to 20.

In the present specification, a "lower alkoxy" refers to an alkoxy group having relatively fewer carbon atoms. The lower alkoxy is preferably $C_{1-10}$ alkoxy, more preferably $C_{1-5}$ alkoxy, and even more preferably $C_{1-3}$ alkoxy. Specific examples thereof include methoxy, ethoxy, butoxy, isopropoxy, and the like.

In the present specification, an "alkylcarboxyl" refers to a group in which a carboxyl group is bound to the aforementioned alkyl group. That is, when the alkyl group is represented by R—, the alkylcarboxyl refers to a group represented by RCOO—. A chain alkylcarboxyl group may be a straight chain or branched chain. A cyclic alkylcarboxyl group may be composed only of a cyclic structure, or may have a structure formed from a cyclic structure further linked with chain alkyl. The number of carbon atoms in the alkylcarboxyl may be any natural number. The number of carbon atoms is preferably from 1 to 30, and more preferably from 1 to 20.

In the present specification, a "lower alkylcarboxyl" refers to an alkylcarboxyl group having relatively fewer carbon atoms. The lower alkylcarboxyl is preferably $C_{1-10}$ alkylcarboxyl, more preferably $C_{1-5}$ alkylcarboxyl, and even more preferably $C_{1-3}$ alkylcarboxyl.

In the present specification, an "alkylcarbonyl" refers to a group in which a carbonyl group is bound to the aforementioned alkyl group. That is, when the alkyl group is represented by R—, the alkylcarbonyl refers to a group represented by RCO—. A chain alkylcarbonyl group may be a straight chain or branched chain. Cyclic alkylcarbonyl may be composed only of a cyclic structure, or may have a structure formed from a cyclic structure further linked with chain alkyl. The number of carbon atoms in the alkylcarbonyl may be any natural number. The number of carbon atoms is preferably from 1 to 30, and more preferably from 1 to 20.

In the present specification, a "lower alkylcarbonyl" refers to an alkylcarbonyl group having relatively fewer carbon atoms. The lower alkylcarbonyl is preferably $C_{1-10}$ alkylcarbonyl, more preferably $C_{1-5}$ alkylcarbonyl, and even more preferably $C_{1-3}$ alkylcarbonyl.

In the present specification, a "haloalkyl" refers to a group in which a hydrogen atom of the aforementioned alkyl group is substituted with a halogen atom. A chain haloalkyl group may be a straight chain or branched chain. A cyclic haloalkyl group may be composed only of a cyclic structure, or may have a structure formed from a cyclic structure further linked with chain alkyl. The number of carbon atoms in the haloalkyl may be any natural number. The number of carbon atoms is preferably from 1 to 30, and more preferably from 1 to 20. In the haloalkyl, all of the hydrogen atoms may be substituted with halogen, or only some of the hydrogen atoms may be substituted.

In the present specification, a "lower haloalkyl" refers to a haloalkyl group having relatively fewer carbon atoms. The lower haloalkyl is preferably $C_{1-10}$ haloalkyl, more preferably $C_{1-5}$ haloalkyl, and even more preferably $C_{1-3}$ haloalkyl. Specific examples of a preferable lower haloalkyl group include a trifluoromethyl group, and the like.

In the present specification, a "substituted alkyl" refers to a group in which a hydrogen atom of an alkyl group is substituted with a substituent. Such a substituent includes aryl, cyano and the like.

In the present specification, a "halogenated substituted alkyl" refers to a compound in which a hydrogen atom of an alkyl group is substituted with a halogen, and another hydrogen atom of the alkyl group is substituted with another substituent. For, example, such another substituent includes an aryl group, a cyano group and the like.

In the present specification, an "aryl" refers to a group which is generated after a hydrogen atom, which is bound to a ring of an aromatic hydrocarbon, is removed. Specifically, for example, an aryl includes a phenyl group, naphthyl group, anthracenyl group, and the like.

In the present specification, a "substituted aryl" refers to a group which is generated after a substituent binds to an aryl group.

In the present specification, a "halogen" refers to a monovalent radical of an element, which belongs to the 7B group of the periodic table, such as a fluorine (F), chlorine (Cl), bromine (Br) and iodine (I).

In the present specification, a "living radical polymerization" refers to a polymerization reaction, in which a chain transfer reaction does not substantially occur in a radical polymerization reaction and a termination reaction does not substantially occur in the radical polymerization reaction, and the growing chain end maintains the activity even after the monomers have exhaustively reacted. According to this polymerization reaction, after completion of a polymerization reaction, a terminal of the generated polymer maintains the polymerization activity. If a monomer is added, then it is possible to start the polymerization reaction again.

A living radical polymerization is characterized in that, for example, a polymer having an arbitrary average molecular weight can be synthesized by adjusting the ratio of concentrations of a monomer and polymerization initiator, and the generated polymer has very narrow molecular weight distribution, and can be applied to a block copolymer. It is noted that a living radical polymerization is sometimes abbreviated as "LRP".

In the present specification, a "central element" refers to an atom in the compound of the catalyst, which is bound to a halogen atom and contributes mainly to the catalytic action. The "central element" has the same meaning as the term "central metal", which is used in the prior art. However, germanium, which can be used in the present invention, is generally a semiconductor and is not generally classified as a metal. Therefore, in order to avoid misunderstanding, the term "central element" is used in place of the term "central metal" in the prior art.

Hereinafter, the present invention will be explained in detail.

(Catalyst)

According to the present invention, a compound, which has a central element of nitrogen or phosphorus, is used as a catalyst for use in a living radical polymerization method.

According to the present invention, the catalyst can be used in combination with an organic halide having a carbon-halogen bond, which is used as a kind of dormant species. The catalyst abstracts halogen from this organic halide at the time of the living radical polymerization, and generates a radical. Therefore, according to the present invention, the catalyst detaches a group of the compound used as a dormant species, which group suppresses a growing reaction, and converts the compound into an active species, thereby controlling the growing reaction. It should be noted that the dormant species is not limited to organic halogen.

It is noted that Patent Document 2 describes in its claim 1 that a combination of a hydrido rhenium complex and a halogenated hydrocarbon is a catalyst for radical living polymerization. However, since the halogenated hydrocarbon described in Patent Document 2 is not a catalyst for living radical polymerization but corresponds to a dormant species, the halogenated hydrocarbon described in Patent Document 2 is distinguished from catalysts.

The catalyst compound has at least one central element. In one preferred embodiment, the compound has one central element. However, the compound may have two or more central elements.

The central element is selected from nitrogen or phosphorus, depending on the use of the polymer and the like. For example, when it is not desirable that a conductive material remains in the polymer (for example, electronic material such as resist material or organic electroluminescence material), it is preferable to use a catalyst having no electric conductivity.

Further, nitrogen and phosphorus are also advantageous in terms of toxicity to the human body and influence to the environment. Therefore, even if some conductive materials are permitted to remain, it is much more advantageous to use a catalyst containing nitrogen or phosphorus than a transition metal complex catalyst, which was used in prior art.

Furthermore, the catalyst of the present invention has the characteristic that a small amount of the catalyst can exert its catalytic action. Therefore, as described above, it was made possible that material having little toxicity to the human body and little influence to the environment is used in a small amount. The catalyst of the present invention is much superior to a conventional catalyst.

(Halogen Atom in the Catalyst)

In the aforementioned compound of the catalyst, at least one halogen atom is bound to the central element. If the aforementioned compound of the catalyst has two or more central elements, at least one halogen atom is bound to each of the central element. The halogen atom is preferably, chlorine, bromine or iodine. More preferably, the halogen atom is iodine. Two or more halogen atoms may exist in one molecule. For example, two atoms, three atoms, or four atoms may exist in one molecule. More than four atoms may exist in one molecule. Preferably, two to four halogen atoms exist in one molecule. When there are two or more halogen atoms in one molecule, the plurality of halogen atoms may be the same or different.

(Groups Other than Halogen in the Catalyst)

If necessary, the compound of the catalyst may have a group other than halogen. For example, it is possible that an arbitrary organic group or inorganic group is bound to the central element.

Such a group may be an organic group or an inorganic group. An organic group includes an aryl group, substituted aryl group, alkoxy group (methoxy group and the like), ester group (aliphatic carboxylic acid ester and the like), haloalkyl group (trifluoromethyl group and the like), and the like.

Further, the inorganic group includes a hydroxyl group, amino group, cyano group and the like.

In a substituted aryl group, the substituent, which is bound to the aryl group, includes an alkyl group, alkyloxy group and the like. This alkyl is preferably a lower alkyl group, more preferably, a $C_1$ to $C_5$ alkyl group. This alkyl is further preferably a $C_1$ to $C_3$ alkyl group, and particularly preferably, a methyl group. The alkyl group in the alkyloxy group is preferably a lower alkyl group, more preferably a $C_1$ to $C_5$ alkyl group, further preferably a $C_1$ to $C_3$ alkyl group, and particularly preferably a methyl group. Thus, in one embodiment, an organic group, which is bound to the central element, is a phenyl group, lower alkyl phenyl group or lower alkyloxyphenyl group.

There is no limitation for the number of the aforementioned organic groups and inorganic groups. However, the number of the aforementioned organic groups or inorganic groups is preferably three or less, and more preferably one.

It is noted that there is no limitation for the number of the substituents of the substituted aryl group. However, the number of the substituents of the substituted aryl group is preferably 1 to 3, and more preferably 1 to 2, and further preferably 1.

Regarding the position of the substituent in the substituted aryl group, an arbitrary position may be selected. When the aryl group is a phenyl group (that is, the substituted aryl group is a substituted phenyl group), the position of the substituent may be ortho, meta, or para with respect to the central element. Preferably, the position is at para.

In one embodiment, the compound of the following general formula (Ia) can be used as a catalyst.

[Chemical formula 9]

 (Ia)

wherein $R^1$ is alkyl, alkylcarboxyl, alkylcarbonyl, haloalkyl, hydroxyl group, amino group, cyano group, alkoxy, aryl, or substituted aryl. Preferably, $R^1$ is alkyl, alkoxy, aryl, or substituted aryl.

Here, two $R^{1}$' may be bound to each other such that the two $R^{1}$' and one M may together form a ring structure.

n is an integer from 0 to 4×h. For example, when h is 1, n is from 0 to 4, and when h is 2, n is from 0 to 8. Preferably, n is from 0 to 2×h. When n is an integer from 2 to 4×h, $R^1$'s may be all different, or two or more of $R^1$'s among them may be identical. It is also acceptable that all of $R^1$'s are identical.

M is the central element, and is nitrogen or phosphorus.

h is an integer of 1 or greater. For practical purposes, according to one embodiment, h is 10 or less. h is preferably 6 or less, more preferably 5 or less, even more preferably 4 or less, and still more preferably 3 or less. Particularly preferably, h is 2 or less, and most preferably 1. If h is too large, the synthesis of the compound may become difficult. As a specific example for h being 2, there may be a compound having a structure of two phosphorus atoms linked to each other (—P═P—) as will be described later, or the like. Specific examples for h being 3 or more include (—P═P—P═P—), and the like.

When h is an integer of 2 or greater, preferably, the plural atoms "M" are all identical elements.

When h is an integer of 2 or greater, preferably, the plural atoms "M" are linked via a single bond, a double bond, or a triple bond.

When h is an integer of 2 or greater, the substituent $R^1$, halogen $X^1$, and Z may be each independently bound to any one of the plural atoms of M.

When h is 2, the structure may have two atoms of "M" linked together. For example, structures of "-M-M-", "-M═M-" and "-M≡M-" can be adopted. For example, if the central element is phosphorus, a structure having two phosphorus atoms linked to each other (—P═P—) can be adopted.

When h is 2, the substituent $R^1$, halogen $X^1$, and Z may be each independently bound to any one of the two atoms of "M"

When h is 3 or greater, the h atoms of "M" may be linked in a form of a straight chain, or may be linked in a branched chain. The linkage may also be in a cyclic form.

In the general formula (Ia), $X^1$ is halogen, Z is oxygen, nitrogen or sulfur and is bound to M, and the bond between Z and M:

[Chemical formula 10]

is a double bond or a triple bond. A double bond or a triple bond is preferable. When Z is oxygen or sulfur, a double bond is preferable. When Z is nitrogen, a triple bond is preferable.

m is an integer from 1 to 5×h. For example, when h is 1, m is from 1 to 5, and when h is 2, n is from 1 to 10. Preferably, m is from 2 to 5×h. When m is 2, the two $X^1$'s may be different or may be identical. When m is 3, $X^1$'s may be all identical, may be composed of two kinds of halogen, or may be composed of three kinds of halogen. When m is 4, $X^1$'s may be all identical, may be composed of two kinds of halogen, may be composed of three kinds of halogen, or may be composed of four kinds of halogen. When m is 5, $X^1$'s may be all identical, may be composed of two kinds of halogen, may be composed of three kinds of halogen, may be composed of four kinds of halogen, or may be composed of five kinds of halogen. When m is from 2 to 5, it is preferable that $X^1$'s be all identical.

k is an integer from 0 to 2×h. For example, when h is 1, k is from 0 to 2, and when h is 2, n is from 0 to 4. When Z is nitrogen, k is preferably an integer from 0 to 1.

When M is phosphorus or nitrogen, it is preferable that m+n=3 or 5.

In the general formula (Ia), generally, n, h, m and k are selected such that the overall valence of the chemical formula (Ia) is balanced.

Furthermore, in the formula (Ia), generally, all of $R^1$, $X^1$ and Z are bound to M.

As a specific example, in the case of a structure having two atoms of M linked together (-M=M-), this compound can have, for example, a structure of $R^1$-M=M-$X^1$.

According to one embodiment, a compound of the following general formula (Ib) can be used as a catalyst:

[Chemical formula 11]

$R^1{}_nP_hX^1{}_m($  $Z)_k$  (Ib)

wherein, $R^1$ is alkyl, alkoxy, aryl, or substituted aryl, and is preferably alkyl, alkoxy, aryl, or substituted aryl.

n is an integer from 0 to 4×h. For example, when h is 1, n is from 0 to 4, and when h is 2, n is from 0 to 8. Preferably, n is from 0 to 2×h. If n is an integer from 2 to 4×h, $R^1$'s may be all different from each other, or two or more of $R^1$'s may be identical. It is also acceptable that all of $R^1$'s are identical.

P is phosphorus as the central element.

h is an integer from 1 to 4. For practical purposes, according to one embodiment, h is 10 or less. h is preferably 6 or less, more preferably 5 or less, even more preferably 4 or less, and still more preferably 3 or less. Particularly preferably, h is 2 or less, and is most preferably 1. When h is too large, synthesis of the compound may be difficult. As a specific example for h being 2, there may be a compound having a structure of two phosphorus atoms linked to each other (—P=P—) as will be described later, or the like. Specific examples for h being 3 or more include (—P=P—P=P—), and the like.

When h is an integer of 2 or greater, preferably, the plural phosphorus atoms are linked via a single bond, a double bond, or a triple bond.

When h is an integer of 2 or greater, the substituent $R^1$, halogen $X^1$, and Z may be each independently bound to any one of the plural phosphorus atoms.

When h is 2, a structure having two phosphorus atoms linked together can be adopted. For example, structures of "—P—P—", "—P=P—" and "—P≡P—" can be adopted.

When h is 2, the substituent $R^1$, halogen $X^1$, and Z may be each independently bound to anyone of the two phosphorus atoms.

When h is 3 or greater, h phosphorus atoms may be linked in a form of a straight chain, or may be linked in a branched chain. The linkage may also be in a cyclic form.

In the general formula (Ib), $X^1$ is halogen.

Z is oxygen or nitrogen, and is bound to P, and the bond between Z and M:

[Chemical formula 12]

a double bond or triple bond.

m is an integer from 1 to 5×h. For example, when h is 1, m is from 1 to 5, and when h is 2, n is from 1 to 10. Preferably, m is from 2 to 5×h. When m is 2, the two $X^1$'s may be different or may be identical. When m is 3, $X^1$'s may be all identical, may be composed of two kinds of halogen, or may be composed of three kinds of halogen. When m is 4, $X^1$'s may be all identical, may be composed of two kinds of halogen, may be composed of three kinds of halogen, or may be composed of four kinds of halogen. When m is 5, $X^1$'s may be all identical, may be composed of two kinds of halogen, may be composed of three kinds of halogen, may be composed of four kinds of halogen, or may be composed of five kinds of halogen. When m is from 2 to 5×h, it is preferable that $X^1$'s be all identical.

k is an integer from 0 to 2×h. For example, when h is 1, k is from 0 to 2, and when h is 2, n is from 0 to 4.

It is preferable that m+n=3 or 5.

In the general formula (Ib), n, h, m and k are usually selected such that the overall valences of the chemical formula (Ib) are balanced.

Further, in the general formula (Ib), generally, all of $R^1$, $X^1$ and Z are bound to the phosphorus (P).

As a specific example, in the case of a structure having two phosphorus atoms linked together (—P=P—), this compound can have, for example, a structure of $R^1$—P=P—$X^1$.

It is noted that in the explanations given above, the formula (Ia) and the formula (Ib) have been separately explained for convenience, but the descriptions in the present specification will be directed to both of the formula (Ia) and the formula (Ib), unless stated otherwise.

According to one preferred embodiment, a compound represented by the general formula (Ic) can be used:

$R^1{}_nPX^1{}_m(=O)_k$  (Ic)

wherein $R^1$ is alkoxy, aryl or substituted aryl, and is preferably alkoxy or aryl and more preferably lower alkoxy or phenyl.

n is an integer from 0 to 2. When P is trivalent, n is preferably 0, and if P is pentavalent, n is preferably 2.

$X^1$ is halogen, and is preferably iodine.

k is an integer of 0 to 1. When P is trivalent, k is preferably 0. When P is pentavalent, k is preferably 1.

(Catalyst Compound Having Phosphorus as a Central Element)

As the catalyst compound having phosphorus as a central element, arbitrary known compounds falling under the definition described above can be used. Specific preferable examples of the catalyst compound having phosphorus as the central element include halogenated phosphorus (for example, phosphorus triiodide and phosphorus pentaiodide), halogenated phosphine ($R^1{}_2PX$ or $R^1PX_2$, for example, diphenylphosphine iodide ($Ph_2PI$)), halogenated phosphorous acid derivatives ($R^1{}_2PX(=O)$, $R^1PX_2(=O)$ or $PX_3(=O)$, for example, diethyl iodophosphite $((C_2H_5O)_2PI(=O))$, ethylphenyl phosphinate $(Ph(C_2H_5O)_2PI(=O))$, diphenylphosphine oxide $(Ph_2PI(=O))$, and the like.

(Catalyst Compound Having Nitrogen as a Central Element)

As the catalyst compound having nitrogen as a central element, arbitrary known compounds falling under the definition described above can be used.

For example, a compound represented by the formula Ia, wherein M is nitrogen, can be used.

In this regard, n is preferably from 0 to 3, and more preferably from 0 to 2. h is preferably 1, and m is preferably from 1 to 3. k is preferably 0.

Further, in the formula Ia, when M is nitrogen, two $R^{1\prime}$ may be bound to each other such that two $R^{1\prime}$ and M together form a ring. In this case, it is preferable that both the two $R^{1\prime}$ be alkylcarbonyl, vinylcarbonyl or phenylcarbonyl.

Specific preferable examples of the catalyst compound having nitrogen as a central element include halogenated nitrogen (for example, nitrogen triiodide), halogenated amine or halogenated imide ($R^1{}_2NX$ or $R^1NX_2$, for example, iododiphenylamine ($Ph_2NI$), iodosuccinimide (($CH_2)_2(C=O)_2NI$)) (NIS), iodomaleimide (($CH)_2(C=O)_2NI$)), iodophthalimide ($C_6H_4(C=O)_2NI$)), or derivatives thereof (compounds having one or plural substituents bound to the above-listed compounds), and the like.

(Manufacturing Method of the Catalyst)

Most of the compounds, which are used as catalyst of the present invention, are known. The compounds, which are commercially available from reagents sales company or the like, can directly be used. Alternatively, the compounds can be synthesized by using known methods.

When a compound having an organic group $R^1$ (for example, alkyl, alkoxy, aryl or substituted aryl) bound to phosphorus, is to be used as the catalyst, a commercially available product can be used as such a compound. Alternatively, such a compound can be synthesized by a known method. For example, a compound having halogen and an organic group $R^1$ bound to phosphorus can be synthesized. For example, $R^1{}_2PI(=O)$ is synthesized by a method of reacting $R^1{}_2PH(=O)$ with iodoform, iodine ($I_2$) or N-iodosuccinimide. Alternatively, a compound having halogen and an organic group $R^1$ bound to phosphorus can be synthesized by the method described in Chemical Communication 797-798 (2001) or in Synthetic Communication 33, 3851-3859 (2003).

When a compound having an organic group $R^1$ (for example, alkyl, alkoxy, aryl, substituted aryl, alkylcarbonyl, vinylcarbonyl or phenylcarbonyl) bound to nitrogen, is to be used as the catalyst, a commercially available product can be used as such a compound. Alternatively, such a compound can be synthesized by a known method. For example, a compound having halogen and an organic group $R^1$ bound to nitrogen can be synthesized. For example, $R^1{}_2NI$ is synthesized by a method of reacting $R^1{}_2NH$ with iodine while using $Ag_2O$ as a catalyst. Alternatively, a compound having halogen and an organic group $R^1$ bound to nitrogen can be synthesized by the method described in Journal of the American Chemical Society 75, 3494-3495 (1953).

(Amount of the Catalyst Used)

The catalyst of the present invention has very high activity and can catalyze a living radical polymerization in a small amount. Hereinafter, the amount of use of the catalyst will be described, but the amount employed in the case of using a catalyst precursor is also similar to the case of the amount of catalyst.

In the method of the present invention, the compound that is used as the catalyst or catalyst precursor may be in some cases a liquid compound that can be used as a solvent in theory. However, under the circumstance that such a compound is used as a catalyst or a catalyst precursor, there is no need to use the compound in such a large amount as to provide an effect as a solvent. Therefore, the amount of use of the catalyst or catalyst precursor can be limited to an amount smaller than the so-called "solvent amount" (that is, an amount needed to achieve the effect as a solvent). According to the method of the present invention, the catalyst or catalyst precursor may be used in an amount that is sufficient to catalyze the living radical polymerization as described above, and there is no need to add more than that.

Specifically, for example, in a preferred embodiment, it is possible that the catalyst in an amount of 10 millimoles (mM) or less is used to one liter of reaction solution. In a further preferred embodiment, it is possible that the catalyst in an amount of 5 millimoles (mM) or less is used to one liter of reaction solution. It is also possible that the catalyst in an amount of 2 millimoles (mM) or less is used to one liter of reaction solution. Further, it is possible that the catalyst in an amount of 1 millimole (mM) or less is used to one liter of reaction solution. It is also possible that the catalyst in an amount of 0.5 millimoles (mM) or less is used to one liter of reaction solution. Regarding the weight of the catalyst, the amount of the used catalyst can be 1 weight % or less in a reaction solution. In a preferred embodiment, it is possible to limit the amount to 0.75% by weight or less, and it is also possible to limit the amount to 0.70% by weight or less. In a more preferred embodiment, it is possible to limit the amount to 0.5% by weight or less, and is also possible to limit the amount to 0.2% by weight or less. It is further possible to limit the amount to 0.1% by weight or less, and is possible to limit the amount to 0.05% by weight or less. For example, in the case of a phosphorus catalyst, the amount can be limited to 0.75% by weight or less, and can also be limited to 0.70% by weight or less. In an even more preferred embodiment, the amount can be limited to 0.5% by weight or less, can be limited to 0.2% by weight or less, can be further limited to 0.1% by weight or less, and can also be limited to 0.05% by weight or less. In other words, the amount can be limited to a "remarkably" smaller amount than an amount needed to provide an effect as a solvent.

Further, the amount of the catalyst used is preferably 0.02 millimoles or more to one liter of a reaction solution. More preferably, the amount is 0.1 millimoles or more to one liter of a reaction solution. Further preferably, the amount is 0.5 millimoles or more to one liter of a reaction solution. Regarding the weight of the catalyst, preferably, an amount of the catalyst used is 0.001 weight % or more in a reaction solution. More preferably, the amount is 0.005 weight % or more in a reaction solution. Further preferably, the amount is 0.02 weight % or more in a reaction solution. If the amount of the catalyst used is too small, then the molecular weight distribution is likely to be broad.

According to one embodiment, in the method of living radical polymerization of the present invention, it is possible to carry out the living radical polymerization satisfactorily, even without using a catalyst for living radical polymerization or catalyst precursor compound other than the catalyst or catalyst precursor compound having a phosphorus atom or a nitrogen atom as the central element (hereinafter, "other-type catalyst or other-type catalyst precursor compound") in combination. However, if necessary, it is also possible to use an other-type catalyst or other-type catalyst precursor compound in combination. In that case, it is preferable to use a larger amount of the catalyst or catalyst precursor compound that has a phosphorus atom or a nitrogen atom as the central element, and to use a smaller amount of the other-type catalyst or other-type catalyst precursor compound, in order to make the best possible use of the advantage of the catalyst or catalyst precursor compound that has a phosphorus atom or a nitrogen atom as the central element. Under such circumstances, the amount of use of the other-type catalyst or other-type catalyst precursor compound can be limited to 100 parts by weight or less, can be limited to 50 parts by weight or less, and can also be limited to 20 parts by weight or less, 10 parts by weight or less, 5 parts by weight or less, 2 parts by weight or less, 1 part by weight or less, 0.5 parts by weight or less, 0.2 parts by weight or less, or 0.1 parts by weight or less, relative to 100 parts by weight or less of the catalyst or catalyst precursor compound that has a phosphorus atom or a nitrogen atom as the central element.

(Protecting Group)

The method of the present invention uses a protecting group for protecting the growing chain during the living radical polymerization reaction. Regarding the protecting group, various known protecting groups, which were conventionally used as protecting groups in a living radical polymerization, can be used. In this regard, it is preferable to use halogen as a protecting group. As described above regarding prior art, when a special protecting group is used, there are disadvantages such as the disadvantage that the protecting group is very expensive.

(Organic Halide (Dormant Species))

According to the method of the present invention, preferably, an organic halide, which has a carbon-halogen bond, is added to the reaction material. Halogen, which is attached to the growing chain by the organic halide, is used as a protecting group. Such organic halides are relatively inexpensive. Therefore, it is more advantageous than other known compounds which are used as protecting groups in a living radical polymerization. Further, if necessary, dormant species in which halogen is bound to an element other than carbon can be used.

The organic halide is a compound which has at least one carbon-halogen bond in the molecule. There is no other particular limitation to the organic halide. Generally, the organic halide preferably has one or two halogen atoms in the molecule.

The number of hydrogen atoms carried by the carbon to which the halogen atom of the organic halide is bound (hereinafter, referred to as "1-position carbon of the organic halide" for convenience), is preferably two or less, and more preferably one or less, and it is even more preferable that the carbon does not have any hydrogen atom. Further, the number of halogen atoms bound to the 1-position carbon of the organic halide is preferably three or less, more preferably two or less, and even more preferably one. Particularly, when the halogen atom bound to the 1-position carbon of the organic halide is a chlorine atom, the number of the chlorine atoms is very preferably three or less, more preferably two or less, and particularly preferably one.

It is preferable that one or more carbon atoms be bound to the 1-position carbon of the organic halide, and it is particularly preferable that two or three carbon atoms be bound thereto.

The halogen atom in the organic halide may be the same as the halogen atom in the catalyst. The halogen atom in the organic halide may be different from the halogen atom in the catalyst, since even if the halogen atom of the organic halide and the halogen atom of the catalyst are different, it is possible that the halogen atom of the organic halide and the halogen atom of the catalyst are exchanged. However, if the halogen atom in the organic halide and the halogen atom in the catalyst are the same, it is easier to exchange the halogen atoms between the organic halide and the compound of the catalyst. Therefore, preferably, the halogen atom in the organic halide and the halogen atom in the catalyst are the same.

In one embodiment, the organic halide has the following general formula (II):

$$CR^2R^3R^4X^2 \qquad (II)$$

wherein, $R^2$ is halogen, hydrogen or alkyl. Preferably, $R^2$ is hydrogen or lower alkyl. More preferably, $R^2$ is hydrogen or methyl.

$R^3$ may be the same as $R^2$, or may be different from $R^2$. $R^3$ is halogen, hydrogen or alkyl. Preferably, $R^3$ is hydrogen or lower alkyl. More preferably, $R^3$ is hydrogen or methyl.

$R^4$ is halogen, hydrogen, alkyl, aryl, or cyano. Preferably, $R^4$ is aryl or cyano. When $R^4$ is halogen, hydrogen or alkyl, $R^4$ may be the same as $R^2$ or $R^3$, or may be different from $R^2$ or $R^3$.

$X^2$ is halogen. Preferably, $X^2$ is chlorine, bromine or iodine. When there is a halogen in $R^2$ to $R^4$, $X^2$ may be the same as the halogen in $R^2$ to $R^4$, or may be different from the halogen in $R^2$ to $R^4$. In one embodiment, $X^2$ may be the same halogen as that contained in the compound of the catalyst. $X^2$ may be different from the halogen contained in the catalyst of the compound.

The aforementioned $R^2$ to $R^4$ and $X^2$ are selected independently from each other. However, preferably, there is no halogen atom or one halogen atom in $R^2$ to $R^4$ (that is, the organic halide contains one or two halogen atoms in the compound).

In one preferable embodiment, the organic halide is halogenated alkyl or halogenated substituted alkyl. More preferably, the organic halide is halogenated substituted alkyl. In this regard, preferably, the alkyl is a secondary alkyl. More preferably, the alkyl is a tertiary alkyl.

In the halogenated alkyl or halogenated substituted alkyl, the number of carbon atoms in the alkyl is preferably 2 or 3. Therefore, further preferably, the organic halide is halogenated substituted ethyl or halogenated substituted isopropyl. The substituent in the halogenated substituted alkyl includes, for example, phenyl, cyano and the like.

Preferable specific examples of the organic halide include $CH(CH_3)(Ph)I$ and $C(CH_3)_2(CN)I$, as shown in the following chemical formulas.

[Chemical formula 13]

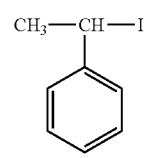

(PE-I)

[Chemical formula 2]

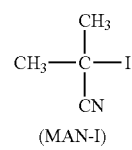

(MAN-I)

Other specific examples of the organic halide include, for example, methyl chloride, methylene chloride, chloroform, chloroethane, dichloroethane, trichloroethane, bromomethyl, dibromomethane, bromoform, bromoethane, dibromoethane, tribromoethane, tetrabromoethane, bromotrichloromethane, dichlorodibromomethane, chlorotribromomethane, iodotrichloromethane, dichlorodiiodomethane, iodotribromomethane, dibromodiiodomethane, bromotriiodomethane, iodoform, diiodomethane, methyl iodide, isopropyl chloride, t-butyl chloride, isopropyl bromide, t-butyl bromide, triiodoethane, ethyl iodide, diiodopropane, isopropyl iodide, t-butyl iodide, bromodichloroethane, chlorodibromoethane, bromochloroethane, iododichloroethane, chlorodiiodoethane, diiodopropane, chloroiodopropane, iododibromoethane, bromoiodopropane, 2-iodo-2-polyethyleneglycosylpropane, 2-iodo-2-amidinopropane, 2-iodo-2-cyanobutane, 2-iodo-2-cyano-4-methylpentane, 2-iodo-2-cyano-4-methyl-4-methoxypentane, 4-iodo-4-cyano-pentanoic acid, methyl-2-iodo-isobutylate, 2-iodo-2-methylpropane amide, 2-iodo-2,4-dimethylpentane, 2-iodo-2-cyanobutanol, 4-methylpentane, cyano-4-methylpentane, 2-iodo-2-methyl-N-(2-hydroxyethyl)propionamide 4-methyl pentane, 2-iodo-2-methyl-N-(1,1-bis(hydroxymethyl)-2-hydroxyethyl)propionamide 4-methylpentane, 2-iodo-2-(2-imidazolin-2-yl) propane, 2-iodo-2-(2-(5-methyl-2-imidazolin-2-yl)propane, and the like. One of these halide compounds may be used alone, or a combination of two or more of the halide compounds may be used.

According to the method of the present invention, since the organic halide is not to be used as a solvent, it is not necessary to use the organic halide in such a large amount as to provide an effect as a solvent. Thus, the amount of use of the organic halide can be limited to an amount smaller than the so-called "solvent amount" (that is, an amount needed to achieve the effect as a solvent). In the method of the present invention, since the organic halide is used to provide halogen as a protecting group to a growing chain as described above, it is sufficient so long as a sufficient amount of halogen can be provided to the growing chains in the reaction system. Specifically, for example, in the method of the present invention, the amount of the organic halide used is, preferably 0.05 moles or more relative to 1 mole of the radical polymerization initiator in the polymerization reaction system. More preferably, the amount is 0.5 moles or more relative to 1 mole of the radical polymerization initiator. Further preferably, the amount is 1 mole or more relative to 1 mole of the radical polymerization initiator. Further, preferably, the amount is 100 moles or less relative to 1 mole of the radical polymerization initiator in the polymerization system. More preferably, the amount is 30 moles or less relative to 1 mole of the radical polymerization initiator. Further preferably, the amount is 5 moles or less relative to 1 mole of the radical polymerization initiator. Additionally, the amount is preferably 0.001 moles or more relative to 1 mole of the vinyl-type monomer. More preferably, the amount is 0.005 moles or more relative to 1 mole of the vinyl-type monomer. Further, the amount is preferably 0.5 moles or less relative to 1 mole of the vinyl-type monomer. More preferably, the amount is 0.4 moles or less relative to 1 mole of the vinyl-type monomer. Further preferably, the amount is 0.3 moles or less relative to 1 mole of the vinyl-type monomer. Particularly preferably, the amount is 0.2 moles or less relative to 1 mole of the vinyl-type monomer. Most preferably, the amount is 0.1 moles or less relative to 1 mole of the vinyl-type monomer. Further, if necessary, the amount can be 0.07 moles or less, 0.05 moles or less, 0.03 moles or less, 0.02 moles or less, or 0.01 moles or less relative to 1 mole of the vinyl-type monomer.

Most of the aforementioned organic halides are known compounds. Reagents, which are sold from reagent sellers or the like, can directly be used. Alternatively, the compounds may be synthesized with conventionally known synthesizing methods.

In regard to the organic halide, it is also possible that raw materials thereof are introduced so as to generate the organic halide in situ during the polymerization, such that the product can be used as the organic halide for this polymerization method. For example, azobis (isobutyronitrile) and iodine ($I_2$) can be introduced as raw materials, CP—I (the chemical formula is as described above), which is an alkyl iodide, can be generated in situ during the polymerization, and this product can be used as the alkyl iodide for this polymerization method.

As for the organic halide, it is also possible to use a compound that is immobilized at a surface such as an inorganic or organic solid surface, or an inorganic or organic molecular surface. For example, an organic halide immobilized on a silicon substrate surface, a polymer film surface, an inorganic or organic microparticle surface, a pigment surface or the like, can be used. The immobilization can be achieved utilizing, for example, chemical binding, physical binding or the like.

(Monomer)

As a monomer, the polymerization method of the present invention uses a radical polymerizable monomer. A radical polymerizable monomer refers to a monomer having an unsaturated bond which may be subjected to a radical polymerization under the presence of an organic radical. Such an unsaturated bond may be a double bond or triple bond. That is, the polymerization method of the present invention can use an arbitrary monomer, which was conventionally known as a monomer for performing a living radical polymerization.

More specifically, the so-called vinyl monomers can be used. Vinyl monomer is a general name for monomers which are represented by the general formula "$CH_2=CR^5R^6$".

A monomer having the general formula in which $R^5$ is methyl, and $R^6$ is carboxylate, is referred to as a methacrylate-type monomer, and can preferably be used in the present invention.

Specific examples of the methacrylate-type monomer include methyl methacrylate, ethyl methacrylate, propyl methacrylate, n-butyl methacrylate, t-butyl methacrylate, hexyl methacrylate, 2-ethylhexyl methacrylate, nonyl methacrylate, benzyl methacrylate, cyclohexylmethacrylate, lauryl methacrylate, n-octyl methacrylate, 2-methoxyethyl methacrylate, butoxyethyl methacrylate, methoxytetraethyleneglycol methacrylate, 2-hydroxyethyl methacrylate, 2-hydroxypropyl methacrylate, 3-chloro-2-hydroxypropyl methacrylate, tetrahydrofurfuryl methacrylate, 2-hydroxy-3-phenoxypropyl methacrylate, diethyleneglycol methacrylate, polyethyleneglycol methacrylate, 2-(dimethylamino)ethyl methacrylate, and the like. Further, methacrylic acid can be used.

The aforementioned vinyl monomers having the aforementioned general formula in which $R^5$ is hydrogen and $R^6$ is carboxylate, are generally referred to as acrylic type monomers and can preferably be used in the present invention.

Specific examples of the acrylate-type monomer include methyl acrylate, ethyl acrylate, propyl acrylate, n-butyl acrylate, t-butyl acrylate, hexyl acrylate, 2-ethylhexyl acrylate, nonyl acrylate, benzyl acrylate, cyclohexyl acrylate, laurylacrylate, n-octylacrylate, 2-methoxyethyl acrylate, butoxyethyl acrylate, methoxytetraethyleneglycol acrylate, 2-hydroxyethyl acrylate, 2-hydroxypropyl acrylate, 3-chloro-2-hydroxypropyl acrylate, tetrahydrofurfuryl acrylate, 2-hydroxy-3-phenoxypropyl acrylate, diethyleneglycol acrylate, polyethyleneglycol acrylate, 2-(dimethylamino)ethyl acrylate, N,N-dimethylacrylamide, N-methyrolacrylamide, N-methyrolmethacrylamide, and the like. Further, an acrylic acid can be used.

A monomer having the aforementioned general formula of a vinyl monomer, in which $R^5$ is a hydrogen, and $R^6$ is phenyl, is styrene, which can be suitably used in the present invention. A monomer, in which $R^6$ is phenyl or a phenyl derivative, is referred to as a styrene derivative, which can suitably be used in the present invention. Specifically, such a monomer includes o-, m-, or p-methoxystyrene, o-, m-, or p-t-butoxystyrene, o-, m-, or p-chloromethylstyrene, o-, m-, or p-chlorostyrene, o-, m-, or p-hydroxystyrene, o-, m-, or p-styrenesulfonic acid and the like. Further, a monomer in which $R^6$ is aromatic, (for example, vinylnaphthalene) can be used.

A monomer having the aforementioned general formula of a vinyl monomer, in which $R^5$ is a hydrogen and $R^6$ is alkyl, is alkylene, which can be suitably used in the present invention.

In the present invention, monomers having two or more vinyl groups can be used. Specifically, for example, a diene-type compound (e.g., butadiene, isoprene and the like), a compound having two allyl groups (for example, diallyl isophthalate and the like), a dimethacrylate of a diol compound, a diacrylate of a diol compound, and the like, can be used.

Vinyl monomers other than those described above can also be used in the present invention. Specifically, for example, vinyl esters (for example, vinyl acetate, vinyl propionate, vinyl benzoate, vinyl acetate), styrene derivatives other than the aforementioned styrene derivatives (for example, α-methylstyrene), vinyl ketones (for example, vinyl methyl ketone, vinyl hexyl ketone, methyl isopropenyl ketone), N-vinyl compounds (for example, N-vinylpyrrolidone, N-vinyl pyrrole, N-vinyl carbazole, N-vinyl indole), (meth)acrylamide and its derivatives (for example, N-isopropyl acrylamide, N-isopropylmethacrylamide, N,N-dimethylacrylamide, N,N-dimethylmethacrylamide, N-methylolacrylamide, N-methylolmethacrylamide), acrylonitrile, methacrylonitrile, maleic acid and its derivatives (for example, maleic anhydride), halogenated vinyls (for example, vinyl chloride, vinylidene chloride, tetrachloroethylene, hexachloropropylene, vinyl fluoride), olefins (for example, ethylene, propylene, 1-hexene, cyclohexene), and the like.

One of these monomers may be used alone, or a combination of two or more of the monomers may be used.

There is no particular limitation to the combination of the aforementioned monomer and the catalyst of the present invention. A catalyst of the present invention, which is arbitrarily selected, may be used for a monomer, which is arbitrarily selected. However, regarding methacrylate-type monomers, a catalyst having a substituent having an aromatic ring, more specifically a catalyst having aryl or substituted aryl is more preferably used in terms of the reactivity, than the other catalysts.

(Radical Reaction Initiator)

In the living radical polymerization method of the present invention, if necessary, an adequate amount of a radical reaction initiator is used. Initiators, which are known as initiators to be used for a radical reaction, can be used as the radical reaction initiator. For example, azo-type radical reaction initiators and peroxide-type radical initiators can be used. Specific examples of the azo-type radical reaction initiators include, for example, azobis(isobutyronitrile). Among peroxides, organic peroxides are preferable. Specific examples of peroxide-type radical initiators include, for example, benzoylperoxide and dicumyl peroxide.

(Peroxide)

It should be noted that in the embodiment of using a hydride compound as the aforementioned catalyst precursor, an azo-type radical reaction initiator can be used as the radical reaction initiator, but when a peroxide-type radical initiator is used, the power of the peroxide abstracting hydrogen from the hydride compound is particularly strong, and thus it is preferable. The peroxide is preferably an organic peroxide. For example, in the case of using a catalyst precursor having phosphorus as the central element, it is preferable to use a peroxide-type radical initiator.

The amount of the radical initiator used is not particularly limited. However, preferably, the amount is 1 millimole or more to 1 liter of the reaction solution. More preferably, the amount is 5 millimoles or more to 1 liter of the reaction solution. Further preferably, the amount is 10 millimoles or more to 1 liter of the reaction solution. Additionally, the amount is preferably 500 millimoles or less to 1 liter of the reaction solution. More preferably, the amount is 100 millimoles or less to 1 liter of the reaction solution. Further preferably, the amount is 50 millimoles or less to 1 liter of the reaction solution.

(Solvents)

When a reaction mixture of a monomer and other ingredients is liquid at the reaction temperature, it is not always necessary to use a solvent. If necessary, a solvent may be used. Solvents, which were conventionally used for a living radical polymerization, can be used in the method of the present invention. When a solvent is to be used, the amount of use is not particularly limited as long as the polymerization reaction is appropriately carried out; however, it is preferable to use a solvent in an amount of 1 part by weight or more relative to 100 parts by weight of the monomer, more preferable to use 10 parts by weight or more, and even more preferable to use 50 parts by weight or more. When the amount of use of the solvent is too small, the viscosity of the reaction solution may be excessively high. Furthermore, it is preferable to limit the amount to 2000 parts by weight or less, more preferable to limit to 1000 parts by weight or less, and even more preferable to limit to 500 parts by weight or less relative to 100 parts by weight of the monomer. When the amount of use of the solvent is too large, the monomer concentration in the reaction solution may be excessively low.

Emulsion polymerization, dispersion polymerization or suspension polymerization can also be carried out by using a solvent that is not miscible with the monomer. For example, in the case of using styrene or methacrylate as the monomer, water can be used as the solvent, such that emulsion polymerization, dispersion polymerization or suspension polymerization can be carried out.

(Other Additives and the Like)

To the various aforementioned materials used for the living radical polymerization, known additives may be added as necessary, in their required amounts. Examples of such additives include an antioxidant, a polymerization suppressant, and the like.

(Raw Material Composition)

By mixing the various raw materials described above, a raw material composition that is appropriate as a material for the living radical polymerization, is obtained. The obtained composition can be used in the conventionally known methods for a living radical polymerization.

According to one embodiment, the raw material composition does not include any raw material other than the various raw materials mentioned above. For example, it is preferable, from the viewpoint of environmental problems and the like, that the raw material composition does not substantially include a raw material containing a transition metal. According to a preferred embodiment, the raw material composition does not substantially include any raw material other than an initiator, a catalyst, a catalyst precursor compound, a monomer having a radical-reactive unsaturated bond, a solvent, and an organic halide having a carbon-halogen bond. It is also preferable that the raw material composition do not substantially include any material irrelevant to living radical polymerization (for example, an episulfide compound or the like). Furthermore, if it is desired to make the best possible use of the advantage of the catalyst or catalyst precursor having phosphorus or nitrogen as the central element, the raw material composition can be prepared as a composition that does not substantially include any catalyst or catalyst precursor for living radical polymerization other than the catalyst and catalyst precursor that have phosphorus or nitrogen as the central element.

According to one embodiment, the raw material composition includes an initiator, a catalyst or a catalyst precursor, a monomer having a radical-reactive unsaturated bond, and an organic halide having a carbon-halogen bond, and may further include a solvent.

(Raw Material Composition Including Catalyst)

In one embodiment that makes use of a catalyst compound, the raw material composition includes an initiator, a catalyst, a monomer having a radical-reactive unsaturated bond, and an organic halide having a carbon-halogen bond. The raw material composition may further include a solvent, in addition to these.

According to one embodiment, the raw material composition is a composition substantially consisting of an initiator, a catalyst, a monomer having a radical-reactive unsaturated bond, an organic halide having a carbon-halogen bond, and a solvent. Here, if not needed, the solvent may be excluded. The raw material composition is, for example, a composition that does not substantially include any component participating in the radical polymerization reaction, other than an initiator, a catalyst, a monomer having a radical-reactive unsaturated bond, an organic halide having a carbon-halogen bond and a solvent. Also, the composition may consist of only an initiator, a catalyst, a monomer having a radical-reactive unsaturated bond, an organic halide having a carbon-halogen bond, and a solvent. In this case as well, if not needed, the solvent may be excluded.

(Raw Material Composition Including Catalyst Precursor Compound)

In one embodiment that makes use of a catalyst precursor compound, the raw material composition includes a peroxide, a catalyst precursor compound, a monomer having a radical-reactive unsaturated bond, and an organic halide having a carbon-halogen bond. The raw material composition may further include a solvent, in addition to these.

According to one embodiment, the raw material composition is a composition substantially consisting of a peroxide, a catalyst precursor compound, a monomer having a radical-reactive unsaturated bond, an organic halide having a carbon-halogen bond, and a solvent. Here, if not needed, the solvent may be excluded. For example, the raw material composition is a composition that does not include any component participating in the radical polymerization reaction, other than a peroxide, a catalyst precursor compound, a monomer having a radical-reactive unsaturated bond, an organic halide having a carbon-halogen bond, and a solvent. Also, the composition may consist of only a peroxide, a catalyst precursor compound, a monomer having a radical-reactive unsaturated bond, an organic halide having a carbon-halogen bond, and a solvent. In this case as well, if not needed, the solvent may be excluded.

(Reaction Temperature)

A reaction temperature in the method of the present invention is not particularly limited. Preferably, the reaction temperature is 10° C. or more. More preferably, the reaction temperature is 20° C. or more. Further preferably, the reaction temperature is 30° C. or more. Still preferably, the reaction temperature is 40° C. or more. Particularly preferably, the reaction temperature is 50° C. or more. Additionally, the reaction temperature is preferably 130° C. or less. More preferably, the reaction temperature is 120° C. or less. Further preferably, the reaction temperature is 110° C. or less. Still preferably, the reaction temperature is 105° C. or less. Particularly preferably, the reaction temperature is 100° C. or less.

When the temperature is too high, there is a disadvantage that heating facilities and the like may be expensive. When the temperature is a room temperature or lower, there is a disadvantage that cooling facilities and the like may be expensive. Additionally, if a reaction mixture is prepared such that polymerization occurs at a room temperature or lower, the reaction mixture is unstable at room temperature and may react. Therefore, there is the disadvantage that it is difficult to store the reaction mixture. Therefore, the aforementioned range of the temperature, which is slightly higher than room temperature but is not too high (for example, 50° C. to 100° C.) is very preferable in term of the practical sense.

(Reaction Period of Time)

The reaction time period in the method of the present invention is not particularly limited. Preferably, the reaction time period is 15 minutes or more. More preferably, the reaction time period is 30 minutes or more. Further preferably, the reaction time period is 1 hour or more. Additionally, the reaction time period is preferably 3 days or less. More preferably, the reaction time period is 2 days or less. Further preferably, the reaction time period is 1 day or less.

If the reaction time period is too short, it is difficult to obtain a sufficient molecular weight. If the reaction period of time is too long, the efficiency of the entire process would be unsatisfactory. Advantageous results (an adequate monomer conversion and reduction of a side reaction) may be achieved by selecting a suitable reaction time period.

(Atmosphere)

The polymerization reaction in the method of the present invention may be carried out under a condition where air is present in the reaction vessel. Further, if necessary, the air may be replaced with an inert gas such as nitrogen or argon.

(Precursor)

In the polymerization method of the present invention, the reaction may be carried out by directly using the above-described catalyst (that is, by introducing the catalyst into the polymerization vessel), but the reaction may also be carried out using a precursor of the catalyst, without directly using the catalyst. Here, the precursor of the catalyst refers to a compound that does not conform to the definition of the catalyst as described above at the time of being introduced into the reaction vessel, but undergoes a chemical change in the reaction vessel to be brought to a state of being capable of acting as a catalyst. Here, the phrase "brought to a state of being capable of acting as a catalyst" preferably means that the precursor is converted into the catalyst compound.

A compound, which is capable of producing an activated radical similar to an activated radical generated from the catalyst compound at the time of the polymerization reaction, corresponds to the precursor. For example, a hydride of phosphorus corresponds to the precursor. That is, when the hydrogen of a hydride of phosphorus is abstracted by a peroxide or the like, an activated radical of the phosphorus compound can be generated, and living radical polymerization can be carried out. Hydrides of nitrogen also correspond to the precursor.

Therefore, according to one embodiment of the polymerization method of the present invention, the reaction can be carried out by directly using the catalyst described above, but in another embodiment, a precursor of the catalyst compound can be used without directly using the catalyst described above. In this case, a step of chemically changing the precursor is carried out before the step of carrying out the polymerization reaction. The step of chemically changing the precursor may be carried out within the vessel for carrying out the polymerization reaction, or may be carried out in a vessel different from the polymerization reaction vessel. It is advantageous to carry out the step of chemically changing the precursor simultaneously with the polymerization reaction step in the vessel for performing the polymerization reaction, from the viewpoint that the overall process is simplified.

In regard to the amount of use of the precursor, an amount similar to the aforementioned amount of use of the catalyst can be used. It is preferable to use such an amount of the precursor that an amount of the activated radical obtained from the precursor is similar to the amount of the activated radical in the case of using the catalyst in the above-described amount.

Specific examples of the compound that serves as a precursor of the catalyst having nitrogen as the central element, include amine or imide ($R^1{}_2NH$ or $R^1NH_2$, for example, diphenylamine ($Ph_2NH$), succinimide (($CH_2)_2(C=O)_2NH$), and the like.

Specific examples of the compound that serves as a precursor of the catalyst having phosphorus as the central element, include phosphite ($R^1{}_2PH(=O)$, for example, $(EtO)_2PH(=O)$, $(BuO)_2PH(=O)$), $(EtO)PhPH(=O)$, and the like. The phosphite may be a monoester of phosphonic acid, or may be a diester thereof. A diester is preferred. More preferably, the compound is a dialkyl ester of phosphonic acid.

The method for living radical polymerization of the present invention can be applied to homopolymerization, that is, production of a homopolymer, but it is also possible to produce a copolymer using the method of the present invention in copolymerization. The copolymerization may be random copolymerization, or may also be block copolymerization.

The block copolymer may be a copolymer having two or more types of blocks linked together, or may be a copolymer having three or more types of blocks linked together.

In the case of block copolymerization using two types of blocks, for example, a block copolymer can be obtained by a method including a step of polymerizing a first block and a step of polymerizing a second block. In this case, the method of the present invention may be used in the step of polymerizing the first block, or the method of the present invention may be used in the step of polymerizing the second block. It is preferable to use the method of the present invention in both of the process of polymerizing the first block and the process of polymerizing the second block.

More specifically, for example, a block copolymer can be obtained by polymerizing the first block, and then carrying out the polymerization of the second block in the presence of the obtained first polymer. The first polymer can be supplied to the polymerization of the second block after isolation and purification, or the polymerization of blocks can also be carried out by adding the second monomer to the first polymerization in the middle of or at the completion of the polymerization of the first polymer, without isolation and purification of the first polymer.

Also in the case of producing a block copolymer having three types of blocks, the steps of polymerizing the respective blocks are carried out in the same manner as in the instance of producing a copolymer having two or more types of blocks linked together, and thereby a desired copolymer can be obtained. It is also preferable to use the method of the present invention in all of the block polymerization steps.

(Reaction Mechanism)

Although the present invention is not particularly bound to a theory, an inferred mechanism will be explained.

The basic concept of a living radical polymerization method is a reversible activating reaction of a dormant species (polymer-X) to a growing chain radical (polymer.). A method, which uses a halogen as protecting group X and uses a transition metal complex as an activating catalyst, is one of useful living radical polymerization methods. According to the present invention, a nitrogen compound or phosphorus compound is used. It is possible to abstract a halogen from an organic halide with high reactivity. It is possible to produce a radical reversibly (Scheme 1).

It has been recognized that, generally, a transition metal can have electrons in various transition states and therefore, a transition metal is superior in the catalytic activity for various chemical reactions. Therefore, regarding catalysts suitable for a living radical polymerization, it was considered that a transition metal is superior. On the contrary, a typical element is considered disadvantageous for such a catalyst.

Figure 12:
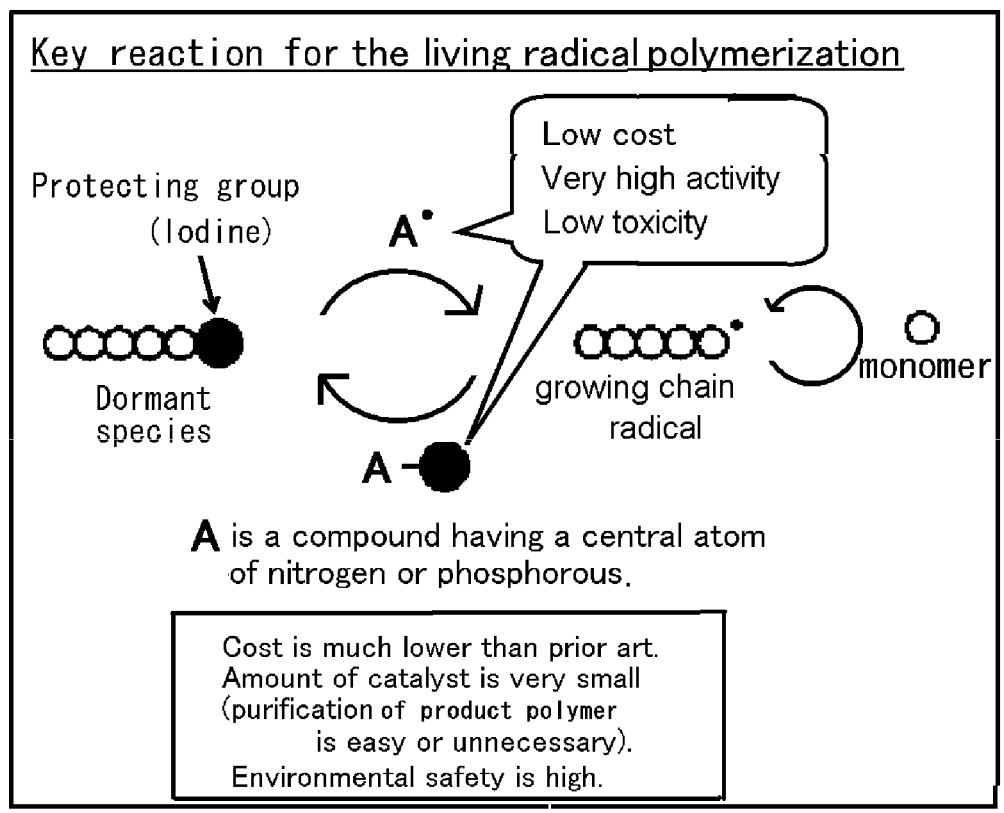
FIG. 12 is a scheme showing the concept of the present invention, and shows the key reaction for the living radical polymerization of the present invention. In this scheme, the radical of the catalyst is indicated by A., and a compound in which iodine is bound to the radical is indicated by a symbol of A bound to a black circle. This catalyst is characterized in that the catalyst is more inexpensive by several orders of magnitude as compared with catalysts of prior art; since the catalyst is ultra-highly active, the catalyst can be used in an extremely small amount; purification is unnecessary at the time of production of the catalyst, or even if purification is needed, the purification is easy; and since the catalyst is low in toxicity, the catalyst is highly safe to the human body and the environment.

However, according to the present invention, nitrogen or phosphorus is used as a central element in the catalyst. According to the present invention, unexpectedly, as shown in the scheme of FIG. 12, the halogen is exchanged between the catalyst and the growing chain radical, and the polymerization reaction proceeds with very high efficiency. It is considered that this is because the bond between the central element and the halogen is suitable for performing the exchange of the halogen with the reaction intermediate. Basically, it is considered that a compound having the bond between the central element and the halogen can catalyze the living radical polymerization satisfactorily even if the compound has a substituent other than the central element and halogen.

The following scheme 1A and scheme 1B show the reaction schemes of reactions using $PI_3$ and N-iodosuccinimide (NIS) respectively as the polymerization catalyst.

(Scheme 1A)

[Chemical formula 14A]

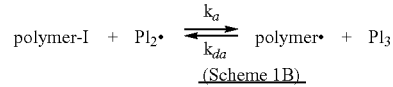

(Scheme 1B)

[Chemical formula 14B]

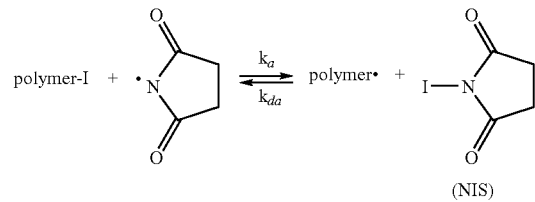

(NIS)

Furthermore, in the case of using a precursor, a step of generating an activated radical from the precursor is carried out before the reaction based on the mechanism described above, or at the same time as the reaction. Specifically, for example, an activated radical can be obtained by generating a radical from a peroxide, and abstracting a hydrogen atom of the precursor by means of the peroxide radical.

(Scheme 2)

[Chemical formula 15A]

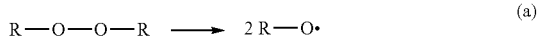

(a)

(b)

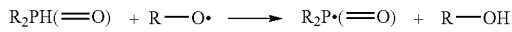

-continued

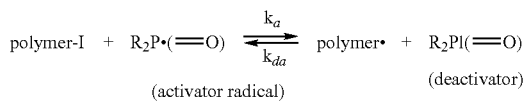

(c)

(Removal of Halogen Bound to an End of Produced Polymer)

The produced polymer that is obtained by the method of the present invention has halogen (for example, iodine) at the chain end. When this polymer is to be used in products, if needed, the polymer can be used after removing the halogen at the end. It is also possible to utilize the halogen at the end and to convert this into a different functional group, so as to bring out a new function. The reactivity of the halogen at the end is generally high, and the removal or conversion of the halogen can be carried out by a wide variety of reactions. For example, an example of a method of treating the polymer end when the halogen is iodine, will be shown in the following scheme. The polymer end can be utilized by the reactions shown in these schemes or the like. Even when the halogen is other than iodine, the polymer end can be converted into a functional group in the same manner.

ratio of 1.4 or less, a polymer having the Mw/Mn ratio of 1.3 or less, a polymer having the Mw/Mn ratio of 1.2 or less, or a polymer having the Mw/Mn ratio of 1.1 or less is obtained.

The polymer obtained by the living radical polymerization method of the present invention can be applied for various uses. For example, the polymer can be used for manufacturing resist material, adhesive, lubricant, paint, ink, dispersant, packaging material, pharmaceuticals, a personal care product (hairdressing material, cosmetics and the like), elastomer (material for automobiles, industrial articles, sports article, materials for coating electrical wire, materials for buildings, and the like), resist material, materials for organic and the like. Furthermore, it can be used for creating new electronics material, optical material, dynamic material, crystal material, separation material, lubricant material, and medical material.

The polymer obtained by the living radical polymerization method of the present invention can also be advantageously used in various applications from the viewpoint that the amount of catalyst remaining in the polymer is small. That is, since the amount of catalyst can be decreased relative to the conventional transition metal-based catalysts and the like, the obtained resins acquire high purity, and the polymer can be suitably used in the applications where a high purity resin is required. The catalyst residue may be removed from the pro-

[Chemical formula 15B]

Conversion of terminal iodine

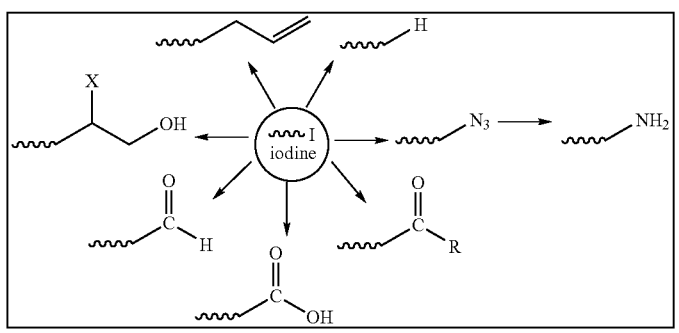

(Reference) Matyjeszewski, K., Davis, T.P., Eds,; Handbook of Radical Polymerization; Wiley & Sons; New York, 2002.

Removal/conversion of terminal iodine

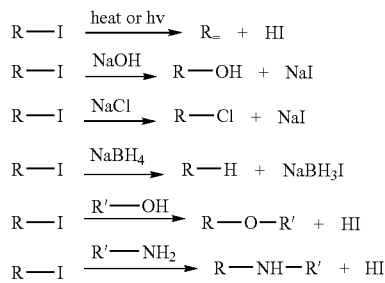

(Use of the Polymer)

According to the aforementioned living radical polymerization method of the present invention, a polymer having a narrow molecular weight distribution is obtained. For example, it is possible to select a suitable formulation of reaction material, reaction conditions and the like, such that a polymer having the Mw/Mn ratio, which is the ratio of the weight average molecular weight Mw to the number average molecular weight Mn, is 1.5 or less. It is also possible to select a further suitable formulation of the reaction material and reaction conditions such that a polymer having the Mw/Mn duced polymer, or may not be removed, depending on the application. The polymer may be molded, or dissolved or dispersed in a solvent or a dispersion medium depending on such various applications. However, the molded polymer, or the dissolved or dispersed polymer also maintains the advantages of the present invention, and thus these polymers still belong to the scope of the polymer obtained by the polymerization method of the present invention.

The polymer synthesized using the polymerization method of the present invention has advantages such as the advantage that the molecular weight distribution is narrow, the advantage that the amount of catalyst remaining in the polymer is small, and the advantage that the cost is low, and thus the polymer can be utilized in various applications by making the best use of the advantages.

For example, a homopolymer, a random copolymer and a block copolymer formed from benzyl methacrylate and having narrow molecular weight distributions can be used as high performance resist materials.

Further, for example, a polymer of methacrylate (for example, dimethylaminomethacrylate or 2-hydroxyethyl methacrylate), methacrylic acid, acrylate, acrylic acid or the like can be used in applications such as adhesives, paints, inks and pigment dispersants.

Further, when a polybranched polymer is synthesized by the method of the present invention, the polymer is useful as a lubricant.

Further, polymers obtained by the method of the present invention (for example, hydroxyethyl methacrylate, polyethylene glycol methacrylate, and the like) are also useful as drug delivery materials or medical materials.

Further, polymers obtained by the method of the present invention (for example, dimethylaminomethacrylate, methacrylic acid, 2-hydroxyethyl methacrylate, polyethylene glycol methacrylate, and the like) are also useful for personal care products (for example, hairdressing materials or cosmetic products).

Further, polymers obtained by the method of the present invention (for example, acrylate, methacrylate, styrene, diene and the like) are also useful in applications such as elastomer or coating.

Further, polymers obtained by the method of the present invention are also useful in the creation and production of non-conventional new electronic materials, optical materials, mechanical materials, crystalline materials, separation materials, lubricant materials, medical materials and the like.

Furthermore, the method of the present invention can be, for example, applied to surface graft polymerization, and can produce high density polymer brushes that can be used in various applications.

Further, when a compound that does not have electroconductivity is used as a catalyst, a polymer that can be suitably used even in applications where the absence of any residual electroconductive impurities in the polymer is required (for example, resist materials, organic electroluminescence materials and the like), may be obtained.

The catalyst of the present invention is characterized in that the central element of the catalyst is nitrogen or phosphorus. Here, based on the same mechanism as that for compounds containing phosphorus, which will be described below in detail, the catalytic action is also similarly exerted in the case of compounds using nitrogen. More specifically, nitrogen and phosphorus have the following common features that are believed to be involved in the catalytic action of the present invention. Regarding nitrogen and phosphorus, the electrons (radicals) located in the p-orbital (or a hybrid orbital of the p-orbital and the s-orbital) contribute to the reaction. They are completely different from transition metals in which the electrons of the d-orbital contribute to the reaction. It was found as a result of the researches of the inventors of the present invention, that the radicals located in the p-orbital of nitrogen and phosphorus have very high power for abstracting halogen from alkyl halides (dormant species) during a living radical polymerization. Further, it was found that the radical of the p-orbital generally have remarkably high power for abstracting halogen from a dormant species, even if compared with the radicals of transition metals. Therefore, nitrogen and phosphorus that are capable of producing such a powerful p-orbital radical, can serve as potent catalysts.

EXAMPLES

Hereinafter, Examples of the present invention will be explained. However, the present invention is not limited by these Examples.

The monomers, alkyl halides, and catalysts used in the following examples are shown as follows.

(Used Compounds)

First, the structures of the main compounds used in the Examples are described below.

(Monomers)

[Chemical formula 16]

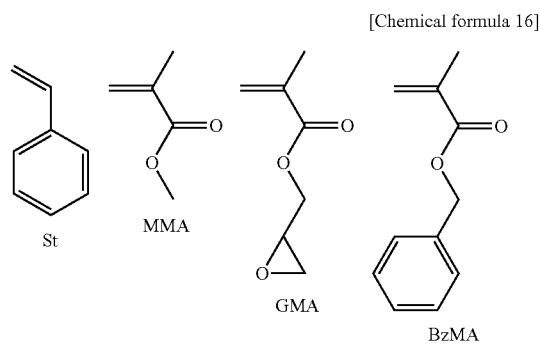

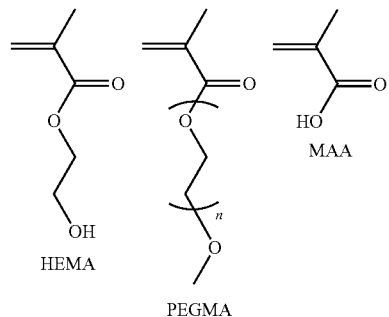

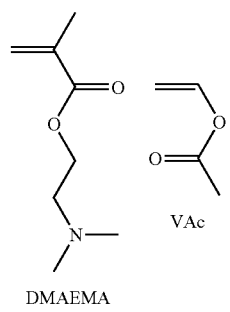

(Organic Halide Compounds)

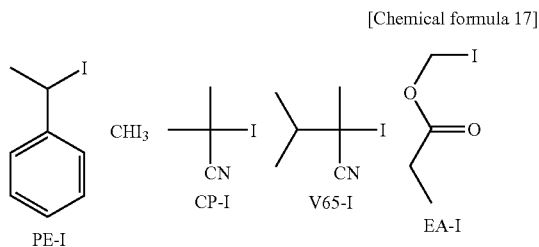

[Chemical formula 17]

(Catalysts)

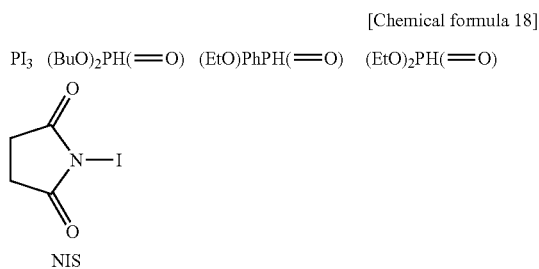

[Chemical formula 18]

Example 1 and Comparative Example 1

Bulk Polymerizations of Styrene (St) with $PI_3$ (Catalyst)

80 mM of 1-phenylethyl iodide (PE-I, the chemical formula is shown above) was used as an alkyl halide. 10 mM of $PI_3$ was used as a catalyst. 10 mM of dicumyl peroxide (DCP) was used as a radical initiator. These materials were dissolved in 1 g of styrene to form a reaction solution having the aforementioned concentrations. The monomer concentration was 8M. The solubility of these materials was satisfactory, and a homogenous solution was formed. The remaining oxygen was replaced with argon. The reaction solution was heated to 100° C. to perform the polymerization reaction.

It is noted that regarding concentrations, "mM" refers to the number of millimoles with respect to 1 liter of a monomer. For example, 80 mM means that 80 millimoles of a solute is dissolved in 1 liter of a monomer. Regarding concentrations, "M" refers to the number of moles with respect to 1 liter of a monomer. For example, 8 M means that 8 moles of a solute is dissolved in 1 liter of a monomer.

The experiments of entries 1 to 6 as well as entry C1 were performed using the reaction materials and reaction conditions as shown in Table 1. The experiments of entries 1 to 6 are relevant to the experiments of Example 1. The experiment of entry C1 is relevant to the experiment of Comparative Example 1.

In table 1 and all the other tables shown below (Tables 1-28), PDI denotes a ratio of $M_w/M_n$. Further, Mn is a number average molecular weight of the obtained polymer. Mw is a weight average molecular weight of the obtained polymer.

$M_{n,theo}$ denotes a theoretical value calculated according to $M_{n,theo}=([M]_0/[R-I]_0)\times$(molecular weight of the monomer)$\times$(conv)/100, where $[M]_0$ and $[R-I]_0$ are the initial concentrations of monomer and alkyl iodide, respectively, and cony is the monomer conversion ratio (polymerization ratio).

In this polymerization, a growing chain radical (polymer.), which is originally generated by cleavage of DCP, abstracts an iodine from the deactivating agent $PI_3$, in situ to produce the radical $PI_2$. (and a polymer-iodine adduct (polymer-I)). $PI_2$. then works as an activator of a polymer-I, achieving the reversible activation. The results are shown in Table 1 (entry 1). For example, at 23 hours, the conversion was 21%, and $M_n$ and PDI were 1100 and 1.16, respectively. The molecular weight distribution was controlled but the polymerization was very slow. Therefore, the amount of the catalyst was decreased from 10 mM to 2 mM.

Figure 1B:
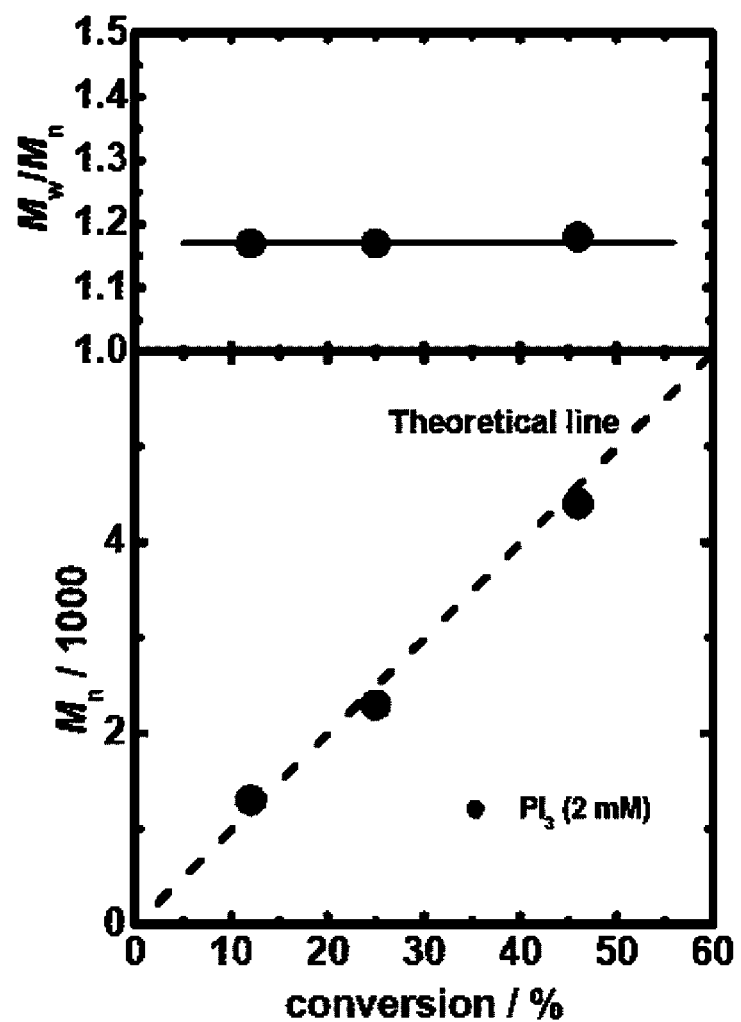
FIG. 1B is a graph plotting $M_n$ and $M_w/M_n$ vs. monomer conversion (ratio of polymerization) in the styrene polymerization (styrene/PE-I/DCP/PI$_3$ (100° C.)). In this figure, the results of using PI$_3$ (2 mM) as the catalyst are shown. Regarding Mn, results that are consistent with the theoretical values, which are indicated as Theoretical line, are obtained.

The results are shown in Table 1 (entry 2) and FIGS. 1A and 1B. In FIG. 1A, in the vertical axis, [M] shows a monomer concentration, and $[M]_0$ shows an initial monomer concentration (a monomer concentration at polymerization time zero). For example, at 23 hours, the conversion becomes high, i.e., 46%, and $M_n$ and PDI were 4,400 and 1.17, respectively. $M_n$ was approximately in proportion to the conversion. PDI was low and was about 1.2 from an early stage of the polymerization, meaning that the activation frequency is sufficiently high. Further, the DCP concentration was increased from 80 mM to 160 mM (entry 3), and thereby, for example, at 23 hours, conversion was significantly increased to 68%, and $M_n$ and PDI were 6,200 and 1.17, respectively. Thus, it was possible that PDI is controlled while the polymerization rate is increased. Further, even though the amounts of the catalyst were significantly reduced from 2 mM to 1 mM (entry 4) and 0.5 mM (entry 5), the molecular weight distribution was controlled (PDI=1.15-1.25). In view of the molecular weight of $PI_3$ (about 412), the amount of 0.5 mM corresponds to about 0.02 weight % in the styrene monomer solution. This amount is about one four hundredth (about 1/400) in comparison with the amount of the catalyst (8.9 weight %) used in the experimental example described in non-patent document 1 which is described later. The small amount of the catalyst being required confirmed a very high activity of the catalyst. Further, as shown in entry 6, the PE-I concentration was lowered, and thereby a polymer having a higher molecular weight was obtained ($M_n$=10,000).

In comparative example 1, i.e., in a system containing no catalyst, Mw/Mn was 1.55 (entry C1). That is, the molecular weight distribution was broader than those for the systems containing the catalyst of the present invention. The molecular weight distribution was thus controlled by the action of the catalyst. From the tacticity of the polymers, it was confirmed that the polymerizations were radical polymerizations.

TABLE 1

Bulk polymerizations of styrene (St) with $PI_3$ (catalyst).

| entry | Monomer (equivalent to $[R-I]_0$) | R-I | I | catalyst | T (° C.) | $[R-I]_0/[I]_0/$ $[catalyst]_0$ (mM) | t (h) | conv (%) | $M_n$ ($M_{n,theo}$) | PDI |
|---|---|---|---|---|---|---|---|---|---|---|
| 1 | St (100 eq) | PE-I | DCP | $PI_3$ | 100 | 80/80/10 | 23 | 21 | 1100 (2100) | 1.16 |

TABLE 1-continued

Bulk polymerizations of styrene (St) with PI$_3$ (catalyst).

| entry | Monomer (equivalent to [R-I]$_0$) | R-I | I | catalyst | T (° C.) | [R-I]$_0$/[I]$_0$/ [catalyst]$_0$ (mM) | t (h) | conv (%) | M$_n$ (M$_{n,theo}$) | PDI |
|---|---|---|---|---|---|---|---|---|---|---|
| 2 | St (100 eq) | | | | | 80/80/2 | 4 | 12 | 1300 (1200) | 1.17 |
|   |   |   |   |   |   |   | 7 | 25 | 2300 (2500) | 1.17 |
|   |   |   |   |   |   |   | 23 | 46 | 4400 (4600) | 1.18 |
| 3 | St (100 eq) | | | | | 80/160/2 | 4 | 34 | 3200 (3400) | 1.18 |
|   |   |   |   |   |   |   | 7 | 55 | 5100 (5500) | 1.17 |
|   |   |   |   |   |   |   | 23 | 68 | 6200 (6800) | 1.17 |
| 4 | St (100 eq) | | | | | 80/80/1 | 4 | 20 | 1900 (2000) | 1.16 |
|   |   |   |   |   |   |   | 7 | 36 | 3200 (3600) | 1.15 |
|   |   |   |   |   |   |   | 23 | 56 | 4600 (5600) | 1.22 |
| 5 | St (100 eq) | | | | | 80/80/0.5 | 23 | 52 | 5100 (5200) | 1.25 |
| 6 | St (200 eq) | | | | | 40/80/2 | 23 | 72 | 10000 (14000) | 1.29 |
| C1 | St (100 eq) | PE-I | DCP | none | 100 | 80/20/0 | 4 | 41 | 4200 (4100) | 1.55 |

Monomer: styrene (St)
Monomer concentration: 8 M (bulk)
Alkyl halide (R-I): 1-phenylethyl iodide (PE-I)
Radical initiator (I): dicumyl peroxide (DCP)

Example 2

Bulk Polymerizations of styrene (St) with Two Different phosphorus hydrides R$_2$PH(=O) (Catalysts)

Polymerization of styrene was carried out using the reaction materials and reaction conditions as shown in Table 2 (entries 1 to 6).

In a system similar to Example 1, instead of PI$_3$, R$_2$PH(=O), which is a hydride of a phosphorus compound, was used as a precursor of a catalyst (aforementioned scheme 2). In this polymerization, due to cleavage of DCP (peroxide), an alkoxy radical is generated (aforementioned scheme 2a). The alkoxy radical abstracts a hydrogen from R$_2$PH(=O) to generate the phosphorus radical R$_2$P.(=O) (aforementioned scheme 2b). The phosphorus radical works as an activator of polymer-I, achieving the reversible activation (aforementioned scheme 2c).

In this Example, as a catalyst, (BuO)$_2$PH(=O) and (EtO)PhPH(=O) were used for polymerization of styrene. Further, in Example 5, which is described later, (EtO)$_2$PH(=O) and (iPrO)$_2$PH(=O) were used in polymerization of methyl methacrylate (MMA). These phosphorus hydrides have higher stability to water or light in comparison with the phosphorus iodides (e.g., PI$_3$), allowing easier and simpler experimental operation. Further, the hydrides are very cheap.

Figure 2A:
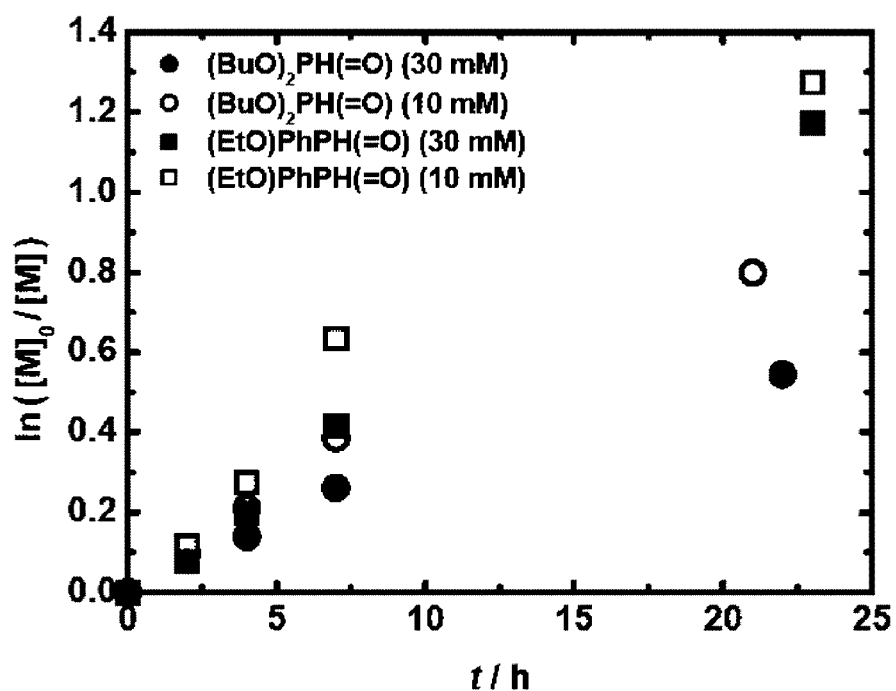
FIG. 2A is a graph showing the changes over time in the monomer concentration during styrene polymerization (styrene/PE-I/DCP/R$_2$PH(=O) (100° C.)). Black circles represent the values of entry 1 as given in Table 2. White circles represent the values of entry 3 as given in Table 2. Black squares represent the values of entry 5 as given in Table 2. White squares represent the values of entry 6 as given in Table 2.
Figure 2B:
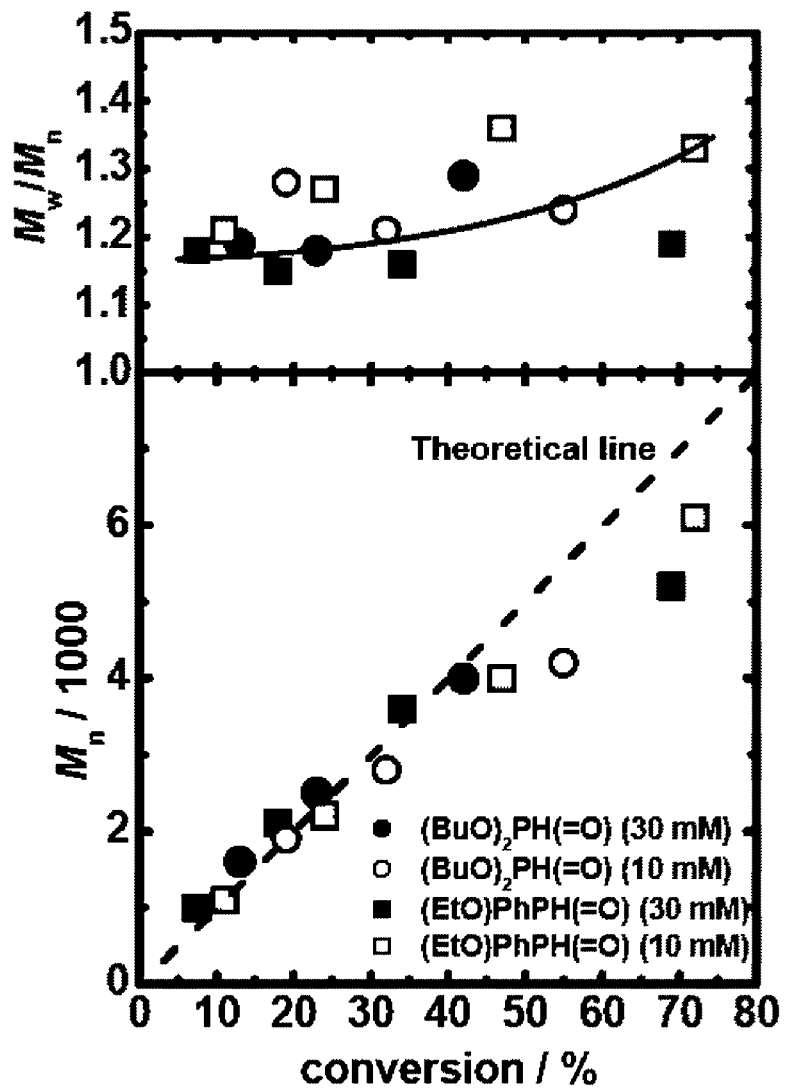
FIG. 2B is a graph plotting $M_n$ and $M_w/M_n$ vs. monomer conversion (ratio of polymerization) in the styrene polymerization (styrene/PE-I/DCP/R$_2$PH(=O) (100° C.)). Regarding Mn, results that are consistent with the theoretical values, which are indicated as Theoretical line, are obtained.

The results of the polymerization of styrene using (BuO)$_2$PH(=O) were shown in Table 2 and FIGS. 2A and 2B. In a systems where 30 mM of the catalyst was added (Table 2, entries 1 and 2, and FIGS. 2A and 2B), from an early stage of the polymerization, a polymer having a low PDI (=1.18) was obtained. When the concentration of the catalyst was reduced to 10 mM (entry 3, FIGS. 2A and 2B), the PDI was somewhat larger at an early stage of the polymerization, while M$_n$ was approximately in proportion to the conversion. When the conversion was over 20%, polymers having a low PDI (PDI=about 1.2) were obtained. Further, even though the concentration of the catalyst was reduced from 10 mM to 5 mM, the PDI was low and was about 1.3 (entry 4). Next, EtOPhPH(=O) was used (Table 1, entries 5 and 6 and FIGS. 2A and 2B). Its activity was higher than (BuO)$_2$PH(=O), and when the concentration of the catalyst was 10 mM, the PDI was low and was about 1.2 from an early stage of the polymerization (entry 6 and FIGS. 2A and 2B). As described above, two types of hydrides of phosphorus were used as a catalyst, and thereby polymerization of styrene was successfully controlled.

TABLE 2

Bulk polymerizations of styrene (St) with two different phosphorus hydrides R$_2$PH(=O) (catalysts).

| entry | Monomer (equivalent to [R-I]$_0$) | R-I | I | catalyst | T (° C.) | [R-I]$_0$/[I]$_0$/ [catalyst]$_0$ (mM) | t (h) | conv (%) | M$_n$ (M$_{n,theo}$) | PDI |
|---|---|---|---|---|---|---|---|---|---|---|
| 1 | St (100 eq) | PE-I | DCP | (BuO)$_2$PH(=O) | 100 | 80/80/30 | 7 | 23 | 2500 (2300) | 1.18 |

TABLE 2-continued

Bulk polymerizations of styrene (St) with two different phosphorus hydrides $R_2PH(=O)$ (catalysts).

| entry | Monomer (equivalent to $[R-I]_0$) | R-I | I | catalyst | T (° C.) | $[R-I]_0/[I]_0/$ $[catalyst]_0$ (mM) | t (h) | conv (%) | $M_n$ ($M_{n,theo}$) | PDI |
|---|---|---|---|---|---|---|---|---|---|---|
| 2 | St (100 eq) | | | | | 80/160/30 | 7 | 51 | 5900 (5100) | 1.24 |
| 3 | St (100 eq) | | | | | 80/80/10 | 4 | 19 | 1900 (3200) | 1.28 |
|   |             |   |   |   |   |           | 7 | 32 | 2800 (3200) | 1.21 |
|   |             |   |   |   |   |           | 23 | 55 | 4200 (5500) | 1.24 |
| 4 | St (100 eq) | | | | | 80/80/5 | 23 | 44 | 4300 (4400) | 1.29 |
| 5 | St (100 eq) | | | (EtO)PhPH(=O) | | 80/80/30 | 7 | 34 | 3600 (3400) | 1.16 |
| 6 | St (100 eq) | | | | | 80/80/10 | 2 | 11 | 1100 (1100) | 1.21 |
|   |             |   |   |   |   |           | 4 | 24 | 2200 (2400) | 1.27 |
|   |             |   |   |   |   |           | 23 | 72 | 6100 (7200) | 1.33 |

Monomer: styrene (St)
Monomer concentration: 8 M (bulk)
Alkyl halide (R-I): 1-phenylethyl iodide (PE-I)
Radical initiator (I): dicumyl peroxide (DCP)

Example 3

Bulk Polymerizations of styrene(St) with N-iodosuccinimide (NIS) (Catalyst), Two Different alkyl iodides, and Two Different Radical Initiators, at Two Different Temperatures

Figure 3A:
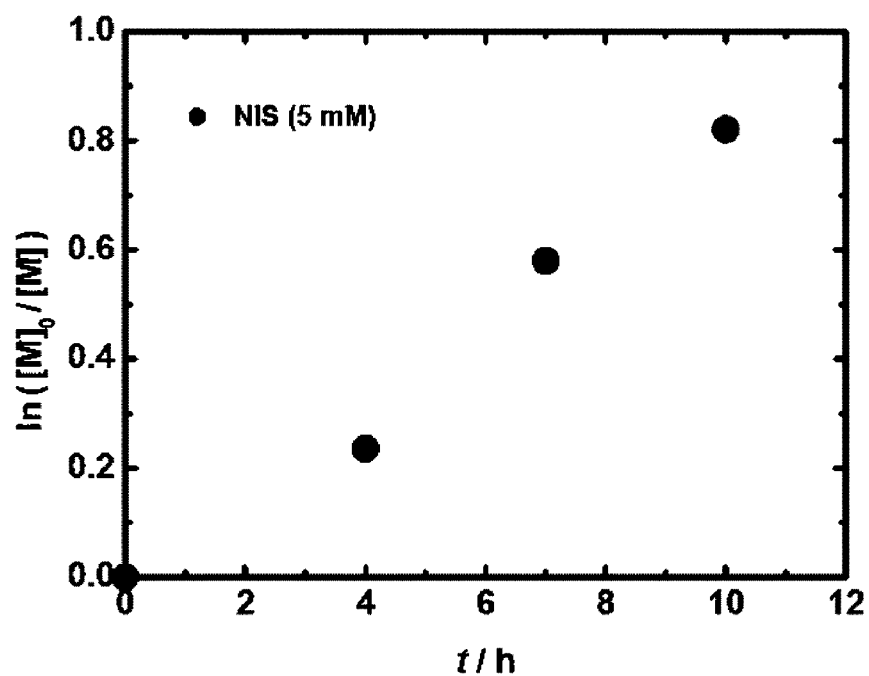
FIG. 3A is a graph showing the changes over time in the monomer concentration during styrene polymerization (styrene/PE-I/DCP/NIS (100° C.)). The graph shows the values of entry 1 as given in Table 3.
Figure 3B:
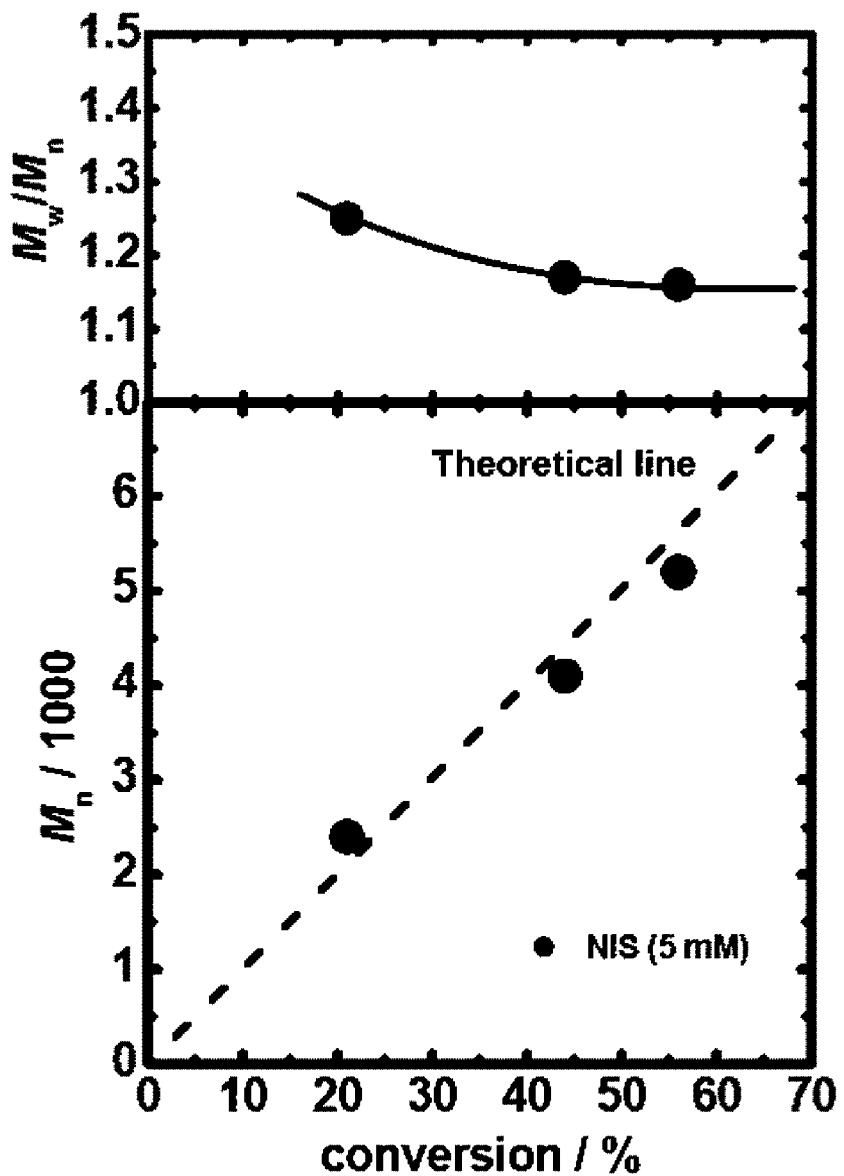
FIG. 3B is a graph plotting $M_n$ and $M_w/M_n$ vs. monomer conversion (ratio of polymerization) in the styrene polymerization (styrene/PE-I/DCP/NIS (100° C.)). Regarding Mn, results that are consistent with the theoretical values, which are indicated as Theoretical line, are obtained.

Similarly to Example 1, but instead of $PI_3$ (as a catalyst), bulk polymerizations of styrene (St) were carried out with a nitrogen iodide, N-iodosuccinimide (NIS: the chemical formula is shown above), as a catalyst (Table 3 and FIGS. 3A and 3B). The polymerization mechanism for NIS is the same as that for $PI_3$ (Example 1). Low-polydispersity polymers were obtained with PE-I as an alkyl iodide and 2,2'-azobis(2,4,4-trimethylpentane) (VR110) as a radical initiator at 100° C. (Table 3, entry 1 and FIGS. 3A and 3B). Low polydispersity was also achieved by using a different radical initiator, benzoyl peroxide (BPO), at a different temperature, 80° C. (Table 3, entry 2). Further, low polydispersity was also achieved by using a different alkyl iodide, iodoform ($CHI_3$), and a different radical initiator, benzoyl peroxide (BPO), at a different temperature, 80° C. (Table 3, entry 3).

TABLE 3

Bulk polymerizations of styrene (St) with N-iodosuccinimide (NIS) (catalyst), two different alkyl iodides, and two different radical initiators, at two different temperatures.

| entry | Monomer (equivalent to $[R-I]_0$) | R-I | I | catalyst | T (° C.) | $[R-I]_0/[I]_0/$ $[catalyst]_0$ (mM) | t (h) | conv (%) | $M_n$ ($M_{n,theo}$) | PDI |
|---|---|---|---|---|---|---|---|---|---|---|
| 1 | St (100 eq) | PE-I | VR110 | NIS | 100 | 80/80/5 | 4 | 20 | 2400 (2100) | 1.25 |
|   |             |      |       |     |     |         | 7 | 33 | 4100 (4400) | 1.17 |
|   |             |      |       |     |     |         | 10 | 56 | 5200 (5600) | 1.16 |
| 2 | St (100 eq) | PE-I | BPO | | 80 | 80/40/2 | 6 | 85 | 7500 (8500) | 1.31 |
| 3 | St (100 eq) | $CHI_3$ | BPO | | 80 | 80/20/5 | 4 | 38 | 3400 (3800) | 1.46 |
|   |             |         |     |   |    |         | 7 | 65 | 5100 (6500) | 1.36 |
|   |             |         |     |   |    |         | 24 | 76 | 5700 (7600) | 1.34 |

Monomer: styrene (St)
Monomer concentration: 8 M (bulk)
Alkyl halide (R-I): 1-phenylethyl iodide (PE-I)
Radical initiator (I): dicumyl peroxide (DCP), benzoyl peroxide (BPO)
Catalyst: N-iodosuccinimide (NIS)

Example 4 and Comparative Example 2

Bulk Polymerizations of methyl methacrylate (MMA) with $PI_3$ (Catalyst)

Figure 4A:
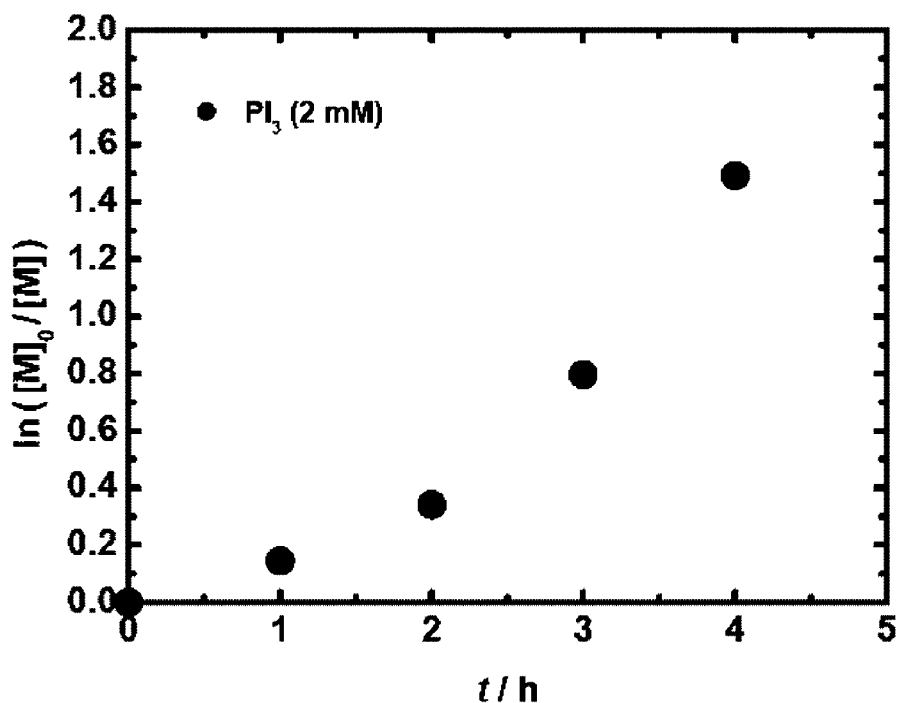
FIG. 4A is a graph showing the changes over time in the monomer concentration during MMA polymerization (MMA/CP—I/AIBN/PI$_3$ (70° C.)). The graph shows the values of entry 3 as given in Table 4.
Figure 4B:
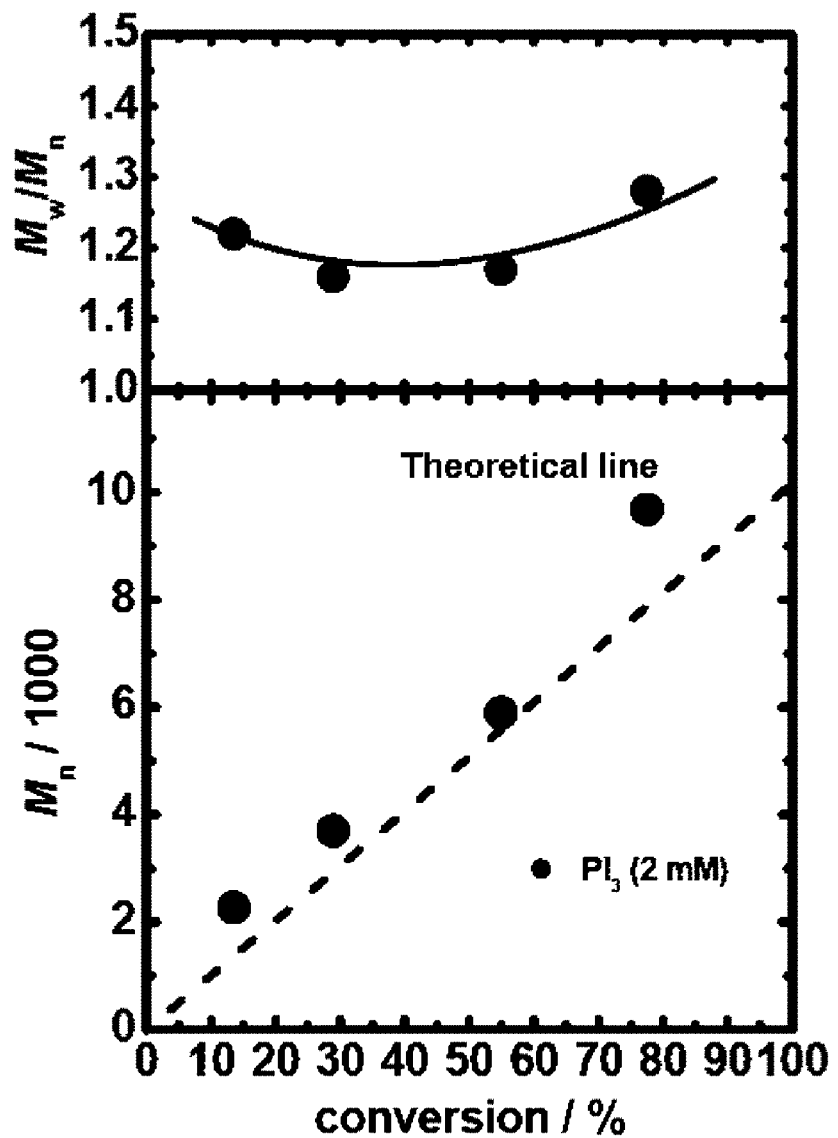
FIG. 4B is a graph plotting $M_n$ and $M_w/M_n$ vs. monomer conversion (ratio of polymerization) in the MMA polymerization (MMA/CP—I/AIBN/PI$_3$ (70° C.)). Regarding Mn, results that are consistent with the theoretical values, which are indicated as Theoretical line, are obtained.

Similarly to Example 1, but in stead of styrene (as a monomer), bulk polymerizations of methyl methacrylate (MMA) were carried out using a phosphorus iodide as a catalyst (Table 4 and FIGS. 4A and 4B). The polymerization mechanism is the same as that for the styrene polymerization with $PI_3$ (Example 1). 2-cyanopropyl iodide (aforementioned CP—I), azobisisobutyronitrile (AIBN), and $PI_3$ were used as an alkyl iodide, a radical initiator, and a catalyst, respectively, at 70° C. In a system where 40 mM of CP—I, 20 mM of AIBN, and 5 mM of the catalyst were added (entry 1), for example, at 6 hours, the conversion was 63%. That is, a high conversion was achieved with a short period of time, and the PDI was low, i.e., 1.25. Further, the concentration of the catalyst was reduced from 5 mM to 3 mM (entry 2) and 2.5 mM (entry 4), and further to a small amount of 2 mM (Table 4, entry 3 and FIGS. 4A and 4B), small PDI values (1.13-1.31) were achieved.

In Comparative Example 2 (Table 4, entry C1), that is, in a system where no catalyst was added, the polymerization was not controlled (PDI=1.90). Thus, due to the role of $PI_3$, the polymerization of MMA was successfully controlled.

In a case of a germanium catalyst, it is necessary to synthesize a catalyst in order to conduct a polymerization of MMA. However, the phosphorus compound (or nitrogen compound) used in Example 4 (and Examples 5 and 6) are commercially available and are inexpensive. Therefore, it is not necessary to conduct a cumbersome synthesizing process. In this regard, the catalyst is advantageous.

TABLE 4

Bulk polymerizations of methyl methacrylate (MMA) with $PI_3$ (catalyst).

| entry | Monomer (equivalent to $[R-I]_0$) | R-I | I | catalyst | T (° C.) | $[R-I]_0/[I]_0/$ $[catalyst]_0$ (mM) | t (h) | conv (%) | $M_n$ ($M_{n,theo}$) | PDI |
|---|---|---|---|---|---|---|---|---|---|---|
| 1 | MMA (200 eq) | CP-I | AIBN | $PI_3$ | 70 | 40/20/5 | 6 | 63 | 15000 (13000) | 1.25 |
|  |  |  |  |  |  |  | 8 | 78 | 21000 (16000) | 1.32 |
| 2 | MMA (100 eq) |  |  |  |  | 80/20/3 | 6 | 12 | 1500 (1200) | 1.19 |
| 3 | MMA (100 eq) |  |  |  |  | 80/20/2 | 1 | 14 | 2300 (1400) | 1.22 |
|  |  |  |  |  |  |  | 2 | 29 | 3700 (2900) | 1.16 |
|  |  |  |  |  |  |  | 3 | 55 | 5900 (5500) | 1.17 |
|  |  |  |  |  |  |  | 4 | 78 | 9700 (7800) | 1.28 |
| 4 | MMA (50 eq) |  |  |  |  | 160/20/2.5 | 2.5 | 60 | 3800 (3000) | 1.13 |
| C1 | MMA (100 eq) | CP-I | AIBN | none | 70 | 40/20/0 | 4 | 99 | 30300 (20000) | 1.90 |

Monomer: methyl methacrylate (MMA)

Monomer concentration: 8 M (bulk)

Alkyl halide (R-I): 2-cyanopropyl iodide (CP-I)

Radical initiator (I): azobisisobutyronitrile (AIBN)

Example 5

Bulk Polymerizations of methyl methacrylate (MMA) with $R_2PH(=O)$ (Catalyst)

Figure 5A:
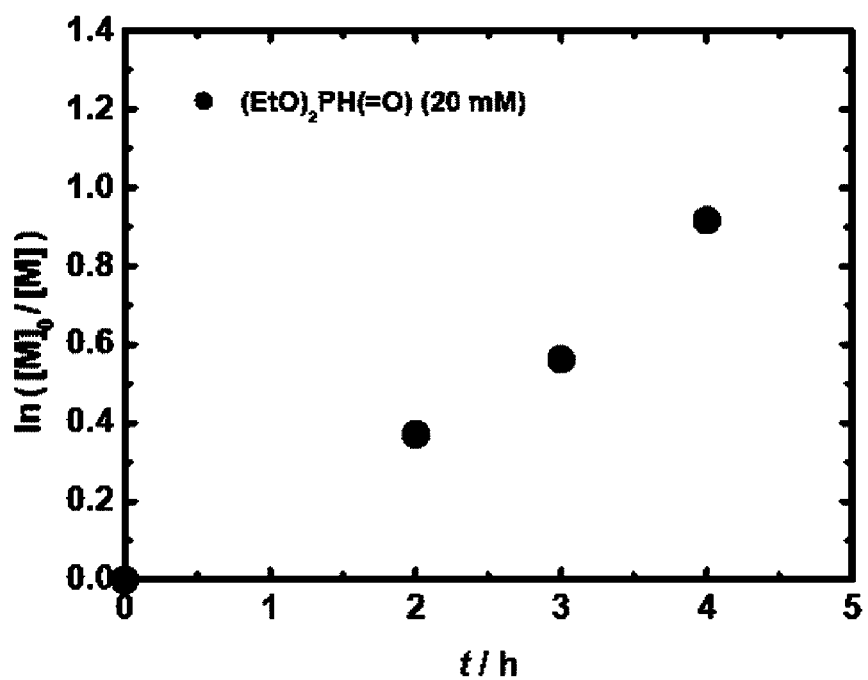
FIG. 5A is a graph showing the changes over time in the monomer concentration during MMA polymerization (MMA/CP—I/BPO/R$_2$PH(=O) (70° C.)). The graph shows the values of entry 1 as given in Table 5.
Figure 5B:
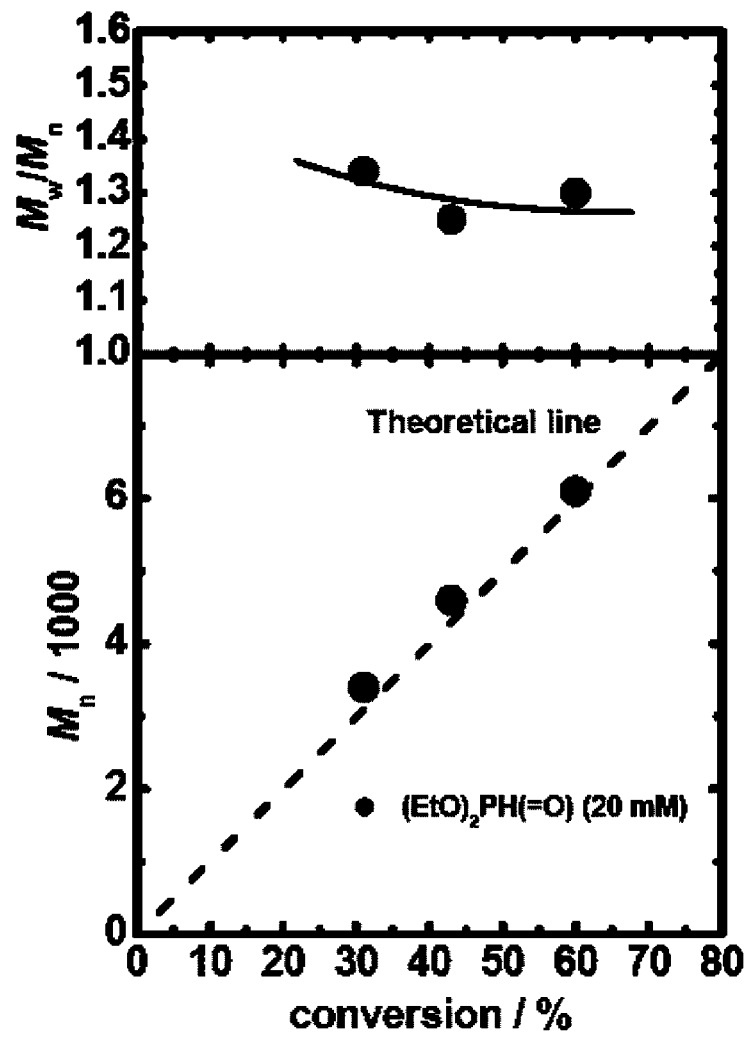
FIG. 5B is a graph plotting $M_n$ and $M_w/M_n$ vs. monomer conversion (ratio of polymerization) in the MMA polymerization (MMA/CP—I/BPO/R$_2$PH(=O) (70° C.)). Regarding Mn, results that are consistent with the theoretical values, which are indicated as Theoretical line, are obtained.

Similarly to Example 4, bulk polymerizations of MMA were carried out, with the proviso that instead of $PI_3$ (Example 4), a phosphorus hydride compound $R_2PH(=O)$ was used as a catalyst (a precursor of catalyst) (Table 5 and FIGS. 5A and 5B). The polymerization mechanism is the same as the mechanism for the styrene polymerization with $R_2PH(=O)$ (Example 2). 2-cyanopropyl iodide (CP—I), benzoyl peroxide (BPO), and $(EtO)_2PH(=O)$ were used as an alkyl iodide, a radical initiator, and a catalyst (precursor), respectively, and polymerizations were carried out at 70° C. With 20 mM of $(EtO)_2PH(=O)$, polymers having low polydispersities were obtained (Table 5, entry 1 and FIGS. 5A and B). Even with a lower concentration (10 mM) of $(EtO)_2PH(=O)$, a low polydispersity was achieved (Table 5, entry 2). With a lower concentration of CP—I, polymers having higher molecular weights and low polydispersities were obtained (Table 5, entry 3). Another phosphorus hydride compound $(iPrO)_2PH(=O)$ was also effective (Table 5, entry 4).

TABLE 5

Bulk polymerizations of methyl methacrylate (MMA) with $R_2PH(=O)$ (catalyst).

| entry | Monomer (equivalent to $[R-I]_0$) | R-I | I | catalyst | T (° C.) | $[R-I]_0/[I]_0/[catalyst]_0$ (mM) | t (h) | conv (%) | $M_n$ ($M_{n,theo}$) | PDI |
|---|---|---|---|---|---|---|---|---|---|---|
| 1 | MMA (100 eq) | CP-I | BPO | $(EtO)_2PH(=O)$ | 70 | 80/40/20 | 2 | 31 | 3400 (3100) | 1.34 |
|   |   |   |   |   |   |   | 3 | 43 | 4600 (4300) | 1.25 |
|   |   |   |   |   |   |   | 4 | 60 | 6100 (6000) | 1.30 |
| 2 | MMA (100 eq) |   |   |   |   | 80/40/10 | 2 | 47 | 4500 (4700) | 1.43 |
|   |   |   |   |   |   |   | 3 | 60 | 7500 (6000) | 1.23 |
| 3 | MMA (200 eq) |   |   |   |   | 40/20/10 | 2 | 31 | 5400 (6100) | 1.45 |
|   |   |   |   |   |   |   | 3 | 45 | 6800 (9000) | 1.30 |
|   |   |   |   |   |   |   | 4 | 53 | 8500 (10600) | 1.25 |
|   |   |   |   |   |   |   | 6 | 74 | 13000 (15000) | 1.29 |
| 4 | MMA (100 eq) |   |   | $(iPrO)_2PH(=O)$ | 80 | 80/80/10 | 0.33 | 13 | 1300 (1300) | 1.20 |
|   |   |   |   |   |   |   | 1 | 52 | 4100 (5200) | 1.23 |

Monomer: methyl methacrylate (MMA)

Monomer concentration: 8 M (bulk)

Alkyl halide (R-I): 2-cyanopropyl iodide (CP-I)

Radical initiator (I): benzoyl peroxide (BPO)

Example 6

Bulk and Solution Polymerizations of methyl methacrylate (MMA) with N-iodosuccinimide (NIS) (Catalyst)

Figure 6A:
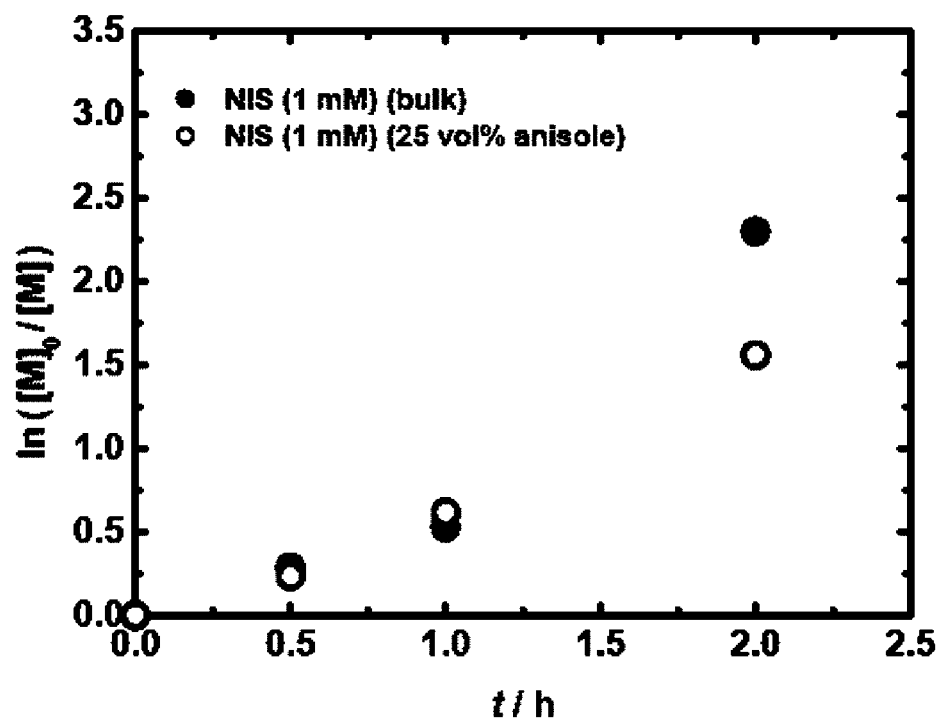
FIG. 6A is a graph showing the changes over time in the monomer concentration during MMA polymerization (MMA/CP—I/AIBN/NIS (80° C.)). Black circles represent the values of entry 1 as given in Table 6. White circles represent the values of entry 2 as given in Table 6.
Figure 6B:
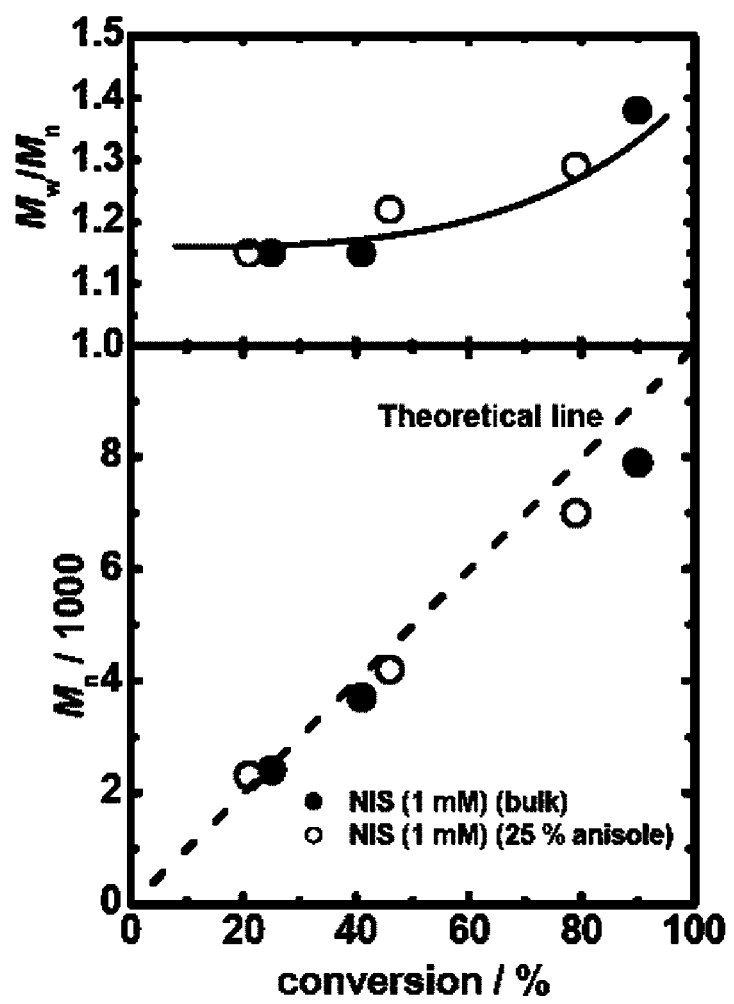
FIG. 6B is a graph plotting $M_n$ and $M_w/M_n$ vs. monomer conversion (ratio of polymerization) in the MMA polymerization (MMA/CP—I/AIBN/NIS (80° C.)). Regarding Mn, results that are consistent with the theoretical values, which are indicated as Theoretical line, are obtained.

Similarly to Example 4, bulk polymerizations and solution polymerizations of MMA were carried out, with the proviso that instead of $PI_3$ (Example 4), a nitrogen iodide, N-iodosuccinimide (NIS), was used as a catalyst (Table 6 and FIGS. 6A and 6B). The polymerization mechanism is the same as that with $PI_3$ (Example 4). 2-cyanopropyl iodide (CP—I), azobisisobutyronitrile (AIBN), and NIS were used as an alkyl iodide, a radical initiator, and a catalyst, respectively, and the polymerizations were carried out at 80° C. With 1 mM of NIS, polymers having low polydispersities were obtained (Table 6, entry 1 and FIGS. 6A and 6B). Not only the bulk polymerization (Table 6, entry 1 and FIGS. 6A and 6B), but also the solution polymerization in 25% anisole was successful (Table 6, entry 2 and FIGS. 6A and 6B). A different radical initiator, benzoyl peroxide (BPO), was also applicable (Table 6, entry 3). With a lower CP—I concentration, polymers having higher molecular weights and low polydispersities were obtained (Table 6, entry 4). When the temperature was lowered to 70° C., a satisfactory polydispersities were achieved (Table 6, entry 5). A different alkyl iodide, iodoform ($CHI_3$), was also successfully used (Table 6, entry 6).

TABLE 6

Bulk and solution polymerizations of methyl methacrylate (MMA) with N-iodosuccinimide (NIS) (catalyst).

| entry | Monomer (equivalent to $[R-I]_0$) | solvent | R-I | I | catalyst | T (° C.) | $[R-I]_0/[I]_0/$ $[catalyst]_0$ (mM) | T (h) | conv (%) | $M_n$ ($M_{n,theo}$) | PDI |
|---|---|---|---|---|---|---|---|---|---|---|---|
| 1 | MMA (100 eq) | bulk | CP-I | AIBN | NIS | 80 | 80/10/1 | 0.5 | 25 | 2400 (2500) | 1.15 |
|   |   |   |   |   |   |   |   | 1 | 41 | 3700 (4100) | 1.15 |
|   |   |   |   |   |   |   |   | 2 | 90 | 7900 (9000) | 1.38 |
| 2 | MMA (100 eq) | anisole (25 vol %) |   |   |   |   | 60/10/1 | 0.5 | 21 | 2300 (2100) | 1.15 |
|   |   |   |   |   |   |   |   | 1 | 46 | 4200 (4600) | 1.22 |
|   |   |   |   |   |   |   |   | 2 | 79 | 7000 (7900) | 1.29 |
| 3 | MMA (100 eq) | bulk |   | BPO |   |   | 80/40/1 | 0.5 | 18 | 2000 (1800) | 1.16 |
|   |   |   |   |   |   |   |   | 1 | 41 | 3600 (4100) | 1.15 |
|   |   |   |   |   |   |   |   | 1.5 | 63 | 5400 (6300) | 1.24 |
| 4 | MMA (200 eq) |   |   |   |   |   | 40/20/1 | 1 | 29 | 5100 (5800) | 1.13 |
|   |   |   |   |   |   |   |   | 1.5 | 48 | 7800 (9600) | 1.22 |
|   |   |   |   |   |   |   |   | 2 | 75 | 15000 (15000) | 1.47 |
| 5 | MMA (200 eq) |   |   | AIBN |   | 70 | 40/20/1 | 1 | 9 | 2000 (1800) | 1.19 |
|   |   |   |   |   |   |   |   | 2 | 20 | 3600 (4000) | 1.14 |
|   |   |   |   |   |   |   |   | 3 | 32 | 5900 (6400) | 1.17 |
|   |   |   |   |   |   |   |   | 4 | 51 | 8100 (10200) | 1.28 |
|   |   |   |   |   |   |   |   | 5 | 66 | 17000 (13200) | 1.33 |
| 6 | MMA (100 eq) |   | $CHI_3$ |   |   |   | 80/20/1 | 2 | 19 | 2700 (1900) | 1.24 |
|   |   |   |   |   |   |   |   | 3 | 31 | 3300 (3100) | 1.26 |
|   |   |   |   |   |   |   |   | 4 | 41 | 3800 (4100) | 1.29 |
|   |   |   |   |   |   |   |   | 7 | 68 | 5600 (6800) | 1.43 |

Monomer: methyl methacrylate (MMA)
Monomer concentration: 8 M (in bulk) and 6 M (in 25 vol % anisole solution)
Alkyl halide (R-I): 2-cyanopropyl iodide (CP-I)
Radical initiator (I): azobisisobutyronitrile (AIBN), benzoyl peroxide (BPO)
Catalyst: N-iodosuccinimide (NIS)

Example 7

Bulk and Solution Polymerizations of glycidyl methacrylate (GMA) with N-iodosuccinimide (NIS) (Catalyst)

Figure 7A:
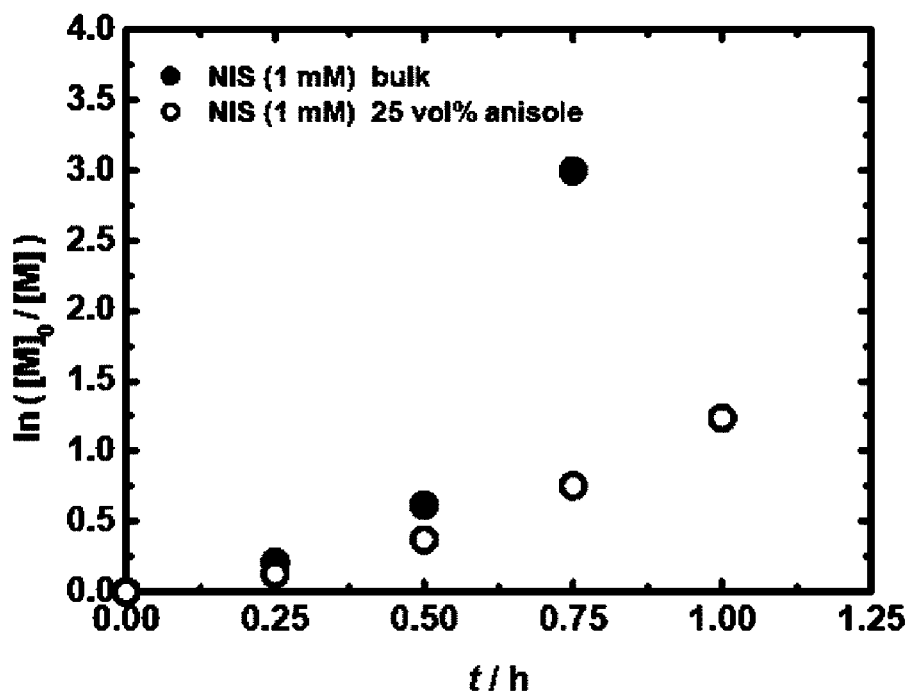
FIG. 7A is a graph showing the changes over time in the monomer concentration during GMA polymerization (GMA/CP—I/AIBN/NIS (80° C.)). Black circles represent the values of entry 1 as given in Table 7. White circles represent the values of entry 2 as given in Table 7.
Figure 7B:
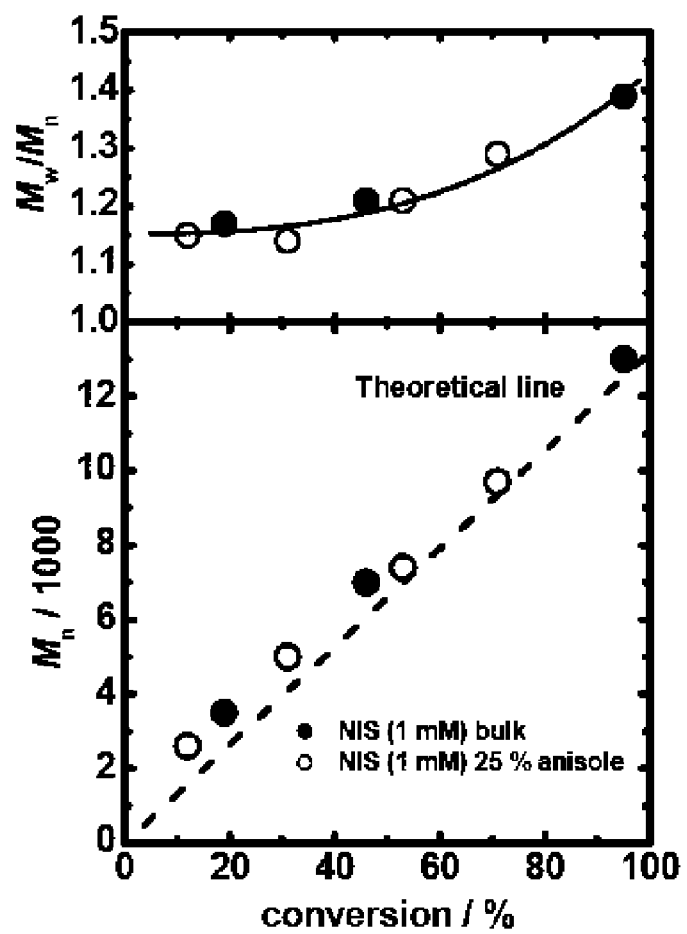
FIG. 7B is a graph plotting $M_n$ and $M_w/M_n$ vs. monomer conversion (ratio of polymerization) in the GMA polymerization (GMA/CP—I/AIBN/NIS (80° C.)). Regarding Mn, results that are consistent with the theoretical values, which are indicated as Theoretical line, are obtained.

Bulk polymerizations and solution polymerizations were carried out similarly to Example 6, using glycidyl methacrylate (GMA) instead of MMA (Example 6). A nitrogen iodide, N-iodosuccinimide (NIS), was used as a catalyst (Table 7 and FIGS. 7A and 7B). 2-cyanopropyl iodide (CP—I), azobisisobutyronitrile (AIBN), and NIS were used as an alkyl iodide, a radical initiator, and a catalyst, respectively, and the polymerizations were carried out at 80° C. With 1 mM of NIS, polymers having low polydispersities were obtained (Table 7, entry 1 and FIGS. 7A and 7B). The solution polymerization in 25% anisole was also successful (Table 7, entry 2 and FIGS. 7A and 7B).

TABLE 7

Bulk and solution polymerizations of glycidyl methacrylate (GMA) with N-iodosuccinimide (NIS) (catalyst).

| entry | Monomer (equivalent to [R-I]$_0$) | solvent | R-I | I | catalyst | T (° C.) | [R-I]$_0$/[I]$_0$/[catalyst]$_0$ (mM) | t (h) | conv (%) | M$_n$ (M$_{n,theo}$) | PDI |
|---|---|---|---|---|---|---|---|---|---|---|---|
| 1 | GMA (100 eq) | bulk | CP-I | AIBN | NIS | 80 | 80/10/1 | 0.25 | 19 | 3500 (2400) | 1.17 |
|   |   |   |   |   |   |   |   | 0.5 | 46 | 7000 (5900) | 1.21 |
|   |   |   |   |   |   |   |   | 0.75 | 95 | 13000 (12200) | 1.39 |
| 2 | GMA (100 eq) | anisole (25 vol %) |   |   |   |   | 60/10/1 | 0.25 | 12 | 2600 (1500) | 1.15 |
|   |   |   |   |   |   |   |   | 0.5 | 31 | 5000 (4000) | 1.14 |
|   |   |   |   |   |   |   |   | 0.75 | 53 | 7400 (6800) | 1.21 |
|   |   |   |   |   |   |   |   | 1 | 71 | 9700 (9100) | 1.29 |

Monomer: glycidyl methacrylate (GMA)
Monomer concentration: 8 M (in bulk) and 6 M (in 25 vol % anisole solution)
Alkyl halide (R-I): 2-cyanopropyl iodide (CP-I)
Radical initiator (I): azobisisobutyronitrile (AIBN)
Catalyst: N-iodosuccinimide (NIS)
M$_n$ and PDI: Molecular weight and polydispersity determined by multi-angle laser light scattering (MALLS) detector with gel permeation chromatography (GPC) with tetrahydrofuran as an eluent.

Example 8

Bulk Polymerizations of benzyl methacrylate (BzMA) with R$_2$PH(=O) (Catalyst)

Bulk polymerizations were carried out similarly to Example 5, using benzyl methacrylate (BzMA) instead of MMA (Example 5), with the proviso that a phosphorus hydride R$_2$PH(=O) was used as a catalyst (a precursor of catalyst) (Table 8). 2-cyanopropyl iodide (CP—I), lauroyl peroxide (LP), and (EtO)$_2$PH(=O) were used as an alkyl iodide, a radical initiator, and a catalyst (precursor), respectively, and the polymerizations were carried out at 70° C. With 20 mM of (EtO)$_2$PH(=O), polymers having low polydispersities were obtained (Table 8, entry 1).

TABLE 8

Bulk polymerizations of benzyl methacrylate (BzMA) with R$_2$PH(=O) (catalyst).

| entry | Monomer (equivalent to [R-I]$_0$) | R-I | I | catalyst | T (° C.) | [R-I]$_0$/[I]$_0$/[catalyst]$_0$ (mM) | t (h) | conv (%) | M$_n$ (M$_{n,theo}$) | PDI |
|---|---|---|---|---|---|---|---|---|---|---|
| 1 | BzMA (100 eq) | CP-I | LP | (EtO)$_2$PH(=O) | 70 | 80/40/20 | 2 | 90 | 12000 (16000) | 1.25 |

Monomer: benzyl methacrylate (BzMA)
Monomer concentration: 8 M (bulk)
Alkyl halide (R-I): 2-cyanopropyl iodide (CP-I)
Radical initiator (I): lauroyl peroxide (LP)
M$_n$ and PDI: Molecular weight and polydispersity determined by multi-angle laser light scattering (MALLS) detector with gel permeation chromatography (GPC) with tetrahydrofuran (THF) as an eluent.

Example 9

Bulk Polymerizations of benzyl methacrylate (BzMA) with N-iodosuccinimide (NIS) (Catalyst)

Figure 8A:
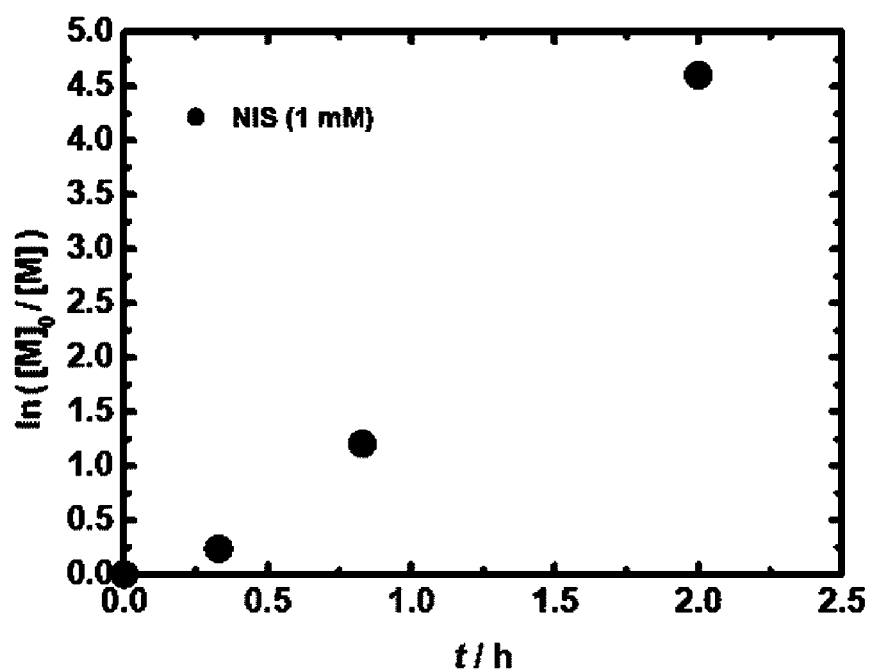
FIG. 8A is a graph showing the changes over time in the monomer concentration during BzMA polymerization (BzMA/CP—I/AIBN/NIS (80° C.)). The graph shows the values of entry 2 as given in Table 9.
Figure 8B:
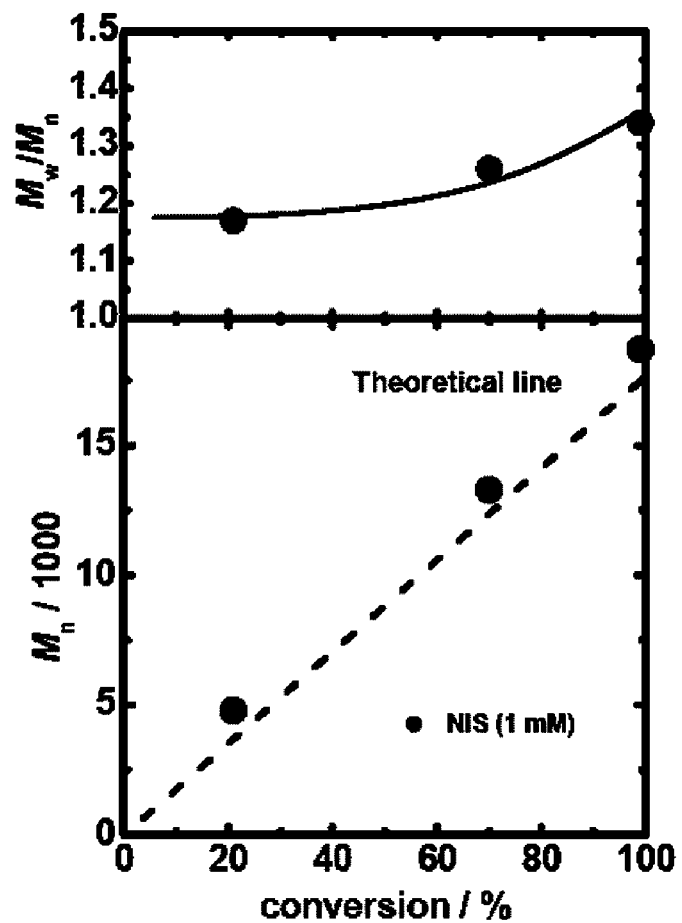
FIG. 8B is a graph plotting $M_n$ and $M_w/M_n$ vs. monomer conversion (ratio of polymerization) in the BzMA polymerization (BzMA/CP—I/AIBN/NIS (80° C.)). Regarding Mn, results that are consistent with the theoretical values, which are indicated as Theoretical line, are obtained.

Bulk polymerizations were carried out similarly to Example 6, using benzyl methacrylate (BzMA) instead of MMA (Example 6). A nitrogen iodide, N-iodosuccinimide (NIS), was used as a catalyst (Table 9 and FIGS. 8A and 8B).

2-cyanopropyl iodide (CP—I), azobisisobutyronitrile (AIBN), and NIS were used as an alkyl iodide, a radical initiator, and a catalyst, respectively, and the polymerizations were carried out at 80° C. With 2 mM of NIS, polymers having low polydispersities were obtained (Table 9, entry 1). Even with a lower concentration (1 mM) of NIS, low polydispersity was achieved (Table 9, entry 2 and FIGS. 8A and 8B).

TABLE 9

Bulk polymerizations of benzyl methacrylate (BzMA) with N-iodosuccinimide (NIS) (catalyst).

| entry | Monomer (equivalent to [R-I]$_0$) | R-I | I | catalyst | T (° C.) | [R-I]$_0$/[I]$_0$/ [catalyst]$_0$ (mM) | t (h) | conv (%) | M$_n$ (M$_{n,theo}$) | PDI |
|---|---|---|---|---|---|---|---|---|---|---|
| 1 | BzMA (100 eq) | CP-I | AIBN | NIS | 80 | 80/10/2 | 0.75 | 21 | 4700 (3600) | 1.13 |
|   |   |   |   |   |   |   | 1.5 | 70 | 15200 (14000) | 1.28 |
|   |   |   |   |   |   |   | 2.5 | 99 | 19400 (17600) | 1.37 |
| 2 | BzMA (100 eq) |   |   |   |   | 80/10/1 | 0.33 | 21 | 4800 (3700) | 1.17 |
|   |   |   |   |   |   |   | 0.83 | 70 | 13300 (13000) | 1.26 |
|   |   |   |   |   |   |   | 2 | 99 | 18700 (17000) | 1.34 |

Monomer: benzyl methacrylate (BzMA)
Monomer concentration: 8 M (bulk)
Alkyl halide (R-I): 2-cyanopropyl iodide (CP-I)
Radical initiator (I): azobisisobutyronitrile (AIBN)
Catalyst: N-iodosuccinimide (NIS)
M$_n$ and PDI: Molecular weight and polydispersity determined by multi-angle laser light scattering (MALLS) detector with gel permeation chromatography (GPC) with tetrahydrofuran (THF) as an eluent.

Example 10

Solution Polymerization of 2-hydroxyethyl methacrylate (HEMA) with N-iodosuccinimide (NIS) (Catalyst)

Solution polymerizations of 2-hydroxyethyl methacrylate (HEMA) instead of MMA (Example 6) were carried out similarly to Example 6, with a nitrogen iodide, N-iodosuccinimide (NIS), as a catalyst (Table 10). 2-cyanopropyl iodide (CP—I), azobisisobutyronitrile (AIBN), and NIS were used as an alkyl iodide, a radical initiator, and a catalyst, respectively, and the polymerizations were carried out at 80° C. The solvent was a mixture of methylethylketone (MEK) (35 vol %) and 1-propanol (15 vol %). The remaining 50 vol % was the monomer (and the alkyl iodide, radical initiator and catalyst). With 5 to 10 mM of NIS, a polymer having a low polydispersity was obtained (Table 10).

TABLE 10

Solution polymerizations of 2-hydroxyethyl methacrylate (HEMA) with N-iodosuccinimide (NIS) (catalyst).

| Entry | Monomer (equivalent to [R-I]$_0$) | solvent | R-I | I | catalyst | T (° C.) | [R-I]$_0$/[I]$_0$/ [catalyst]$_0$ (mM) | t (h) | conv (%) | M$_n$ (M$_{n,theo}$) | PDI |
|---|---|---|---|---|---|---|---|---|---|---|---|
| 1 | HEMA (100 eq) | MEK/ 1-propanol (35/15 vol %) | CP-I | AIBN | NIS | 80 | 40/10/5 | 1.42 | 66 | 6300 (1400) | 1.27 |
| 2 | HEMA (100 |   |   |   |   |   | 40/15/10 | 1 | 42 | 7200 (5400) | 1.29 |

TABLE 10-continued

Solution polymerizations of 2-hydroxyethyl methacrylate (HEMA) with N-iodosuccinimide (NIS) (catalyst).

| Entry | Monomer (equivalent to [R-I]$_0$ eq) | solvent | R-I | I | catalyst | T (° C.) | [R-I]$_0$/[I]$_0$/ [catalyst]$_0$ (mM) | t (h) | conv (%) | M$_n$ (M$_{n,theo}$) | PDI |
|---|---|---|---|---|---|---|---|---|---|---|---|
| | | | | | | | | 1.5 | 57 | 7900 (7400) | 1.36 |

Monomer: 2-hydroxyethyl methacrylate (HEMA)
Monomer concentration: 4 M in 35 vol % methylethylketone and 15 vol % 1-propanol
Alkyl halide (R-I): 2-cyanopropyl iodide (CP-I)
Radical initiator (I): azobisisobutyronitrile (AIBN)
Catalyst: N-iodosuccinimide (NIS)
M$_n$ and PDI: Molecular weight and polydispersity determined by multi-angle laser light scattering (MALLS) detector with gel permeation chromatography (GPC) with dimethyl formamide (DMF) as an eluent.

Example 11

Bulk Polymerizations of poly(ethylene glycol)methyl ether methacrylate (PEGMA) with N-iodosuccinimide (NIS) (Catalyst)

Bulk polymerizations of poly(ethylene glycol) methyl ether methacrylate (PEGMA) instead of MMA in Example 6 were carried out similarly to Example 6 with a nitrogen iodide, N-iodosuccinimide (NIS), as a catalyst (Table 11). 2-cyanopropyl iodide (CP—I), azobisisobutyronitrile (AIBN), and NIS were used as an alkyl iodide, a radical initiator, and a catalyst, respectively, and the polymerizations were carried out at 80° C. Two PEGMAs with different molecular weights of 246 and 475 were examined. For both PEGMAs, with a small amount of catalyst (NIS) (1 to 2 mM), polymers having low polydispersities were obtained (Table 11).

TABLE 11

Bulk polymerizations of poly(ethylene glycol) methyl ether methacrylate (PEGMA) with N-iodosuccinimide (NIS) (catalyst).

| entry | Monomer (equivalent to [R-I]$_0$) | R-I | I | catalyst | T (° C.) | [R-I]$_0$/[I]$_0$/ [catalyst]$_0$ (mM) | t (h) | Conv (%) | M$_n$ (M$_{n,theo}$) | PDI |
|---|---|---|---|---|---|---|---|---|---|---|
| 1 | PEGMA (M.W. = 246) (100 eq) | CP-I | AIBN | NIS | 80 | 80/10/2 | 0.5 | 13 | 3900 (3200) | 1.19 |
| | | | | | | | 1 | 39 | 8600 (9600) | 1.33 |
| 2 | PEGMA (M.W. = 475) (80 eq) | | | | | 100/80/1 | 0.75 | 41 | 9700 (15000) | 1.10 |

Monomer: poly(ethylene glycol) methyl ether methacrylate (PEGMA): molecular weights (M.W.) = 246 and 475.

Monomer concentration: 8 M (bulk).

Alkyl halide (R-I): 2-cyanopropyl iodide (CP-I)

Radical initiator (I): azobisisobutyronitrile (AIBN)

Catalyst: N-iodosuccinimide (NIS)

M$_n$ and PDI: Molecular weight and polydispersity determined by multi-angle laser light scattering (MALLS) detector with gel permeation chromatography (GPC) with N,N-dimethyl formamide (DMF) as an eluent.

Example 12

Solution Polymerization of methacrylic acid (MAA) with $R_2PH(=O)$ (Catalyst)

Solution polymerization of methacrylic acid (MAA) Instead of MMA in Example 5 was carried out similarly to Example 6 with a phosphorus hydride $R_2PH(=O)$ as a catalyst (a precursor of a catalyst) (Table 12). 2-cyanopropyl iodide (CP—I), benzoylperoxide(BPO), and $(EtO)_2PH(=O)$ were used as an alkyl iodide, a radical initiator, and a catalyst (precursor), respectively, and the polymerization was carried out at 70° C. Ethanol (50 vol %) was used as a solvent. It is noted that the remaining 50 vol % is monomer (and alkyl halide, radical initiator and catalyst). With 10 mM of $(EtO)_2PH(=O)$, a polymer having a low polydispersity was obtained (Table 12).

TABLE 12

Solution polymerization of methacrylic acid (MAA) with $R_2PH(=O)$ (catalyst).

| entry | Monomer (equivalent to $[R-I]_0$) | solvent | R-I | I | catalyst | T (°C.) | $[R-I]_0/[I]_0/[catalyst]_0$ (mM) | t (h) | conv (%) | $M_n$ ($M_{n,theo}$) | PDI |
|---|---|---|---|---|---|---|---|---|---|---|---|
| 1 | MAA (100 eq) | ethanol (50 vol %) | CP-I | BPO | $(EtO)_2PH(=O)$ | 70 | 40/10/10 | 23 | 34 | 9000 (3100) | 1.40 |

Monomer: methacrylic acid (MAA)

Monomer concentration: 4 M in 50 vol % ethanol

Alkyl halide (R-I): 2-cyanopropyl iodide (CP-I)

Radical initiator (I): benzoyl peroxide (BPO)

$M_n$ and PDI: Molecular weight and polydispersity obtained by gel permeation chromatography (GPC) with water as an eluent calibrated by poly(styrenesulfonic acid sodium salt) (PSSNa) standard.

Example 13

Bulk Polymerization of vinyl acetate (VAc) with $PI_3$ (Catalyst)

Figure 9A:
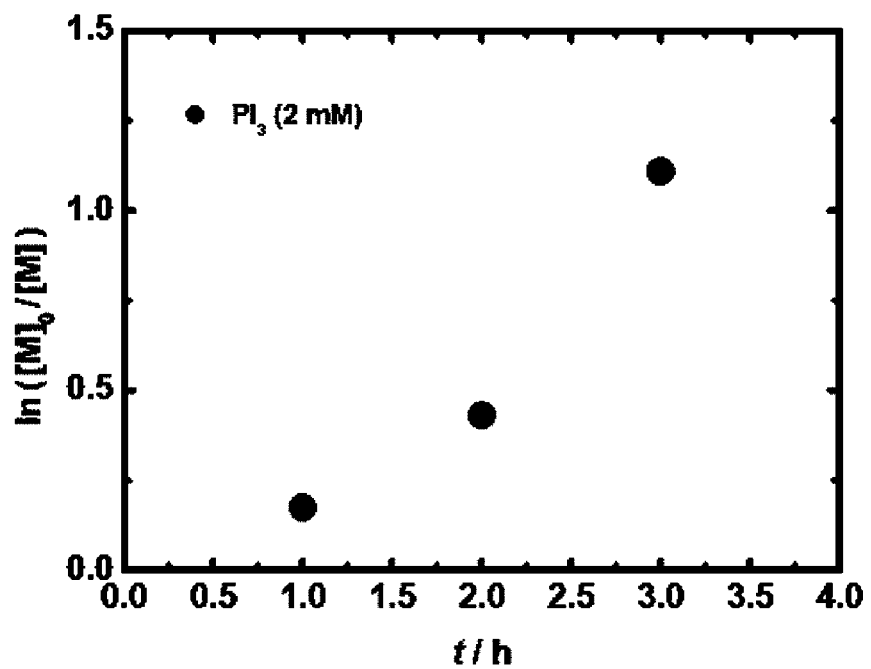
FIG. 9A is a graph showing the changes over time in the monomer concentration during VAc polymerization (VAc/EA-I/AIBN/PI$_3$ (70° C.)). The graph shows the values of entry 1 as given in Table 13.
Figure 9B:
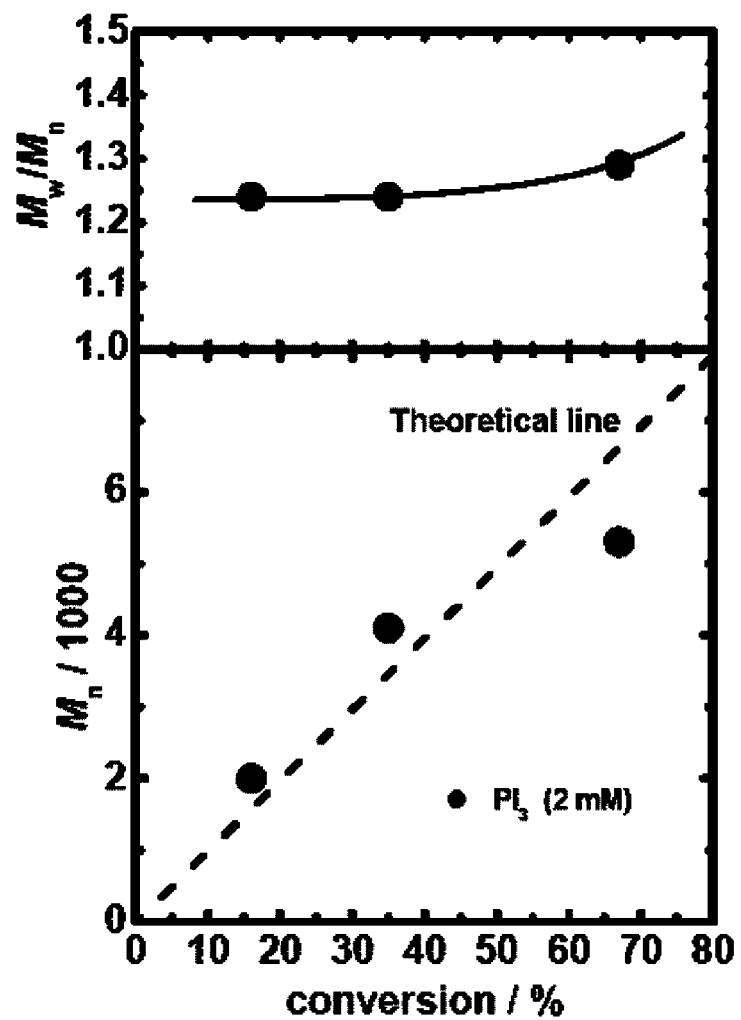
FIG. 9B is a graph plotting $M_n$ and $M_w/M_n$ vs. monomer conversion (ratio of polymerization) in the VAc polymerization (VAc/EA-I/AIBN/PI$_3$ (70° C.)). Regarding Mn, results that are consistent with the theoretical values, which are indicated as Theoretical line, are obtained.

Bulk polymerization of vinyl acetate (VAc) instead of MMA in Example 4 was carried out similarly to Example 4 with a phosphorus iodide $PI_3$ as a catalyst (Table 13 and FIGS. 9A and 9B). Ethyl iodoacetate (EA-I: the structural formula is shown above), azobisisobutyronitrile (AIBN), and $PI_3$ were used as an alkyl iodide, a radical initiator, and a catalyst, respectively, and the polymerizations were carried out at 70° C. With 2 mM of $PI_3$, polymers having low polydispersities were obtained (Table 13 and FIGS. 9A and 9B).

TABLE 13

Bulk polymerization of vinyl acetate (VAc) with $PI_3$ (catalyst).

| entry | Monomer (equivalent to $[R-I]_0$) | R-I | I | catalyst | T (°C.) | $[R-I]_0/[I]_0/[catalyst]_0$ (mM) | t (h) | conv (%) | $M_n$ ($M_{n,theo}$) | PDI |
|---|---|---|---|---|---|---|---|---|---|---|
| 1 | VAc (100 eq) | EA-I | AIBN | $PI_3$ | 70 | 80/40/2 | 1 | 16 | 2000 (1400) | 1.24 |
| | | | | | | | 2 | 35 | 4100 (3000) | 1.24 |
| | | | | | | | 3 | 67 | 5300 (5800) | 1.29 |

Monomer: vinyl acetate (VAc)

Monomer concentration: 8 M (bulk)

Alkyl halide (R-I): ethyl iodoacetate (EA-I)

Radical initiator (I): azobisisobutyronitrile (AIBN)

$M_n$ and PDI: Molecular weight and polydispersity obtained by gel permeation chromatography with tetrahydrofuran (THF) as an eluent calibrated by poly(methyl methacrylate) (PMMA) standard.

Example 14

Bulk Random Copolymerization of n-butyl acrylate (BA) and styrene (St) with $PI_3$ (Catalyst)

Instead of homopolymerization (Example 1), a random copolymerization of n-butyl acrylate (BA) and styrene (St) was carried out similarly to Example 1 with $PI_3$ as a catalyst in bulk (without a solvent) (Table 14). 2-cyanopropyl iodide (CP—I), dicumyl peroxide (DCP), and $PI_3$ were used as an alkyl iodide, a radical initiator, and a catalyst, respectively, and the polymerization was carried out at 100° C. With 1 mM of $PI_3$, a polymer having a low polydispersity was obtained (Table 14).

TABLE 14

Bulk random copolymerization of n-butyl acrylate (BA) and styrene (St) with $PI_3$ (catalyst).

| entry | Monomer (equivalent to $[R-I]_0$) | Monomer composition (mol/mol) | R-I | I | catalyst | T (° C.) | $[R-I]_0/[I]_0/[catalyst]_0$ (mM) | t (h) | conv (%) | $M_n$ ($M_{n,theo}$) | PDI |
|---|---|---|---|---|---|---|---|---|---|---|---|
| 1 | BA/St (100 eq) | 22/78 | CP-I | DCP | $PI_3$ | 100 | 80/80/1 | 24 | 26 | 2100 (2800) | 1.23 |

Monomer: n-butyl acrylate (BA), Styrene (St)
Monomer concentration: 8 M (bulk)
Alkyl halide (R-I): 2-cyanopropyl iodide (CP-I)
Radical initiator (I): dicumyl peroxide (DCP)
Catalyst: $PI_3$
$M_n$ and PDI: Molecular weight and polydispersity obtained by gel permeation chromatography (GPC) with tetrahydrofuran (THF) as an eluent calibrated by polystyrene (PSt) standard.

Example 15

Bulk Random Copolymerization of n-butyl acrylate (BA) and styrene (St) with $R_2PH(\!=\!O)$ (Catalyst)

Instead of homopolymerization (Example 2), a random copolymerization of n-butyl acrylate (BA) and styrene (St) was carried out similarly to Example 2 with $R_2PH(\!=\!O)$ as a catalyst (precursor) in bulk (without a solvent) (Table 15). 2-cyanopropyl iodide (CP—I), benzoyl peroxide (BPO), and $Ph(EtO)PH(\!=\!O)$ were used as an alkyl iodide, a radical initiator, and a catalyst (precursor), respectively, and the polymerization was carried out at 100° C. With 30 mM of $Ph(EtO)PH(\!=\!O)$, a polymer having a low polydispersity was obtained (Table 15).

TABLE 15

Bulk random copolymerization of n-butyl acrylate (BA) and styrene (St) with $R_2PH(\!=\!O)$ (catalyst).

| entry | Monomer (equivalent to $[R-I]_0$) | Monomer composition (mol/mol) | R-I | I | catalyst | T (° C.) | $[R-I]_0/[I]_0/[catalyst]_0$ (mM) | t (h) | conv (%) | $M_n$ ($M_{n,theo}$) | PDI |
|---|---|---|---|---|---|---|---|---|---|---|---|
| 1 | BA/St (100 eq) | 22/78 | CP-I | DCP | $Ph(EtO)PH(\!=\!O)$ | 100 | 80/80/30 | 24 | 57 | 6200 (6200) | 1.32 |

Monomer: n-butyl acrylate (BA), styrene (St)

Monomer concentration: 8 M (bulk)

Alkyl halide (R-I): 2-cyanopropyl iodide (CP-I)

Radical initiator (I): dicumyl peroxide (DCP)

Catalyst: $Ph(EtO)PH(\!=\!O)$ $M_n$ and PDI: Molecular weight and polypolydispersity obtained by gel permeation chromatography (GPC) with tetrahydrofuran (THF) as an eluent calibrated by polystyrene (PSt) standard.

Example 16

Bulk Random Copolymerizations of 2-hydroxyethyl methacrylate (HEMA) and benzyl methacrylate (BzMA) with N-iodosuccinimide (NIS) (Catalyst)

Instead of the homopolymerizations in Examples 9 and 10, bulk random copolymerizations of 2-hydroxyethyl methacrylate (HEMA) and benzyl methacrylate (BzMA) were carried out similarly to Examples 9 and 10 with a nitrogen iodide, N-iodosuccinimide (NIS), as a catalyst, at two different monomer compositions (Table 16). 2-cyanopropyl iodide (CP—I), azobisisobutyronitrile (AIBN), and NIS were used as an alkyl iodide, a radical initiator, and a catalyst, respectively, and the polymerizations were carried out at 80° C. With 1-2 mM of NIS, polymers having low polydispersities were obtained for both monomer compositions of 15 (HEMA)/85 (BzMA) (Table 16, entry 1) and 22 (HEMA)/78 (BzMA) (Table 16, entry 2).

TABLE 16

Bulk random copolymerizations of 2-hydroxyethyl methacrylate (HEMA) and benzyl methacrylate (BzMA) with N-iodosuccinimide (NIS) (catalyst).

| Entry | Monomer (equivalent to $[R-I]_0$) | Monomer composition (mol/mol) | R-I | I | catalyst | T (° C.) | $[R-I]_0/[I]_0/[catalyst]_0$ (mM) | t (h) | conv (%) | $M_n$ ($M_{n,theo}$) | PDI |
|---|---|---|---|---|---|---|---|---|---|---|---|
| 1 | HEMA/BzMA (100 eq) | 15/85 | CP-I | AIBN | NIS | 80 | 80/10/1 | 1.25 | 90 | 15800 (15000) | 1.42 |
| 2 | HEMA/BzMA (100 eq) | 22/78 | | | | | 80/10/2 | 1.25 | 90 | 18500 (15200) | 1.37 |

Monomer: 2-hydroxyethyl methacrylate (HEMA), benzyl methacrylate (BzMA)
Monomer concentration: 8 M (bulk)
Alkyl halide (R-I): 2-cyanopropyl iodide (CP-I)
Radical initiator (I): azobisisobutyronitrile (AIBN)
Catalyst: N-iodosuccinimide (NIS)
$M_n$ and PDI: Molecular weight and polydispersity obtained by gel permeation chromatography (GPC) with N,N-dimethylformamide (DMF) as an eluent calibrated by poly(methyl methacrylate) (PMMA) standard.

Example 17

Bulk Random Copolymerizations of methacrylic acid (MAA) and benzyl methacrylate (BzMA) with N-iodosuccinimide (NIS) (Catalyst)

Instead of the homopolymerizations in Example 9, bulk random copolymerizations of methacrylic acid (MAA) and benzyl methacrylate (BzMA) were carried out similarly to Example 9 with a nitrogen iodide, N-iodosuccinimide (NIS), as a catalyst, at two different monomer compositions (Table 17). 2-cyanopropyl iodide (CP—I), azobisisobutyronitrile (AIBN), and NIS were used as an alkyl iodide, a radical initiator, and a catalyst, respectively, and the polymerizations were carried out at 80° C. With 1-1.5 mM of NIS, polymers having low polydispersities were obtained for both monomer compositions of 15 (MAA)/85 (BzMA) (Table 17, entry 1) and 67 (MAA)/33 (BzMA) (Table 17, entry 2).

TABLE 17

Bulk random copolymerizations of methacrylic acid (MAA) and benzyl methacrylate (BzMA) with N-iodosuccinimide (NIS) (catalyst).

| entry | Monomer (equivalent to $[R-I]_0$) | Monomer composition (mol/mol) | R-I | I | catalyst | T (° C.) | $[R-I]_0/[I]_0/[catalyst]_0$ (mM) | T (h) | conv (%) | $M_n$ ($M_{n,theo}$) | PDI |
|---|---|---|---|---|---|---|---|---|---|---|---|
| 1 | MAA/BzMA (100 eq) | 15/85 | CP-I | AIBN | NIS | 80 | 80/40/1 | 0.5 | 50 | 5900 (8100) | 1.20 |
| | | | | | | | | 1 | 59 | 6400 (9600) | 1.21 |
| | | | | | | | | 2 | 63 | 6600 (10200) | 1.26 |

TABLE 17-continued

Bulk random copolymerizations of methacrylic acid (MAA) and benzyl methacrylate (BzMA) with N-iodosuccinimide (NIS) (catalyst).

| entry | Monomer (equivalent to [R-I]$_0$) | Monomer composition (mol/mol) | R-I | I | catalyst | T (°C.) | [R-I]$_0$/[I]$_0$/[catalyst]$_0$ (mM) | T (h) | conv (%) | $M_n$ ($M_{n,theo}$) | PDI |
|---|---|---|---|---|---|---|---|---|---|---|---|
| 2 | MAA/BzMA (100 eq) | 67/33 | | | | | 80/80/1.5 | 0.75 | 12 | 1800 (1800) | 1.19 |
| | | | | | | | | 2 | 23 | 2200 (3400) | 1.24 |

Monomer: methacrylic acid (MAA), benzyl methacrylate (BzMA)
Monomer concentration: 8 M (bulk)
Alkyl halide (R-I): 2-cyanopropyl iodide (CP-I)
Radical initiator (I): azobisisobutyronitrile (AIBN)
Catalyst: N-iodosuccinimide (NIS)
$M_n$ and PDI: Molecular weight and polydispersity obtained by gel permeation chromatography with N,N-dimethyl formamide (DMF) as an eluent calibrated by poly(methyl methacrylate) (PMMA) standard.

Example 18

Bulk Random Copolymerizations of N,N-dimethylaminoethyl methacrylate (DMAEMA) and benzyl methacrylate (BzMA) with N-iodosuccinimide (NIS) (Catalyst)

Instead of the homopolymerization in Example 9, the bulk random copolymerizations of N,N-dimethylaminoethyl methacrylate (DMAEMA) and benzyl methacrylate (BzMA) were carried out with a nitrogen iodide, N-iodosuccinimide (NIS), as a catalyst, at two different monomer compositions (Table 18). 2-cyanopropyl iodide (CP—I), azobisisobutyronitrile (AIBN), and NIS were used as an alkyl iodide, a radical initiator, and a catalyst, respectively, and the polymerizations were carried out at 80° C. With 1-2 mM of NIS, polymers having low polydispersities were obtained for both monomer compositions of 15 (DMAEMA)/85 (BzMA) (Table 18, entry 1) and 18 (DMAEMA)/82 (BzMA) (Table 18, entry 2).

TABLE 18

Bulk random copolymerizations of N,N-dimethylaminoethyl methacrylate (DMAEMA) and benzyl methacrylate (BzMA) with N-iodosuccinimide (NIS) (catalyst).

| entry | Monomer (equivalent to [R-I]$_0$) | Monomer composition (mol/mol) | R-I | I | catalyst | T (°C.) | [R-I]$_0$/[I]$_0$/[catalyst]$_0$ (mM) | t (h) | conv (%) | $M_n$ ($M_{n,theo}$) | PDI |
|---|---|---|---|---|---|---|---|---|---|---|---|
| 1 | DMAEMA/BzMA (100 eq) | 15/85 | CP-I | AIBN | NIS | 80 | 80/10/1 | 0.75 | 43 | 13900 (7400) | 1.45 |
| | | | | | | | | 1.25 | 90 | 19000 (15600) | 1.34 |
| 2 | DMAEMA/BzMA (100 eq) | 18/82 | | | | | 80/20/2 | 0.33 | 23 | 11500 (4000) | 1.40 |
| | | | | | | | | 0.75 | 62 | 13400 (10700) | 1.40 |
| | | | | | | | | 1.25 | 90 | 15500 (15500) | 1.37 |

Monomer: N,N-dimethylaminoethyl methacrylate (DMAEMA), benzyl methacrylate (BzMA)

Monomer concentration: 8 M (bulk)

Alkyl halide (R-I): 2-cyanopropyl iodide (CP-I)

Radical initiator (I): azobisisobutyronitrile (AIBN)

Catalyst: N-iodosuccinimide (NIS)

$M_n$ and PDI: Molecular weight and polydispersity obtained by gel permeation chromatography (GPC) with N,N-dimethyl formamide (DMF) as an eluent calibrated by poly(methyl methacrylate) (PMMA) standard.

Example 19

Block Copolymerization of methyl methacrylate (MMA) and styrene (St) with PI$_3$ (Catalyst)

Block copolymerization of methyl methacrylate (MMA) and styrene (St) was carried out with a phosphorus iodide PI$_3$ as a catalyst (Table 19). For the first block, the bulk polymerization of MMA (8M) was carried out with 2-cyanopropyl iodide (CP—I: 80 mM), benzoyl peroxide (BPO: 40 mM), and PI$_3$ (1 mM), as an alkyl iodide, a radical initiator, and a catalyst, at 80° C. for 1 hour. After purification by reprecipitation from hexane (non-solvent), a poly(methyl methacrylate) iodide (PMMA-I) with $M_n$=4000 and PDI=1.12 was obtained. Then, for the second block, the bulk polymerization of styrene was carried out with the above described PMMA-I (40 mM), dicumyl peroxide (DCP: 40 mM), and PI$_3$ (1 mM), as an alkyl iodide, a radical initiator, and a catalyst, respectively, at 100° C. for 24 hours. As a result, it was successful in yielding block copolymer (PMMA-b-PSt) having a low polydispersity with $M_n$=27000 and PDI=1.25, where PSt is polystyrene (Table 19).

TABLE 19

Block copolymerization of methyl methacrylate (MMA) and styrene (St) with PI$_3$ (catalyst).

| entry | First block (R-I) | Monomer (equivalent to [R-I]$_0$) | I | catalyst | T (° C.) | [R-I]$_0$/[I]$_0$/ [catalyst]$_0$ (mM) | t (h) | conv (%) | $M_n$ ($M_{n,theo}$) | PDI |
|---|---|---|---|---|---|---|---|---|---|---|
| 1 | PMMA-I ($M_n$ = 4100) (PDI = 1.12) | St (200 eq) | DCP | PI$_3$ | 80 | 40/40/1 | 24 | 90 | 27000 (24000) | 1.25 |

Monomer: styrene (St)
Monomer concentration: 8 M (bulk)
Alkyl halide (R-I): poly(methyl methacrylate) iodide (PMMA-I)
Radical initiator (I): dicumyl peroxide (DCP)
$M_n$ and PDI: Molecular weight and polydispersity obtained by gel permeation chromatography (GPC) with tetrahydrofuran (THF) as an eluent calibrated by polystyrene (PSt) standard.

Example 20

Block Copolymerization of methyl methacrylate (MMA) and benzyl methacrylate (BzMA) with N-iodosuccinimide (NIS) (Catalyst)

Block copolymerization of methyl methacrylate (MMA) and benzyl methacrylate (BzMA) was carried out with a nitrogen iodide, N-iodosuccinimide (NIS), as a catalyst (Table 20). For the first block, the bulk polymerization of MMA (8 M) was carried out with 2-cyanopropyl iodide (CP—I: 80 mM), benzoyl peroxide (BPO: 40 mM), and NIS (1 mM), as an alkyl iodide, a radical initiator, and a catalyst, respectively, at 80° C. for 50 min. After purification by reprecipitation from hexane, a poly(methyl methacrylate) iodide (PMMA-I) with $M_n$=3900 and PDI=1.14 was obtained. Then, for the second block, the bulk polymerization of BzMA was carried out with the above described PMMA-I (80 mM), azobisisobutyronitrile (AIBN: 20 mM), and NIS (1 mM), as an alkyl iodide, a radical initiator, and a catalyst, respectively, at 80° C. As a result, block copolymers (PMMA-b-PBzMA) having low polydispersities were obtained (Table 20), where PBzMA is poly(benzyl methacrylate).

TABLE 20

Block copolymerization of methyl methacrylate (MMA) and benzyl methacrylate (BzMA) with N-iodosuccinimide (NIS) (catalyst).

| entry | First block (R-I) | Monomer (equivalent to [R-I]$_0$) | I | catalyst | T (° C.) | [R-I]$_0$/[I]$_0$/ [catalyst]$_0$ (mM) | t (h) | conv (%) | $M_n$ ($M_{n,theo}$) | PDI |
|---|---|---|---|---|---|---|---|---|---|---|
| 1 | PMMA-I ($M_n$ = 3900) (PDI = 1.14) | BzMA (100 eq) | AIBN | NIS | 80 | 80/20/1 | 0.25 | 7 | 5100 (5100) | 1.13 |
| | | | | | | | 0.5 | 24 | 7100 (8100) | 1.13 |
| | | | | | | | 0.75 | 50 | 10500 (12700) | 1.19 |

TABLE 20-continued

Block copolymerization of methyl methacrylate (MMA) and benzyl methacrylate (BzMA) with N-iodosuccinimide (NIS) (catalyst).

| entry | First block (R-I) | Monomer (equivalent to $[R-I]_0$) | I | catalyst | T (°C.) | $[R-I]_0/[I]_0/$ $[catalyst]_0$ (mM) | t (h) | conv (%) | $M_n$ ($M_{n,theo}$) | PDI |
|---|---|---|---|---|---|---|---|---|---|---|
| | | | | | | | 1 | 63 | 11100 (15000) | 1.2 |
| | | | | | | | 1.25 | 70 | 11700 (16000) | 1.21 |
| | | | | | | | 1.5 | 100 | 13000 (20000) | 1.26 |

Monomer: benzyl methacrylate (BzMA)
Monomer concentration: 8 M (bulk)
Alkyl halide (R-I): poly(methyl methacrylate)-iodide (PMMA-I)
Radical initiator (I): azobisisobutyronitrile (AIBN)
Catalyst: N-iodosuccinimide (NIS)
$M_n$ and PDI: Molecular weight and polydispersity obtained by gel permeation chromatography (GPC) with tetrahydrofuran (THF) as an eluent calibrated by poly(methyl methacrylate) (PMMA) standard.

Example 21

Block Copolymerization of methyl methacrylate (MMA) (First Block, Homopolymerization) and methacrylic acid (MAA) and benzyl methacrylate (BzMA) (Second Block: Random Copolymerization) with N-iodosuccinimide (NIS) (Catalyst)

Block copolymerization of methyl methacrylate (MMA) (first block (homopolymerization)) and methacrylic acid (MAA) and benzyl methacrylate (BzMA) (second block (random copolymerization)) was carried out with a nitrogen iodide, N-iodosuccinimide (NIS), as a catalyst (Table 21). For the first block, the bulk polymerization of MMA (8 M) was carried out with 2-cyanopropyl iodide (CP—I: 80 mM), benzoyl peroxide (BPO: 40 mM), and NIS (1 mM), as an alkyl iodide, a radical initiator, and a catalyst, respectively, at 80° C. for 50 min. After purification by reprecipitation from hexane, a poly (methyl methacrylate) iodide (PMMA-I) with $M_n$=3600 and PDI=1.08 was obtained. Then, for the second block, the bulk random copolymerization of MAA and BzMA at the monomer composition of 15 (MAA)/85 (BzMA) mol/mol was carried out with the above described PMMA-I (80 mM), azobisisobutyronitrile (AIBN: 40 mM), and NIS (1 mM), as an alkyl iodide, a radical initiator, and a catalyst, respectively, at 80° C., yielding block copolymers (PMMA-block-(PMAA-random-PBzMA)) having low polydispersities (Table 21), where PMAA and PBzMA are poly (methacrylic acid) and poly(benzyl methacrylate), respectively.

TABLE 21

Block copolymerization of methyl methacrylate (MMA) (first block: homopolymerization) and methacrylic acid (MAA) and benzyl methacrylate (BzMA) (second block: random copolymerization) with N-iodosuccinimide (NIS) (catalyst).

| entry | First block (R-I) | Monomer (equivalent to $[R-I]_0$) | Monomer Composition (mol/mol) | I | catalyst | T (°C.) | $[R-I]_0/[I]_0/$ $[catalyst]_0$ (mM) | t (h) | conv (%) | $M_n$ ($M_{n,theo}$) | PDI |
|---|---|---|---|---|---|---|---|---|---|---|---|
| 1 | PMMA-I ($M_n$ = 3600) (PDI = 1.08) | MAA/ BzMA (100 eq) | 15/85 | AIBN | NIS | 80 | 80/40/1 | 0.33 | 7 | 5000 (4700) | 1.11 |
| | | | | | | | | 1.33 | 15 | 5800 (6000) | 1.20 |

Monomer: methacrylic acid (MAA), benzyl methacrylate (BzMA)

Monomer concentration: 8 M (bulk)

Alkyl halide (R-I): poly(methyl methacrylate) iodide (PMMA-I)

Radical initiator (I): azobisisobutyronitrile (AIBN)

Catalyst: N-iodosuccinimide (NIS)

$M_n$ and PDI: Molecular weight and polydispersity obtained by gel permeation chromatography (GPC) with N,N-dimethyl formamide (DMF) as an eluent calibrated by poly(methyl methacrylate) (PMMA) standard.

Example 22

Block Copolymerization of benzyl methacrylate (BzMA) (First Block) and N,N-dimethylaminoethyl methacrylate (DMAEMA) (Second Block) with $R_2PH(=O)$ (Catalyst) by Successive Addition of DMAEMA Block copolymerization of benzyl methacrylate (BzMA) and N,N-dimethylaminoethyl methacrylate (DMAEMA) was carried out with a phosphorus hydride compound $R_2PH(=O)$ as a catalyst (a precursor of a catalyst) (Table 22). For the first block, the bulk polymerization of BzMA (8 M) was carried out with 2-cyanopropyl iodide (CP—I: 120 mM), lauroyl peroxide (LP: 60 mM), and $(EtO)_2PH(=O)$ (30 mM), as an alkyl iodide, a radical initiator, and a catalyst, respectively, at 70° C. for 3 hours. A poly (benzyl methacrylate) iodide (PBzMA-I) with $M_n=8900$ and PDI=1.35 was produced at the monomer conversion of 89%. To this solution (without the isolation/purification of the PBzMA-I), DMAEMA (20 equivalent to [CP—I]) was successively added as the second block monomer. The polymerization for the second block was carried out at 70° C. for 4 hours. A block copolymer (PBzMA-block-PDMAEMA) having a low dispersibility with $M_n=9400$ and PDI=1.35 was obtained at the monomer conversion of 97%, where PDMAEMA is poly (N,N-dimethylaminoethyl methacrylate) (Table 22).

TABLE 22

Block copolymerization of benzyl methacrylate (BzMA) (first block) and N,N-dimethylaminoethyl methacrylate (DMAEMA) (second block) with $R_2PH(=O)$ (catalyst) by successive addition of DMAEMA.

| entry | First monomer (equivalent to $[R-I]_0$) | Second monomer (equivalent to $[R-I]_0$) | R-I | I | catalyst | T (° C.) | $[R-I]_0/[I]_0/[catalyst]_0$ (mM) for first block | t (h) | conv (%) | $M_n$ ($M_{n,theo}$) | PDI |
|---|---|---|---|---|---|---|---|---|---|---|---|
| 1 | BzMA (63 eq) | DMAEMA (20 eq) | CP-I | LP | $(EtO)_2PH(=O)$ | 70 | 120/60/30 | 3 | 89 | 8900 (9900) | 1.35 |
|   |   |   |   |   |   |   |   | +4 | 97 | 9400 | 1.35 |
|   |   |   |   |   |   |   |   |   |   | (13800) |   |

Monomer: benzyl methacrylate (BzMA), N,N-dimethylaminoethyl methacrylate (DMAEMA)

Monomer concentration: 8 M (bulk)

Alkyl halide (R-I): 2-cyanopropyl iodide (CP-I)

Radical initiator (I): lauroyl peroxide (LP)

$M_n$ and PDI: Molecular weight and polydispersity obtained by gel permeation chromatography (GPC) with N,N-dimethyl formamide (DMF) as an eluent calibrated by poly(methyl methacrylate) (PMMA) standard.

Example 23

Block Copolymerization of methyl methacrylate (MMA) (Homopolymerization: First Block) and MMA and benzyl methacrylate (BzMA) (Random Copolymerization: Second Block) with N-iodosuccinimide (NIS) (Catalyst): Successive Addition of MMA and BzMA A block copolymerization, in which a homopolymer of methyl methacrylate (MMA) is the first block and a random copolymer of MMA and benzyl methacrylate (BzMA) is the second block, was carried out with a nitrogen catalyst, N-iodosuccinimide (NIS) (Table 23). For the first block, a solution polymerization of MMA (4M) (anisole 50 vol %) was carried out with 2-cyanopropyl iodide (CP—I) (40 mM), azobisisobutyronitrile (AIBN) (1 mM), and NIS (1 mM), which were used as alkyl iodide, radical initiator and catalyst, respectively, at 80° C. for 1.5 hours. The conversion reached 54%. A poly(methyl methacrylate)-iodine adduct (PMMA-I) having $M_n$=5,400 and PDI=1.31 was produced. To this solution, (without isolation or purification of the PMMA-I), BzMA was added, and polymerization was carried out at 80° C. Thus, for the second block, a random copolymer of MMA (which remained at the end of the polymerization of the first block) and BzMA was generated, and a PMMA-block-(PMMA-random-PBzMA) having a low dispersibility was produced (Table 23). Here PBzMA means poly(benzyl methacrylate).

of methyl methacrylate (MMA) was carried out using $R_2PH$ (=O) as a catalyst (precursor) at 80° C. (Table 24 and FIGS. 10A and B). The production process of CP—I is shown in Scheme 4. The decomposition of AIBN gives 2-cyanopropyl radical (CP.). CP.reacts with $I_2$ to give CP—I. After completion of the reaction of AIBN and $I_2$, the remaining AIBN acts as a radical initiator to give a growing polymer radical (to run the polymerization). The efficiency of AIBN to give a free CP. which can react with $I_2$ is about 60%. Thus, AIBN was added in an excessive amount (2 equivalents) to $I_2$).

(Scheme 4)

[Chemical formula 19]

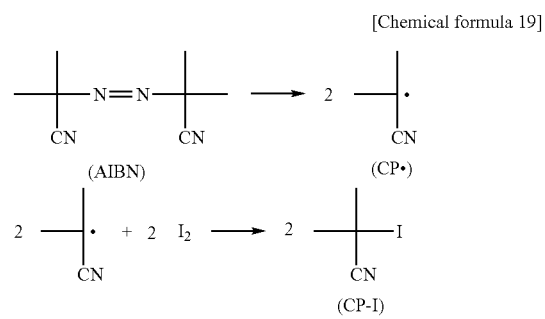

Figure 10A:
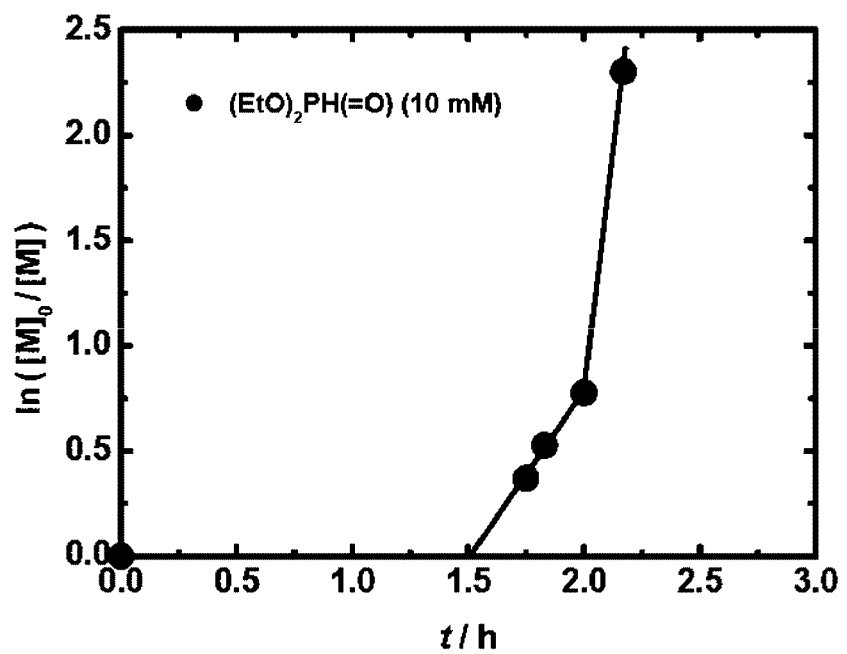
FIG. 10A is a graph showing the changes over time in the monomer concentration during MMA polymerization (MMA/I$_2$/AIBN/(EtO)$_2$PH(=O) (80° C.)). The graph shows the values of entry 1 as given in Table 24.
Figure 10B:
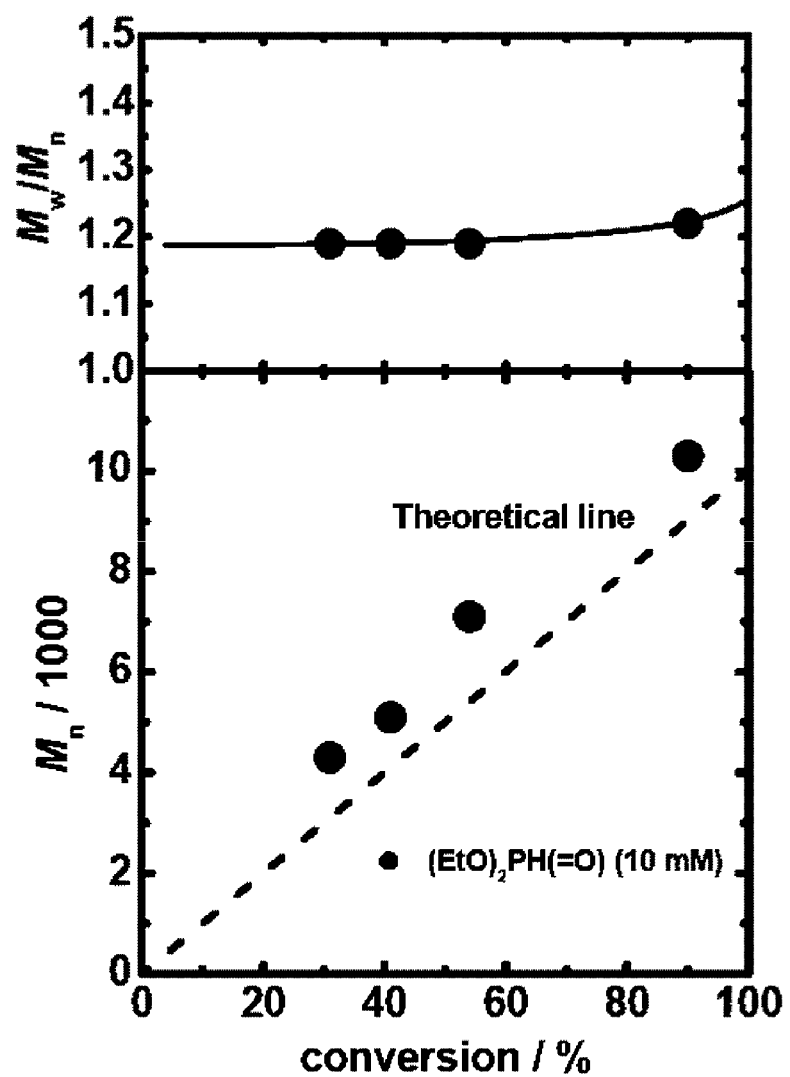
FIG. 10B is a graph plotting $M_n$ and $M_w/M_n$ vs. monomer conversion (ratio of polymerization) in the MMA polymerization (MMA/I$_2$/AIBN/(EtO)$_2$PH(=O) (80° C.)). Regarding Mn, results that are consistent with the theoretical values, which are indicated as Theoretical line, are obtained.

As shown in FIGS. 10A and 10B, under the conditions shown in Table 24 (entry 1), polymerization did not proceed for 1.5 hours. During this period, the radical produced from AIBN was used for the production of CP—I. All of $I_2$ was

TABLE 23

Block copolymerization of methyl methacrylate (MMA) (homopolymerization: first block) and MMA and benzyl methacrylate (BzMA) (randomcopolymerization: secondblock) with N-iodosuccinimide (NIS) (catalyst): successive addition of MMA and BzMA

| Entry | First monomer (equivalent to [R-I]$_0$) | Second monomer (equivalent to [R-I]$_0$) | R-I | I | catalyst | T (° C.) | [R-I]$_0$/ [I]$_0$/ [catalyst]$_0$ (mM) (first block) | t (h) | conv (%) | $M_n$ ($M_{n,theo}$) | PDI |
|---|---|---|---|---|---|---|---|---|---|---|---|
| 1 | MMA (100 eq) (50 vol % anisole) | BzMA (100eq) | P-I | AIBN | NIS | 80 | 40/10/1 | 1.5 | 54 | 5400 (5400) | 1.31 |
|   |   |   |   |   |   |   |   | +0.5 | +37 | 9700 (13600) | 1.37 |
|   |   |   |   |   |   |   |   | +1.0 | +62 | 13100 (19300) | 1.42 |
|   |   |   |   |   |   |   |   | +1.5 | +100 | 18700 (27600) | 1.49 |

Monomer: methyl methacrylate (MMA), benzyl methacrylate (BzMA)
Monomer concentration: 4M (50 vol % anisole solution)
Alkyl halide (R-I): 2-cyanopropyl iodide (CP-I)
Radical initiator (I): azobisisobutyronitrile (AIBN)
Catalyst: N-iodosuccinimide (NIS)
$M_n$ and PDI: Molecular weight and polydispersity obtained by gel permeation chromatography (GPC) with tetrahydrofuran (THF) as an eluent calibrated by poly(methyl methacrylate) (PMMA).

Example 24

Bulk Homopolymerization of methyl methacrylate (MMA) with $R_2PH$(=O) (Catalyst) Using In Situ Synthesis of alkyl halide In a system similar to Example 5, instead of using the isolated and purified 2-cyanopropyl iodide (CP—I), we used azobisisobutyronitrile (AIBN) and iodine ($I_2$) as raw (starting) compounds and used the CP—I in situ formed in the polymerization as an alkyl iodide. Bulk homopolymerization consumed in the 1.5 hours. Thereafter, polymerization proceeded with the CP—I in situ formed, the remaining AIBN, and a precursor catalyst $(EtO)_2PH$(=O), yielding a polymer having a low dispersibility was obtained. The molecular weights well agreed with the theoretical values assuming that all of $I_2$ was converted to CP—I (80 mM of CP—I is produced from 40 mM of $I_2$). With a lower concentration of $I_2$, the molecular weight became larger (entry 2). Azobis (2,4-dimethylvaleronitrile) (V65), which decompouses more rapidly than AIBN, led to a faster polymerization (entry 3). $(iPrO)_2PH$(=O) was also effectively used as a catalyst (precursor) (entry 4).

TABLE 24

Bulk homopolymerization of methyl methacrylate (MMA) with $R_2PH(=O)$ (catalyst) using in situ synthesis of alkyl halide.

| entry | Monomer (equivalent to [R-I]$_0$) | I | catalyst | T (°C.) | [I$_2$]$_0$/[I]$_0$/ [catalyst]$_0$ (mM) | t (h) | conv (%) | M$_n$ (M$_{n,theo}$) | PDI |
|---|---|---|---|---|---|---|---|---|---|
| 1 | MMA (100 eq) | AIBN | (EtO)$_2$PH(=O) | 80 | 40/80/10 | 1.75 | 31 | 4300 (3100) | 1.19 |
|   |   |   |   |   |   | 1.83 | 41 | 5100 (4100) | 1.19 |
|   |   |   |   |   |   | 2 | 54 | 7100 (5400) | 1.19 |
|   |   |   |   |   |   | 2.17 | 90 | 10300 (9000) | 1.22 |
| 2 | MMA (150 eq) |   |   |   | 27/53/7 | 1.75 | 16 | 3200 (2400) | 1.18 |
|   |   |   |   |   |   | 2 | 38 | 6300 (5700) | 1.24 |
|   |   |   |   |   |   | 2.17 | 49 | 8000 (7400) | 1.25 |
|   |   |   |   |   |   | 2.33 | 90 | 13300 (13500) | 1.32 |
| 3 | MMA (100 eq) | V65 |   |   | 40/80/10 | 0.33 | 16 | 2700 (1600) | 1.42 |
|   |   |   |   |   |   | 0.42 | 43 | 4800 (4300) | 1.44 |
|   |   |   |   |   |   | 0.5 | 90 | 8600 (9000) | 1.40 |
| 4 | MMA (100 eq) | AIBN | (iPrO)$_2$PH(=O) |   | 40/80/10 | 2.3 | 36 | 4700 (3600) | 1.38 |
|   |   |   |   |   |   | 2.42 | 44 | 5700 (4400) | 1.37 |
|   |   |   |   |   |   | 2.55 | 60 | 7000 (6000) | 1.35 |
|   |   |   |   |   |   | 2.67 | 93 | 10500 (9300) | 1.32 |

Monomer: methyl methacrylate (MMA)
Monomer concentration: 8 M (bulk)
Radical initiator (I): azobisisobutyronitrile (AIBN), azobis(2,4-dimethylvaleronitrile) (V65)
Catalyst: diethyl phosphite (EtO)$_2$PH(=O), diisopropyl phosphite (iPrO)$_2$PH(=O)
M$_n$ and PDI: Molecular weight and polydispersity obtained by gel permeation chromatography (GPC) with tetrahydrofuran (THF) as an eluent calibrated by poly(methyl methacrylate) (PMMA) standard.

Example 25

Figure 11A:
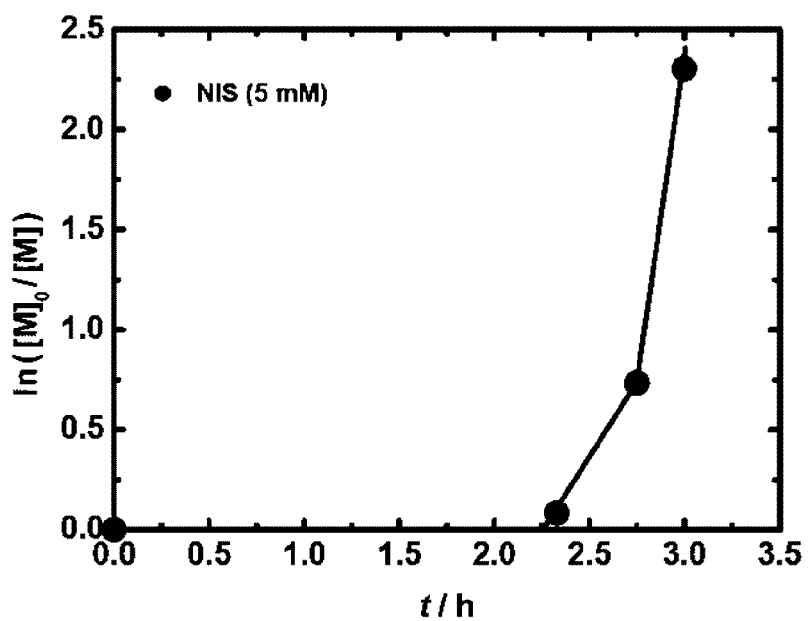
FIG. 11A is a graph showing the changes over time in the monomer concentration during MMA polymerization (MMA/I$_2$/AIBN/NIS (80° C.)). The graph shows the values of entry 1 as given in Table 25.
Figure 11B:
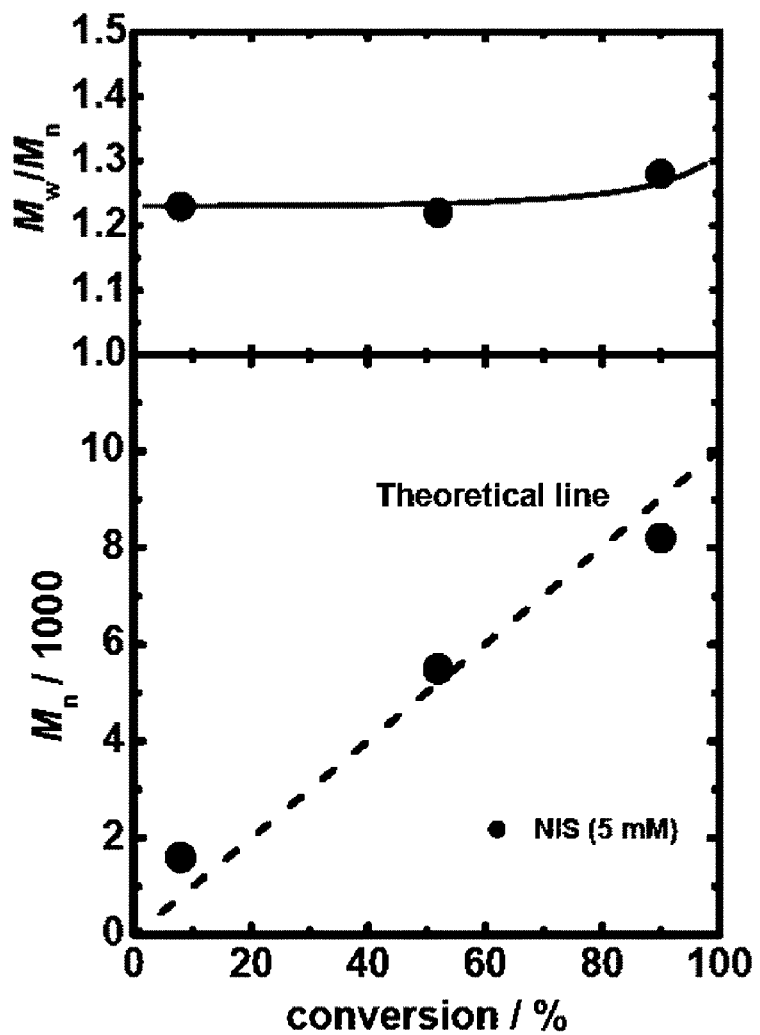
FIG. 11B is a graph plotting $M_n$ and $M_w/M_n$ vs. monomer conversion (ratio of polymerization) in the MMA polymerization (MMA/I$_2$/AIBN/NIS (80° C.)). Regarding Mn, results that are consistent with the theoretical values, which are indicated as Theoretical line, are obtained.

Bulk Homopolymerization of methyl methacrylate (MMA) with N-iodosuccinimide (NIS) (Catalyst) Using In Situ Synthesis of alkyl halide In a system similar to Example 24, polymerization was carried out using N-iodosuccinimide (NIS) as a catalyst instead of $R_2PH(=O)$. Azobisisobutyronitrile (AIBN) and iodine (I$_2$) were used as starting compounds, in situ producing the alkyl iodide CP—I. NIS was used as a catalyst. The bulk homopolymerization of methyl methacrylate (MMA) was carried out at 80° C. (Table 25 and FIGS. 11A and 11B). Under the conditions shown in Table 25 (entry 1), polymerization did not proceed for 2.25 hours. During this period, 2-cyanopropyl iodide (CP—I) was generated from AIBN and I$_2$ in situ (FIGS. 11A and 11B). Thereafter, polymerization proceeded with the CP—I, the remaining AIBN and a catalyst NIS, yielding a polymer having a low dispersibility. The molecular weights well agreed with the theoretical values assuming that all of I$_2$ was converted to CP—I (80 mM of CP—I is produced from 40 mM of I$_2$). A higher concentration of AIBN led to a faster polymerization (Table 25, entry 2).

TABLE 25

Bulk homopolymerization of methyl methacrylate (MMA) with N-iodosuccinimide (NIS) (catalyst) using in situ synthesis of alkyl halide.

| entry | Monomer (equivalent to [R-I]$_0$) | I | catalyst | T (°C.) | [I$_2$]$_0$/[I]$_0$/ [catalyst]$_0$ (mM) | t (h) | conv (%) | M$_n$ (M$_{n,theo}$) | PDI |
|---|---|---|---|---|---|---|---|---|---|
| 1 | MMA (100 eq) | AIBN | NIS | 80 | 40/80/5 | 2.33 | 8 | 1600 (800) | 1.23 |
|   |   |   |   |   |   | 2.75 | 52 | 5500 (5200) | 1.22 |
|   |   |   |   |   |   | 3 | 90 | 8200 (9000) | 1.28 |

TABLE 25-continued

Bulk homopolymerization of methyl methacrylate (MMA) with
N-iodosuccinimide (NIS) (catalyst) using in situ synthesis
of alkyl halide.

| entry | Monomer (equivalent to [R-I]$_0$) | I | catalyst | T (° C.) | [I$_2$]$_0$/[I]$_0$/ [catalyst]$_0$ (mM) | t (h) | conv (%) | M$_n$ (M$_{n,theo}$) | PDI |
|---|---|---|---|---|---|---|---|---|---|
| 2 | MMA (100 eq) | | | | 40/100/10 | 2.42 | 90 | 8700 (9000) | 1.38 |

Monomer: methyl methacrylate (MMA)
Monomer concentration: 8 M (bulk)
Radical initiator (I): azobisisobutyronitrile (AIBN)
Catalyst: N-iodosuccinimide (NIS)
M$_n$ and PDI: Molecular weight and polydispersity obtained by gel permeation chromatography (GPC) with tetrahydrofuran (THF) as an eluent calibrated by poly(methyl methacrylate) (PMMA) standard.

Example 26

Bulk Homopolymerization of benzyl methacrylate (BzMA) with R$_2$PH(=O) (Catalyst) Using In Situ Synthesis of alkyl halide

In a system similar to Example 24, polymerization was carried out using benzyl methacrylate (BzMA) as a monomer instead of methyl methacrylate (MMA). Azobisisobutyronitrile (AIBN) and iodine (I$_2$) were used as starting compounds, in situ producing the alkyl iodide CP—I. (EtO)$_2$PH(=O) was used as a catalyst (precursor). The bulk homopolymerization of BzMA was carried out at 80° C. (Table 26). Under the conditions shown in Table 26 (entry 1), polymerization did not proceed for 1.4 hours. During this period, 2-cyanopropyl iodide (CP—I) was produced from AIBN and I$_2$ in situ. Thereafter, polymerization proceeded with the CP—I, the remaining AIBN and a catalyst (precursor) (EtO)$_2$PH(=O), yielding a polymer having a low dispersibility.

TABLE 26

Bulk homopolymerization of benzyl methacrylate (BzMA) with
R$_2$PH(=O) (catalyst) using in situ synthesis of alkyl halide.

| entry | Monomer (equivalent to [R-I]$_0$) | I | catalyst | T (° C.) | [I$_2$]$_0$/[I]$_0$/ [catalyst]$_0$ (mM) | t (h) | conv (%) | M$_n$ (M$_{n,theo}$) | PDI |
|---|---|---|---|---|---|---|---|---|---|
| 1 | BzMA (100 eq) | AIBN | (EtO)$_2$PH(=O) | 80 | 40/80/10 | 1.58 | 13 | 5200 (2200) | 1.14 |
| | | | | | | 1.75 | 32 | 12400 (5700) | 1.22 |
| | | | | | | 1.83 | 45 | 16300 (8000) | 1.26 |
| | | | | | | 2.08 | 89 | 29400 (15500) | 1.32 |

Monomer: benzyl methacrylate (BzMA)
Monomer concentration: 8 M (bulk)
Radical initiator (I): azobisisobutyronitrile (AIBN)
Catalyst: N-iodosuccinimide (NIS)
M$_n$ and PDI: Molecular weight and polydispersity obtained by gel permeation chromatography (GPC) with tetrahydrofuran (THF) as an eluent calibrated by poly(methyl methacrylate) (PMMA) standard.

Example 27

Emulsion Polymerization of methyl methacrylate (MMA) with N-iodosuccinimide (NIS) (Catalyst)

In a system similar to Example 6, emulsion polymerization was carried out in water medium. Sodium dodecyl sulfate (0.0114 g), cetyl alcohol (0.0028 g) and $NaHCO_3$ (0.0009 g) were dissolved in water (4 g), and ultrasonic treatment (sonication) was performed for 10 minutes. Methyl methacrylate (MMA) (1 g), 2-cyanopropyliodide (CP—I) (0.0195 g) as alkyl iodide, azobisisobutyronitrile (AIBN) (0.0043 g) as a radical initiator, and N-iodosuccinimide (NIS) (0.0008 g) as a catalyst were added thereto, and the mixture was stirred. Sonication was performed for 5 minutes. It was heated at 80° C. to conduct an emulsion polymerization, and thereby a polymer having a low dispersibility was obtained (Table 27).

off. From the solution, the solvent was evaporated, yielding 6-(2-iodo-2-isobutyloxy)hexyltriethoxysilane (IHE: scheme 5) with the yield of 98%.

A silicon substrate (silicon wafer) was immersed in a solution of IHE (1 wt %) and $NH_3$ (1 wt %) in tetrahydrofuran (THF) for 12 hours to immobilize IHE on the surface of the silicone substrate. In a solution containing methyl methacrylate (MMA) (5 g (8 M)) as a monomer, 2-cyanopropyl iodide (CP—I) (0.0244 g (20 mM)) as an alkyl iodide, azobisisobutyronitrile (AIBN) (0.0205 g (20 mM)) as a radical initiator, and N-iodosuccinimide (NIS) (0.0056 g (5 mM)) as a catalyst, the silicon substrate, on which IHE was immobilized, was immersed. It was heated at 70° C. for 4 hours to conduct a polymerization (Table 28, entry 1). The free polymer pro-

TABLE 27

Emulsion polymerization of methyl methacrylate (MMA) with N-iodosuccinimide (NIS) (catalyst)

| entry | Monomer (equivalent to $[R-I]_0$) | R-I | I | catalyst | T (° C.) | $[R-I]_0/[I]_0/[catalyst]_0$ (mM) | t (h) | conv (%) | $M_n$ ($M_{n,theo}$) | PDI |
|---|---|---|---|---|---|---|---|---|---|---|
| 1 | MMA (100 eq) | CP-I | AIBN | NIS | 80 | 80/20/3 in water dispersion medium | 1.5 | 21 | 3600 (2100) | 1.41 |

Monomer: methyl methacrylate (MMA)

Monomer concentration: 8M (in oil drops)

Dispersion medium: water (80 weight %)

Alkyl halide (R-I): 2-cyanopropyl iodide (CP-I)

Radical initiator (I): azobisisobutyronitrile (AIBN)

Catalyst: N-iodosuccinimide (NIS)

$M_n$ and PDI: Molecular weight and polydispersity obtained by gel permeation chromatography (GPC) with tetrahydrofuran (THF) as an eluent calibrated by poly(methyl methacrylate) (PMMA) standard.

Example 28

Surface Graft Polymerization of methyl methacrylate (MMA) with N-iodosuccinimide (NIS) (Catalyst) from a Surface of a Silicon Substrate 6-(2-bromo-2-isobutyloxy) hexyltriethoxysilane (BHE: the chemical formula is shown in scheme 5 below) (6.2 g: 15 mmol) and NaI (11.23 g: 75 mmol) were stirred in dry acetone (100 mL) at 50° C. for two days. Chloroform was added thereto. Precipitated NaI, which contained NaBr, was filtered duced in the solution, which was not immobilized on the substrate and produced from CP—I, had Mn of 15,000, and PDI of 1.31. Thus, a low-polydispersity polymer was obtained. The film thickness of the graft polymer, which was grown from the surface of the substrate, was 10.5 nm. The molecular weight and molecular weight distribution of a graft polymer are known to be approximately the same as those of a free polymer. Accordingly, the surface density of the graft polymer was calculated as 0.51 chains/$nm^2$. This density is high and is in a concentrated polymer brush region. Thus, the synthsis of a concentrated polymer brush with low-polydisperisty was successful.

TABLE 28

Surface graft polymerization of methyl methacrylate (MMA) with N-iodosuccinimide (NIS) (catalyst) from a surface of a silicon substrate.

| entry | Monomer (equivalent to $[R-I]_0$) | R-I | I | catalyst | T (°C.) | $[R-I]_0/$ $[I]_0/$ $[catalyst]_0$ (mM) | t (h) | conv (%) | $M_n$ ($M_{n,theo}$) | PDI | σ (chains/ $nm^2$) |
|---|---|---|---|---|---|---|---|---|---|---|---|
| 1 | MMA (400 eq) | CP-I and IHE immobilized on the silicon substrate | AIBN | NIS | 80 | 20/20/5 | 4 | 30 | 15000 (15000) | 1.31 | 0.51 |

Monomer: methyl methacrylate (MMA)
Monomer concentration: 8 M
Alkyl halide (R-I): 2-cyanopropyl iodide (CP-I) and 6-(2-iodo-2-isobutyloxy)hexyltriethoxysilane (IHE) immobilized on the silicone substrate
Radical initiator (I): azobisisobutyronitrile (AIBN)
Catalyst: N-iodosuccinimide (NIS)
$M_n$ and PDI: Molecular weight and polydispersity obtained by gel permeation chromatography (GPC) with tetrahydrofuran (THF) as an eluent calibrated by poly (methyl methacrylate) (PMMA) standard.

(Scheme 5)

Surface-initiated graft polymerization with NIS

[Chemical formula 20]

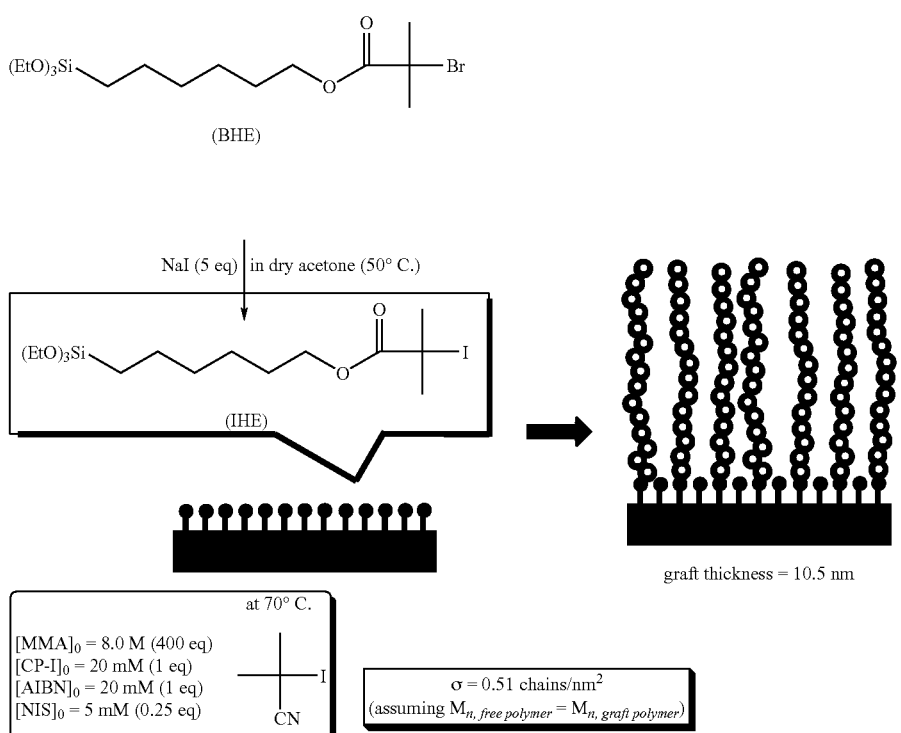

Surface-initiated graft polymerization with NIS

Comparative Example 3

Polymerization experiments were performed similarly to Example 1, with the proviso that the following formulations were used:
monomer: styrene, 8.0 M (1 g);
alkyl halide: 1-phenylethyl bromide, 80 mM (0.016 g) (This is abbreviated as "PEB" in the following table);
a catalyst: CuBr 5 mM (0.00071 g); and
ligand: 4,4'-di-(5-nonyl)-2,2'-bipyridine 10 mM (0.0035 g) (in the following table, abbreviated as "dHbipy").

A ligand is always required in order to disolve CuBr (catalyst) in a monomer. In a case of dHbipy, two equivalents are required with respect to CuBr. The concentration of the catalyst in this experimant (CuBr complex concentration) was 5 mM.

Note that no peroxide was used in these experiments, since it is a technical common knowledge that no peroxide is used in cases of copper complex catalysts. The reasons are as follows: (1) in the cases of copper complex catalysts, the radical reaction is initiated even if a peroxide is not used; and (2) if a peroxide is added to a copper complex catalyst, then side reactions can occur significantly and as a result, the molecular weight distribution becomes broader. Specifically, for example, the aforementioned non-patent document 1 describes that reaction material which contains no peroxide is used.

The aforementioned material was dissolved in a monomer to obtain reaction solutions. The reaction solutions were heated to 80° C. The results are as follows.

TABLE 29

Results of polymerization with a copper complex

| No. | XA | [PEB]$_0$/ [I$^a$]$_0$/[XA]$_0$ (mM) | T (° C.) | T (h) | Monomer Conversion (%) | M$_n$ | PDI |
|---|---|---|---|---|---|---|---|
| 1 | CuBr | 80/20/5 | 80 | 2 | 1.8 | 1200 | 1.40 |
|   |      |         |    | 4 | 3.5 | 1300 | 1.40 |
|   |      |         |    | 8 | 6.0 | 1400 | 1.38 |

PEB: 1-phenylethylbromide
dHbipy: ligand for dissolving CuBr into a monomer (styrene)

As a result, the monomer conversion was much lower than those of styrene in Example 1. Further, the values of Mn after the reaction were 1200 to 1400, which are very low. A polystyrene having a high molecular weight was not obtained. Furthermore, the values of Mw/Mn (PDI) were significantly larger than the values in the experiments of Example 1 which uses the catalyst of the present invention. Therefore, the activity of the transition metal catalyst is significantly inferior to the activity of the catalyst of the present invention.

As can be seen from the comparison of the results of Comparative Example 3 and the results of Example 1, the catalyst of the present invention has a significantly higher activity than a transition metal complex catalyst used in the prior art.

The aforementioned Examples show that the present invention has superior properties in comparison with the catalysts disclosed in the prior art.

For example, according to the Example described in the aforementioned non-patent document 1, the following reaction solution is subjected to a reaction:
styrene: 8.7 M (1 g);
1-phenylethyl bromide: 87 mM (0.016 g);
CuBr: 87 mM (0.013 g); and
4,4'-di-(5-nonyl)-2,2'-bipyridine: 174 mM (0.076 g).

This reaction solution was heated to 110° C. for 7 hours, and a polymer was obtained. 0.089 g of the complex compound was used with respect to 1 g of the monomer. That is, the catalyst was used in a large amount of 8.9 weight % based on the monomer.

In comparison with this example, the present invention can significantly reduce the amount of catalyst used, and can also reduce the reaction temperature by 10 to 40° C., without the need for a ligand.

As described above, the present invention has been illustrated using the preferred embodiments of the present invention. However, the present invention should not be construed to be limited to these embodiments. It is understood that the scope of the present invention should be construed solely on the basis of the claims. It is understood that those skilled in the art can carry out an invention within the scope equivalent to the description of the specification, based on the description of the specific preferred embodiments, the description of the present invention and the common technical knowledge. It is understood that the patents, patent applications, and other documents cited in the present specification should be incorporated by reference in the present specification as if the contents thereof are specifically described herein.

INDUSTRIAL APPLICABILITY

As described above, the inventors obtained an invention of a new living radical polymerization method (a precisely controlled radical polymerization), which uses nitrogen or phosphorus as a central atom of a catalyst. The method is characterized by the low toxicity of the catalyst, low amount of the catalyst necessary, high solubility of the catalyst (a ligand is unnecessary), mild reaction conditions, no coloration, no odor (treatment after a polymerization reaction is unnecessary), and the like. The method is significantly more environment-friendly and economically advantageous than the conventional living radical polymerization methods.

One half or more of the amount of polymer compounds produced in the world is produced by radical polymerizations. A living radical polymerization method can be applied to the production of high value added material. Specifically, it can be used for production of, for example, thermoplastic elastomer (material for automobiles, industrial articles, medical materials, footwear, sports articles, toys, materials for coating electrical wire, materials for buildings or construction, materials for modifying resins, and the like), resist material, materials for organic electroluminescence device), adhesives, polymer alloy, various filler additives, lubricant, surfactant, paint, ink, packaging material, pharmaceuticals (for example, materials for sustained release medicaments), personal care products (cosmetics, hairdressings, and the like), and the like. The scale of the market is very large. The living radical polymerization of the present invention can be widely used as a satisfactory process for producing new material for electronics, material for optics, material for separation, or material for a living body.

A biggest problem in the prior art concerning the practical utilization of living radical polymerization has been the high cost of the catalyst. That is, when a living radical polymerization is carried out, the catalyst enters a state in which the catalyst has been incorporated into the resulting polymer, and therefore, it takes time and effort to recover the catalyst from the polymer. This, as a result, increases the process costs enormously, and is not practical. For this reason, it is difficult to practically recover and recycle the catalyst, and under the current situation, the catalyst is substantially used once and thrown away.

The inventors of the present invention discovered that inexpensive phosphorus compounds act as excellent catalysts in a living radical polymerization, and thus realized living radical polymerization at far lower costs as compared with the conventional techniques. Specifically, when the cost of catalyst required in synthesizing 1 kg of a polymer is calculated based on the prices described in the catalogue of Sigma-Aldrich Company, for example, the cost of catalyst sums approximately to several thousand yen, with a copper complex catalyst that is most frequently used as a conventional type catalyst. Further, even if a germanium catalyst is used, the cost sums to about one thousand yen. On the other hand, in the present invention, the cost sums only to several ten yen, or even to several yen, when catalysts of phosphorus iodides or nitrogen iodides are used. When catalysts of far more inexpensive chlorides or the like are used, the cost for catalyst is further reduced. When far more inexpensive hydrides are used, the cost for catalyst is still further reduced. For example, in the case of the catalyst of phosphorus hydrides described in the examples, the cost sums only to several yen to several hundredths of a yen. In other words, according to the present invention, it is possible to reduce the cost by significant differences, as compared with the conventional catalysts.

Upon considering that the prices of various general-purpose monomers are generally around 100 yen to several hundred yen per kilogram, a cost for catalyst that is about ten times the cost for monomer, has been needed in the conventional techniques. In this regard, the present invention requires a cost for catalyst that is only about one-tenth or about one-hundredth of the cost for monomer, and thus the cost reducing effect is dramatic.

In addition, the advantages possessed by germanium catalysts, such as low toxicity of catalyst, high dissolubility (no need of ligand), mild reaction conditions, colorlessness and odorlessness (no need of treatment after polymerization reaction), are all possessed by the catalyst and catalyst precursor of the present invention having phosphorus or nitrogen as the central element. Furthermore, a polymerization can be controlled with an amount of catalyst that is far lower (for example, down to one-third) than the small amount of catalyst realized by germanium catalysts. Although germanium catalysts (iodides) are somehow weak to moisture and light, the catalyst and catalyst precursor having phosphorus or nitrogen as the central element are very strong to moisture and light, and further facilitate the operation of polymerization. As such, the present invention exhibits high environmental safety which is not possessed by conventional processes, as well as excellent economic efficiency and superior convenience that exceed the conventional techniques by far, and is highly excellent in practicality.

The invention claimed is:

1. A method of polymerization comprising a step of conducting a living radical polymerization reaction, wherein the living radical polymerization step is conducted in the presence of:
   a) a catalyst consisting of a compound comprising at least one central element selected from nitrogen and phosphorus, and at least one halogen atom which is bound to the central element, wherein the halogen atom is iodine or bromine; and
   b) an organic halide having a carbon-halogen bond;
   wherein, the only catalyst for living radical polymerization is the catalyst of a).

2. The method according to claim 1, wherein the concentration of the catalyst is 0.75 weight % or less of the reaction solution.

3. The method according to claim 1, wherein the reaction temperature is 20° C. to 100° C.

4. A method of synthesizing a block copolymer, wherein at least one block of the block copolymer is polymerized by a method according to claim 1.

5. The method according to claim 1, further comprising employing the halogen of the organic halide as a protecting group of the growing chain in the step of conducting the living radical polymerization.

6. The method according to claim 5, wherein two or three carbon atoms are bound to the carbon atom to which the halogen in the organic halide is bound.

7. The method according to claim 1, wherein the central element is trivalent phosphorus, pentavalent phosphorus or trivalent nitrogen.

8. The method according to claim 1, wherein the catalyst is represented by the following general formula (Ia):

$$R^1{}_n M_h X^1{}_m(\text{\textemdash} Z)_k \qquad (Ia)$$

wherein, $R^1$ is alkyl, alkylcarboxyl, haloalkyl, hydroxyl group, amino group, cyano group, alkoxy, alkylcarbonyl, aryl, or substituted aryl, wherein, two $R^1$ may be bound to each other such that the two $R^1$ and one M may together form a ring structure, n is an integer of 0 to 4×h, M is a central element, which is nitrogen or phosphorus, h is an integer of 1 or more, wherein when h is 2, M is linked together, and when h is 3 or greater, M may be linked in a form of a straight chain, a branched chain or in a cyclic form, when h is an integer of 2 or more, $R^1$, $X^1$, and Z may be independently bound to any of plurality of atoms of M, $X^1$ is iodine or bromine, Z is oxygen, nitrogen or sulfur, and is bound to M, the bond between Z and M:

is a double bond or triple bond, m is an integer of 1 to 5×h, and k is an integer of 0 to 2×h.

9. The method according to claim 8, wherein $X^1$ is iodine.

10. The method according to claim 8, wherein n is 0-3, M is nitrogen, h is 1, m is 1-3, k is 0, and two $R^1$ may be bound to each other such that the two $R^1$ and M may together form a ring.

11. The method according to claim 8, wherein $R^1$ is alkylcarbonyl, n is 2, M is nitrogen, h is 1, m is 1, k is 0, and the two $R^1$ and M together form a ring.

12. A method of polymerization comprising a step of conducting a living radical polymerization reaction, wherein the living radical polymerization step is conducted in the presence of:
   a) a catalyst consisting of a compound comprising at least one central element selected from nitrogen and phosphorus, and at least one halogen atom which is bound to the central element, wherein the halogen atom is iodine or bromine; and
   b) an organic halide having a carbon-halogen bond,
   wherein, the catalyst is represented by the following general formula (Ia):

$$R^1{}_n M_h X^1{}_m(\text{\textemdash} Z)_k \qquad (Ia)$$

wherein, $R^1$ is alkyl, alkylcarboxyl, haloalkyl, hydroxyl group, amino group, cyano group, alkoxy, alkylcarbonyl, aryl, or substituted aryl, wherein, two $R^1$ may be bound to each other such that the two $R^1$ and one M may together form a ring structure,
n is 0,
M is a central element, which is nitrogen or phosphorus,
h is an integer of 1 or more, wherein when h is 2, M is linked together, and when h is 3 or greater, M may be linked in a form of a straight chain, a branched chain or in a cyclic form,
when h is an integer of 2 or more, $R^1$, $X^1$, and Z may be independently bound to any of plurality of atoms of M,
$X^1$ is iodine or bromine,
Z is oxygen, nitrogen or sulfur, and is bound to M,
the bond between Z and M;

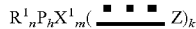

is a double bond or triple bond,
m is an integer of 2 to 5×h, and
k is an integer of 0 to 2×h.

13. The method according to claim 12, wherein $X^1$ is iodine.

14. A method of polymerization comprising a step of conducting a living radical polymerization reaction, wherein the living radical polymerization step is conducted in the presence of:
a) a catalyst; and
b) an organic halide having a carbon-halogen bond
wherein M is phosphorus and the catalyst is represented by the following general formula (Ib):

 (Ib)

wherein $R^1$ is alkyl, alkoxy, aryl or substituted aryl,
P is phosphorous;
n is an integer of 0 to 4×h,
h is an integer of 1 to 4, wherein when h is 2, P is linked together, and when h is 3 or greater, P may be linked in a form of a straight chain, a branched chain or in a cyclic form,
when h is an integer of 2 or more, $R^1$, $X^1$ and Z may be independently bound to any of plurality of atoms of P
$X^1$ is iodine or bromine,
Z is oxygen or nitrogen, and is bound to P,
the bond between Z and P:

. . .

is a double bond or triple bond,
m is an integer of 1 to 5×h, and
k is an integer of 0 to 2×h.

15. The method according to claim 14, wherein $X^1$ is iodine.

16. A method of polymerization comprising a step of conducting a living radical polymerization reaction, wherein the living radical polymerization step is conducted in the presence of:
a) a catalyst; and
b) an organic halide having a carbon-halogen bond
wherein the catalyst is represented by the following general formula (Ic):

$$R^1{}_n PX^1{}_m(\!=\!O)_k \qquad (Ic)$$

wherein, $R^1$ is alkoxy, aryl, or substituted aryl,
n is an integer of 0 to 2,
$X^1$ is iodine or bromine,
m is an integer of 1 to 3, and
k is an integer of 0 to 1.

17. The method according to claim 16, wherein $X^1$ is iodine.

* * * * *